United States Patent
Yoshikawa et al.

(10) Patent No.: US 10,359,837 B2
(45) Date of Patent: Jul. 23, 2019

(54) INFORMATION PROCESSING DEVICE AND INFORMATION PROCESSING METHOD

(71) Applicant: SONY CORPORATION, Tokyo (JP)

(72) Inventors: Kiyoshi Yoshikawa, Saitama (JP); Atsushi Okubo, Tokyo (JP); Ken Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/560,005

(22) PCT Filed: Jan. 18, 2016

(86) PCT No.: PCT/JP2016/051222
§ 371 (c)(1),
(2) Date: Sep. 20, 2017

(87) PCT Pub. No.: WO2016/157938
PCT Pub. Date: Oct. 6, 2016

(65) Prior Publication Data
US 2018/0067546 A1 Mar. 8, 2018

(30) Foreign Application Priority Data

Mar. 31, 2015 (JP) ................................. 2015-070674
Mar. 31, 2015 (JP) ................................. 2015-074157

(51) Int. Cl.
*G06F 3/01* (2006.01)
*G06F 3/00* (2006.01)
*G06F 3/03* (2006.01)

(52) U.S. Cl.
CPC .............. *G06F 3/011* (2013.01); *G06F 3/005* (2013.01); *G06F 3/01* (2013.01); *G06F 3/017* (2013.01); *G06F 3/0304* (2013.01)

(58) Field of Classification Search
None
See application file for complete search history.

(56) References Cited

U.S. PATENT DOCUMENTS

2013/0324254 A1* 12/2013 Huang .................... G06F 3/016
463/37
2013/0328770 A1 12/2013 Parham
(Continued)

FOREIGN PATENT DOCUMENTS

| CA | 2828222 A1 | 9/2011 |
| CN | 105453015 A | 3/2016 |

(Continued)

OTHER PUBLICATIONS

Sugimoto, et al., "Projecting Displays of Mobile Devices Based on 3D Positions and Intuitive Manipulation Techniques", IPSJ, vol. 47, No. 6, Jun. 2006, pp. 1976-1985.

(Continued)

*Primary Examiner* — Christopher J Kohlman
(74) *Attorney, Agent, or Firm* — Chip Law Group

(57) ABSTRACT

There is provided an information processing device including: a processing unit configured to perform a process of generating preparation information on the basis of first output information regarding a first target acquired from a sensor that senses a predetermined range of an actual space and second output information regarding a second target acquired from a device carried by a user. The preparation information is used to generate operation information on the basis of third output information acquired from the sensor.

17 Claims, 23 Drawing Sheets

(56) References Cited

U.S. PATENT DOCUMENTS

2014/0358475 A1  12/2014  Boulkenafed et al.
2015/0054740 A1   2/2015  Berestov et al.
2015/0346892 A1  12/2015  Parham

FOREIGN PATENT DOCUMENTS

| EP | 2679013 A2 | 1/2014 |
| EP | 2808760 A1 | 12/2014 |
| EP | 3017358 A1 | 5/2016 |
| JP | 2009-071844 A | 4/2009 |
| JP | 2012-253758 A | 12/2012 |
| JP | 6094782 B2 | 3/2017 |
| WO | 2011/104709 A2 | 9/2011 |
| WO | 2015/026707 A1 | 2/2015 |

OTHER PUBLICATIONS

Yatani, et al., "Information Transfer Techniques for Mobile Devices by Recognizing Users' Locations, Orientations and Gestures", Human Interface Society, vol. 6, No. 4, 2005, pp. 31-37.

Kurata, et al., "VizWear: Human-Centered Interaction through Computer Vision and Wearable Display", Technical Report of the Institute of Image Information and Television Engineers, Japan, ITE, vol. 25, No. 76, Nov. 20, 2001, pp. 47-52.

Mori, et al., "Pinch-n-Paste: Gesture Interaction System for Texture Transcription in AR Environment", IPSJ SIG Technical Reports, vol. 2014-CVIM-192, No. 18, May 15, 2014, pp. 1-8.

Sugimoto, et al., "Projecting Displays of Mobile Devices Based on 3D Positions and Intuitive Manipulation Techniques", 2006, vol. 47, No. 6, 1976-1985 pages.

Yatani, et al., "Information Transfer Techniques for Mobile Devices by Recognizing Users' Locations, Orientations and Gestures", Human Interface Society, vol. 6, No. 4, 31-36 pages.

Kurata, et al., "VizWear: Human-Centered Interaction through Computer Vision and Wearable Display", ITE Technical Report, Nov. 20, 2001, vol. 25, No. 76, 47-52 pages.

"Pinch-n-Paste: Gesture Interaction System for Texture Transcription in AR Environment", IPSJ SIG Technical Report, 2014, vol. 2014-CVIM-192, No. 18, pp. 08.

International Search Report and Written Opinion of PCT Application No. PCT/JP2016/051222, dated Mar. 29, 2016, 12 pages of ISRWO.

Extended European Search Report of EP Patent Application No. 16771824.6, dated Oct. 9, 2018, 09 pages.

Pons-Moll, et al., "Multisensor-Fusion for 3D Full-Body Human Motion Capture", 2010, IEEE, 663-670 Pages.

Non-Final Office Action in U.S. Appl. No. 16/406,320 dated May 30, 2019.

\* cited by examiner

FIG.6
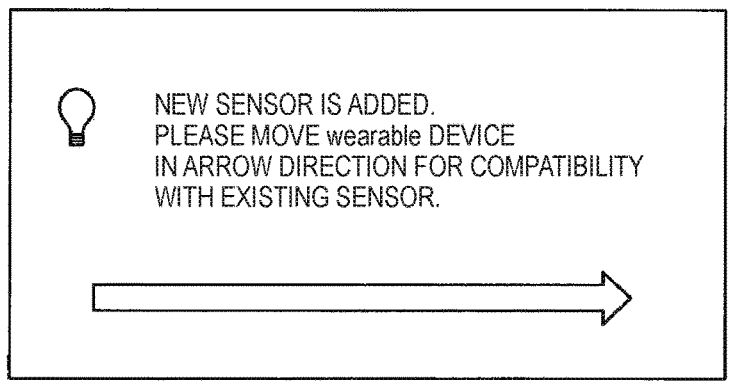
FIG.7
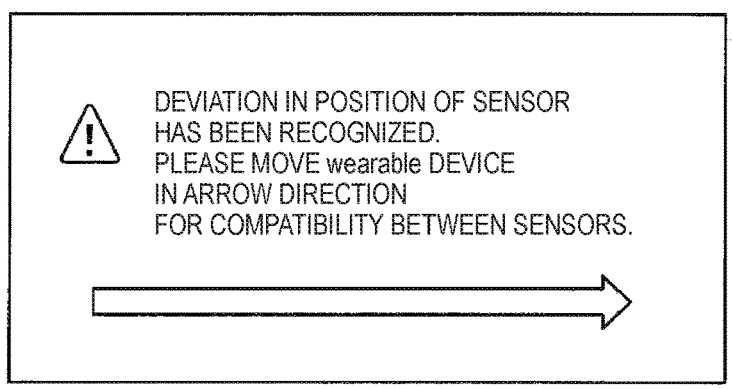
FIG.8
| object | ABSOLUTE SPATIAL COORDINATES | CORRESPONDING DEVICE |
|---|---|---|
| a | Xa1, Ya1, Za1 | DEVICE 300A |
| ⋮ | ⋮ | ⋮ |

FIG. 18A

| object | RELATIVE SPATIAL COORDINATES |
|---|---|
| IDA001 | Xa1, Ya1, Za1 |
| IDA002 | Xa2, Ya2, Za2 |

FIG. 18B

| object | RELATIVE SPATIAL COORDINATES |
|---|---|
| IDB001 | Xb1, Yb1, Zb1 |
| IDB002 | Xb2, Yb2, Zb2 |
| IDB003 | Xb3, Yb3, Zb3 |

FIG. 18C

| object | RELATIVE SPATIAL COORDINATES |
|---|---|
| IDC001 | Xc1, Yc1, Zc1 |
| IDC002 | Xc2, Yc2, Zc2 |

FIG.19

| object | RELATIVE SPATIAL COORDINATES | CORRESPONDING object |
|---|---|---|
| a | X1, Y1, Z1 | IDA001 |
| b | X2, Y2, Z2 | IDA002, IDB001 |
| c | X3, Y3, Z3 | IDB002 |
| d | X4, Y4, Z4 | IDB003, IDC001 |
| e | X5, Y5, Z5 | IDC002 |

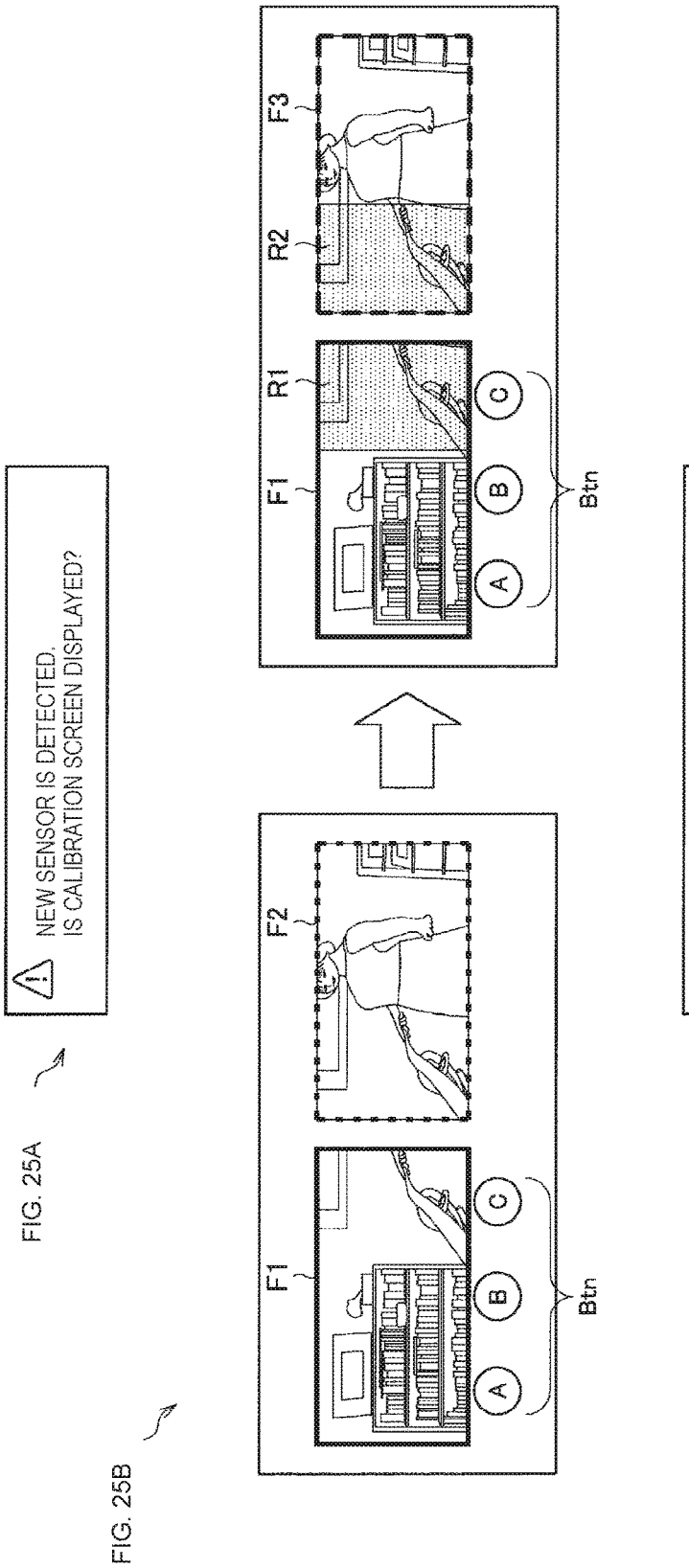

FIG. 27

| OPERATION EXAMPLE | APPLICATION |
|---|---|
| OPERATION OF MOVING BY PINCH | MOVE CONTENT BACK AND FORTH AND RIGHT AND LEFT ON WALL SCREEN<br>MOVE CONTENT BETWEEN SCREEN AT HAND AND WALL SCREEN |
| OPERATION OF PULLING BY PINCH AND PUSHING | PULL AND CLOSE DRAWER |
| OPERATION OF TURNING OVER BY PINCH | LIST INFORMATION OBTAINED BY SCRAPING THROUGH BOOK METAPHOR |
| OPERATION OF MAKING WINDOW FRAME WITH FINGERTIP | FORM REGION IN WHICH INFORMATION IS DISPLAYED WITH FREE POSITION AND SIZE |
| OPERATION OF HOLDING AND ROTATING | ROTATE DISPLAYED OBJECT IN 3D AND VIEW DIFFERENT SURFACE |
| OPERATION OF POINTING AND FOCUSING | PREVIEW CONTENT OF INTEREST |
| OPERATION OF PERFORMING BOOKMARK WITH FINGERTIP | CHECK CONTENT OF INTEREST |
| OPERATION OF DELETING CONTENT WITH HAND | CRUSH UNNECESSARY CONTENT |
| SW OPERATION OF SWITCH/VOLUME WITH FINGERTIP | OPERATION OF ROTATION, SLIDE, OR PUSH SWITCH |

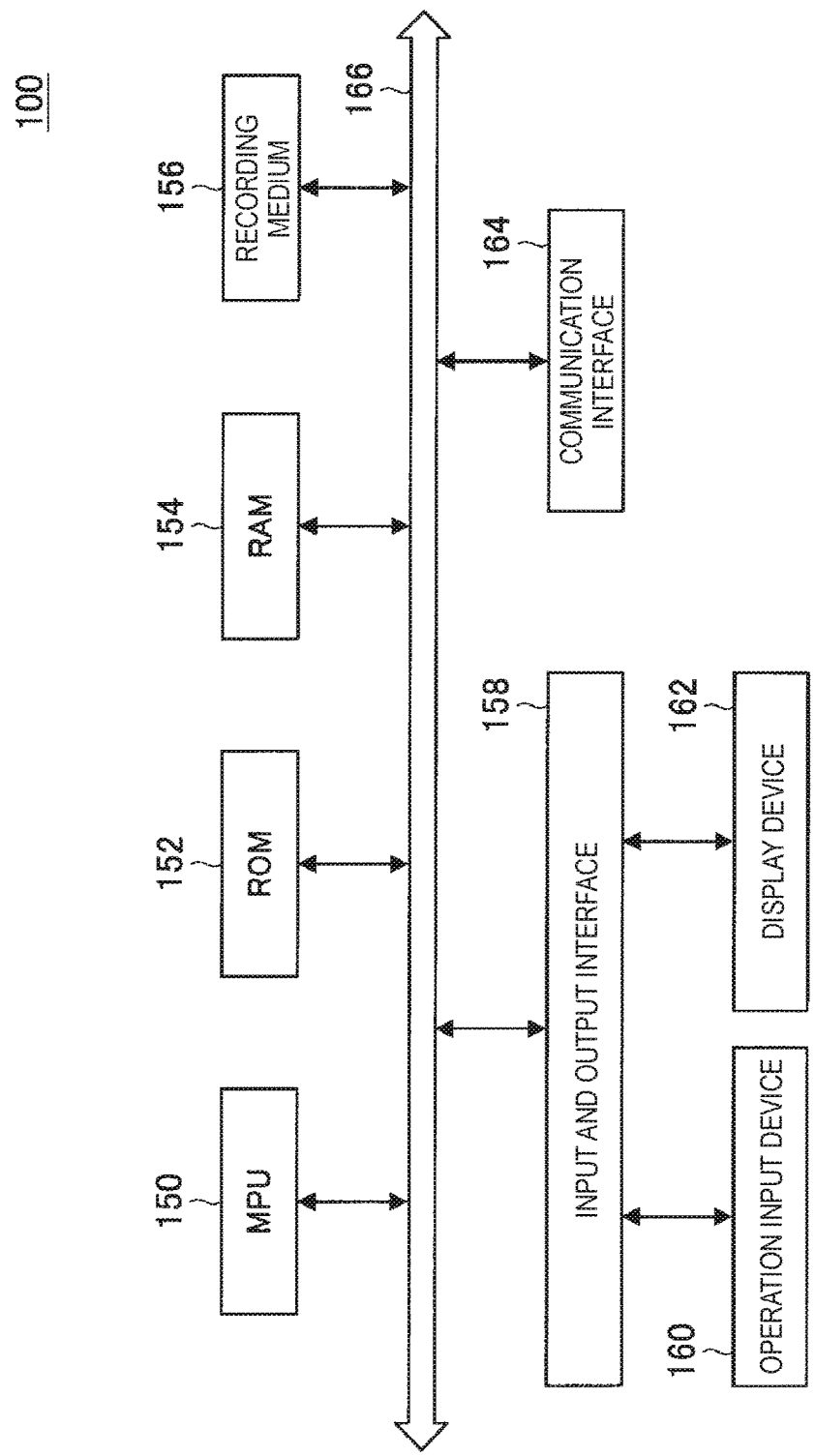

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/051222 filed on Jan. 18, 2016, which claims priority benefit of Japanese Patent Application No. JP 2015-070674 filed in the Japan Patent Office on Mar. 31, 2015 and also claims priority benefit of Japanese Patent Application No. JP 2015-074157 filed in the Japan Patent Office on Mar. 31, 2015. Each of the above-referenced applications is hereby incorporated herein by reference in its entirety.

TECHNICAL FIELD

The present disclosure relates to an information processing device, an information processing method, and a program.

BACKGROUND ART

Technologies for calibrating positional relations between cameras have been developed. For example, the technology disclosed in the following Patent Literature 1 can be exemplified as a technology for calibrating a positional relation between cameras by calculating a fundamental (F) matrix using a light-emitting sphere as a calibration jig. In addition, technologies for obtaining relative positions of a plurality of image sensors have been developed. For example, a technology disclosed in the following Patent Literature 2 can be exemplified as a technology for gaining a relative position of a plurality of image sensors on the basis of images obtained from the image sensors.

CITATION LIST

Patent Literature

Patent Literature 1: JP 2009-071844A
Patent Literature 2: JP 2012-253758A

DISCLOSURE OF INVENTION

Technical Problem

For example, in systems in which operations such as execution of applications can be performed on the basis of recognition results of motions of objects such as users, it is important to calibrate sensors that sense predetermined ranges of the actual spaces, that is, sensors (recognition devices) capable of recognizing motions of objects, more accurately in order to improve an operation feel.

Calibration of a sensor can be realized, for example, by using a dedicated calibration jig such as a calibration board or a light-emitting sphere disclosed in Patent Literature 1. Here, when an environment is changed, for example, when a new sensor is added or a calibrated sensor is moved, it is desirable to calibrate a sensor again. However, when there is no dedicated calibration jig such as a calibration board, as described above, a sensor may not be calibrated. In this case, there is concern of the sensor not being easy to calibrate again.

The present disclosure provides a novel and improved information processing device, a novel and improved information processing method, and a novel and improved program capable of improving convenience for a user when a sensor that senses a predetermined range of a space is used.

Solution to Problem

According to the present disclosure, there is provided an information processing device including: a processing unit configured to perform a process of generating preparation information on the basis of first output information regarding a first target acquired from a sensor that senses a predetermined range of an actual space and second output information regarding a second target acquired from a device carried by a user. The preparation information is used to generate operation information on the basis of third output information acquired from the sensor.

Further, according to the present disclosure, there is provided an information processing method performed by an information processing device, the method including: a step of performing a process of generating preparation information on the basis of first output information regarding a first target acquired from a sensor that senses a predetermined range of an actual space and second output information regarding a second target acquired from a device carried by a user. The preparation information is used to generate operation information on the basis of third output information acquired from the sensor.

Further, according to the present disclosure, there is provided a program causing a computer to perform: a step of performing a process of generating preparation information on the basis of first output information regarding a first target acquired from a sensor that senses a predetermined range of an actual space and second output information regarding a second target acquired from a device carried by a user. The preparation information is used to generate operation information on the basis of third output information acquired from the sensor.

Further, according to the present disclosure, there is provided an information processing device including: a processing unit configured to perform an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

Further, according to the present disclosure, there is provided an information processing method performed by an information processing device, the method including: a step of performing an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

Further, according to the present disclosure, there is provided a program causing a computer to perform: a step of performing an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

Advantageous Effects of Invention

According to the present disclosure, it is possible to improve convenience for a user when a sensor that senses a predetermined range of a space is used.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating an example of a process related to the first information processing method according to the embodiment.

FIG. 7 is an explanatory diagram illustrating an example of a process related to the first information processing method according to the embodiment.

FIG. 8 is an explanatory diagram illustrating an example of data indicating a target world model according to the embodiment.

FIGS. 18A, 18B and 18C are explanatory diagrams illustrating an example of data illustrating a target world model according to the embodiment.

FIG. 19 is an explanatory diagram illustrating an example of data illustrating a target world model according to the embodiment.

FIGS. 25A, 25B and 25C are flowcharts illustrating another example of a process related to the second information processing method according to the embodiment.

FIG. 27 is a flowchart illustrating another example of a process related to the second information processing method according to the embodiment.

FIG. 29 is an explanatory diagram illustrating an example of a hardware configuration of the information processing device according to the embodiment capable of performing the process related to the second information processing method according to the embodiment.

MODE(S) FOR CARRYING OUT THE INVENTION

Figure 1:
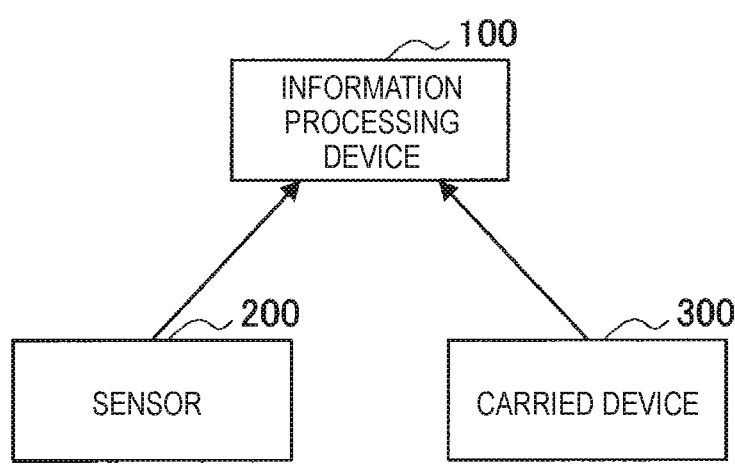
FIG. 1 is an explanatory diagram illustrating an overview of a first information processing method according to an embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, hereinafter, description will be made in the following order.

1. First information processing method according to embodiment
2. First information processing device according to embodiment
3. First program according to embodiment
4. Second information processing method according to embodiment 5. Second information processing device according to embodiment
6. Second program according to embodiment (First Information Processing Method According to Embodiment)

Before a configuration of an information processing device according to an embodiment is described, a first information processing method according to the embodiment will first be described. Hereinafter, the first information processing method according to the embodiment will be described exemplifying a case in which the information processing device according to the embodiment performs a process related to the first information processing method according to the embodiment.

[1] Overview of First Information Processing Method According to Embodiment

In a system in which an operation such as execution of an application can be performed on the basis of a recognition result of a motion of a hand, an arm, or the like of a user, a sensor that senses a predetermined range of the actual space is disposed in a space in order to improve a user experience (UX).

Here, as one method of improving a UX of a user using the foregoing system, a method of further improving detection precision of the sensor can be exemplified. In addition, as one method of further improving the detection precision of the sensor, for example, a method of calibrating the sensor when a sensor is newly installed or a position at which the sensor is installed is moved can be exemplified.

The calibration of the sensor can be realized, for example, by using a dedicated calibration jig such as a calibration board or a light-emitting sphere disclosed in Patent Literature 1.

However, for example, whenever a situation in which it is desirable to calibrate a sensor arises, for example, whenever a sensor is newly installed or a position at which a sensor is installed is moved, there is concern of an excessive burden being imposed on a user when the sensor is calibrated using the foregoing dedicated calibration jig. In addition, whenever a situation in which it is desirable to calibrate a sensor arises, the sensor may not be calibrated if there is no dedicated calibration jig in the case of the calibration of the sensor performed using the foregoing dedicated calibration jig. Therefore, there is concern of the sensor not being easy to calibrate again.

Accordingly, an information processing device according to the embodiment calibrates a sensor using output information acquired from the sensor that senses a predetermined range of the actual space and output information acquired from a device carried by a user (hereinafter referred to as a "carried device" in some cases).

More specifically, the information processing device according to the embodiment calibrates the sensor using output information regarding a first target acquired from a sensor and output information regarding a second target acquired from a carried device.

Here, the first target is a target that is detected on the basis of the output information acquired from the sensor. As the first target according to the embodiment, for example, any target which can be detected by the sensor according to the embodiment, such as a hand, an arm, or the like of the user of the carried device, can be exemplified.

The second target is a target that is detected on the basis of the output information acquired from the carried device. An example of the second target will be described below.

When the first and second targets are related targets, for example, when the second target moves in a manner that corresponds to movement of the first target, the information processing device according to the embodiment calibrates the sensor using the output information regarding the first target acquired from the sensor and the output information regarding the second target acquired from the carried device. An example of a process of determining whether the first and second targets are the related targets in the information processing device according to the embodiment will be described below.

Hereinafter, the output information regarding the first target acquired from the sensor is referred to as "first output information" and the output information regarding the second target acquired from the carried device is referred to as "second output information."

As the sensor according to the embodiment, for example, an image sensor which configures a stereo image sensor or a depth sensor of any scheme such as a time-of-flight (TOF) scheme can be exemplified. In addition, the sensor according to the embodiment may be, for example, any sensor capable of setting a space as a sensing range and outputting output information that can be used in recognition of a gesture in the space. That is, the sensor according to the embodiment is, for example, a sensor that senses an operation instruction from the user. In a use case to be described below, a case in which the sensor according to the embodiment is an image sensor that configures a stereo image sensor will be exemplified.

As the output information acquired from the sensor according to the embodiment (for example, the first output information or third output information to be described below), for example, data with which positional information regarding a target within the sensing range, such as captured image data or data indicating a depth value, is gainable can be exemplified.

As the carried device according to the embodiment, for example, any device worn directly or indirectly on the body of a user, such as a wearable device worn on the body of the user for use, a device used by a hand of the user or a device kept in a bag or a cloth carried or worn by the user, can be exemplified. As the wearable device according to the embodiment, for example, a device worn on a hand or an arm, such as a "watch type device" or an "accessory type device such as a ring type, bracelet type, nail type device," a "glasses type device," or a "cloth type, shoes type, or hat type device" can be exemplified.

As the second output information acquired from the carried device according to the embodiment, for example, data with which a detection result of a target described in the following (a) to (c) is gainable can be exemplified.

(a) Detection Result Regarding Movement Amount of Carried Device (Detection Results Corresponding to Previous and Current Motions)

As the detection result regarding a movement amount of the carried device, for example, a movement amount vector can be exemplified.

As the second output information acquired from the carried device related to the foregoing (a), for example, any data with which a movement amount vector of the carried device is calculable, such as data indicating a detection value of any motion sensor (for example, an acceleration sensor or a gyro sensor) which is included in the carried device according to the embodiment and is capable of detecting a motion of the carried device or data indicating a detection value of an external sensor connected to the carried device, can be exemplified. In addition, the second output information acquired from the carried device related to the foregoing (a) may be data indicating a movement amount vector of the carried device.

As the second target related to the foregoing (a), for example, any target which can be detected by a motion sensor, such as a hand or an arm of the user of the carried device, can be exemplified.

(b) Detection Result with which Behavior of User Holding Carried Device is Predicable (Detection Result Corresponding to Future Motion)

As a detection result with which a behavior of a user holding the carried device (hereinafter simply referred to as a "user" in some cases) is predictable, for example, spatial coordinates that interest the user can be exemplified. When a user performs any action such as a pointing action, the user looks at an operation target in many cases. Accordingly, by detecting spatial coordinates that interest the user, it is possible to predict a behavior of the user holding the carried device.

As the second output information acquired from the carried device related to the foregoing (b), for example, data indicating a detection value of any sensor such as an image sensor capable of specifying or estimating a line of sight of the user (for example, data indicating coordinates that interest the user) can be exemplified. The second output information acquired from the carried device related to the foregoing (b) may include, for example, data indicating a value with which estimation precision of a line of sight of the user, such as a detection value of a gyro sensor detecting a motion of the face of the user, is further improved.

As the second target related to the foregoing (b), for example, spatial coordinates that interest the user can be exemplified.

(c) Detection Result Regarding Movement Amount of Carried Device and Detection Result with which Behavior of User is Predictable A detection result of the second target based on the second output information acquired from the carried device according to the embodiment may be a detection result regarding a movement amount of the carried device described in the foregoing (a) and a detection result with which a behavior of the user described in the foregoing (b) is predictable.

Figure 2:
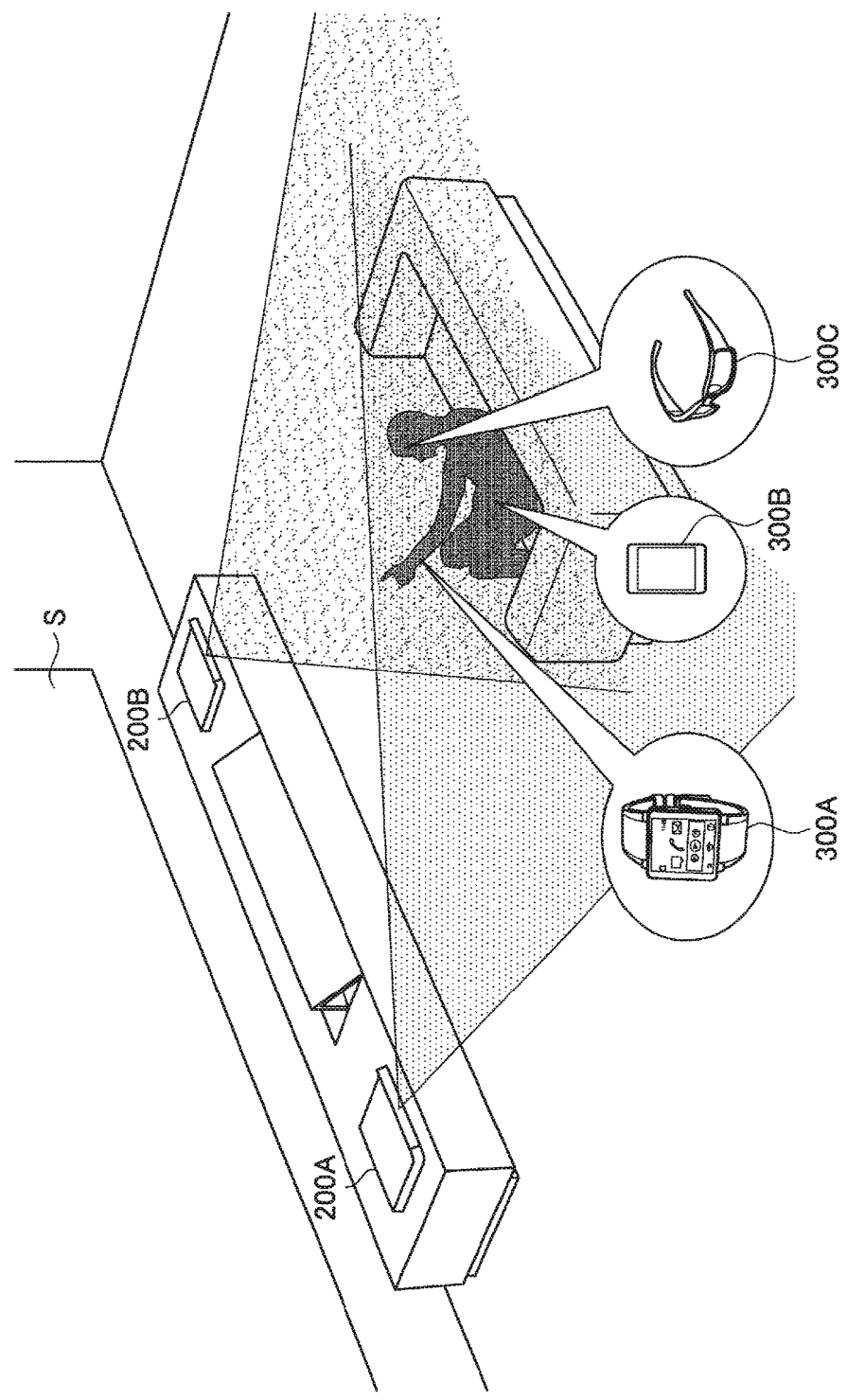
FIG. 2 is an explanatory diagram illustrating an overview of a first information processing method according to an embodiment.

FIGS. 1 and 2 are explanatory diagrams illustrating an overview of a first information processing method according to an embodiment. FIG. 1 illustrates an example of an information processing system according to the embodiment that includes an information processing device 100 performing a process related to the first information processing method according to the embodiment. FIG. 2 illustrates an example of a use case to which the information processing system according to the embodiment is applied. Specifically, FIG. 2 illustrates a use case in which a user performs an operation using his or her body such as a pointing action on a screen S on which a user interface (UI) is displayed to operate the UI.

The information processing system according to the embodiment includes, for example, the information processing device 100, a sensor 200, and a carried device 300.

In FIG. 1, one sensor and one carried device are illustrated. In the information processing system according to the embodiment, however, one or both of a plurality of sensors and a plurality of carried devices may be included. Hereinafter, the plurality of sensors included in the information processing system according to the embodiment are collectively referred to as the "sensor 200" or one sensor included in the information processing system according to the embodiment is referred to as the "sensor 200." Hereinafter, the plurality of carried devices included in the information processing system according to the embodiment are collectively referred to as the "carried device 300" or one carried device included in the information processing system according to the embodiment is referred to as the "carried device 300."

In the information processing system according to the embodiment, for example, the information processing device 100 and the sensor 200 may be an integrated device. Hereinafter, a case in which the information processing device 100 and the sensor 200 are different devices will be exemplified, as illustrated in FIG. 1.

The information processing device 100 performs a process of generating preparation information on the basis of the first output information acquired from the sensor 200 and the second output information acquired from the carried device 300.

The preparation information according to the embodiment is, for example, information (data) for controlling association of the sensor with a predetermined coordinate system. Specifically, the preparation information according to the embodiment is information used for a process of converting target position information gained on the basis of the output information of the sensor into coordinate values in the predetermined coordinate system.

Here, the coordinate values in the predetermined coordinate system obtained by converting the foregoing position information are used, for example, to detect an operation performed using a body, such as an action of pointing to the screen S on which the UI is displayed. That is, the preparation information according to the embodiment can be said to be, for example, information used to generate operation information on the basis of the output information acquired from the sensor. Hereinafter, of the output information acquired from the sensor, for example, output information used to gain the foregoing target position information (output information used to gain operation information) is distinguished from the first output information used for the process of generating the preparation information and is referred to as "third output information."

Also, hereinafter, the first output information and the third output information will be separately described to facilitate the description. However, the third output information according to the embodiment can serve as the first output information according to the embodiment. In addition, the first output information according to the embodiment can serve as the third output information according to the embodiment.

As the predetermined coordinate system according to the embodiment, a spatial coordinate system (hereinafter referred to as a "screen coordinate system" in some cases) that has any position of the screen S illustrated in FIG. 2 as the origin can be exemplified. Here, the screen S illustrated in FIG. 2 is a display screen on which an operation target (for example, an icon related to a UI) operated on the basis of the third output information of sensors 200A and 200B (examples of the sensors 200) is displayed. That is, the screen coordinate system can be said to be a coordinate system related to a display screen on which an operation target operated on the basis of the first output information of the sensor 200 is displayed.

Also, the predetermined coordinate system according to the embodiment is not limited to the foregoing screen coordinate system. A spatial coordinate system that has any position which can represent a position in a space as the origin can be exemplified. That is, a position in a space can be represented by coordinates indicating an absolute position for which the origin of the predetermined coordinate system is a reference. Hereinafter, coordinates represented by the predetermined coordinate system according to the embodiment are referred to as "absolute space coordinates" in some cases.

As position information based on the third output information of the sensor 200, for example, coordinate data in which a position is represented by coordinate values of a relative spatial coordinate system to the sensor 200 can be exemplified. The relative spatial coordinate system to the sensor 200 is, for example, a spatial coordinate system that has any position of the sensor 200 as the origin. Hereinafter, coordinates in the relative spatial coordinate system to the sensor 200 are referred to as "relative spatial coordinates" in some cases.

For example, when the third output information is captured image data or data indicating a depth value, a process of gaining position information based on the third output information is performed in, for example, the information processing device 100 or an external device of the information processing device 100, such as a server. The information processing device 100 or the external device gains position information through, for example, a process related to any method capable of gaining the position information from the captured image data or the data indicating the depth value which is the third output information.

The preparation information according to the embodiment is gained, for example, by obtaining a parameter for converting relative spatial coordinates into absolute spatial coordinates using a dedicated calibration jig such as the light-emitting sphere disclosed in Patent Literature 1. The preparation information according to the embodiment is also gained through a process of generating the preparation information according to the embodiment.

The process of generating the preparation information according to the embodiment is, for example, a process of correcting the preparation information which is information used to calculate predetermined coordinate values in a predetermined coordinate system on the basis of the foregoing third output information. By performing the process of generating the preparation information according to the embodiment, the corrected preparation information may be newly generated or content of correction target preparation information may be overwritten to be updated. A specific example of the process of generating the preparation information according to the embodiment will be described below.

The sensors 200 are installed in a space as, for example, the sensors 200A and 200B in FIG. 2 are indicated. The sensor 200 senses a predetermined range of the actual space and transmits the first output information to the information processing device 100. In the use case illustrated in FIG. 2, the sensors 200A and 200B detect a body part (for example, an arm or a finger) of a user or the carried devices 300 held by the user as targets.

Here, for example, the sensor 200 performs wireless or wired communication with the information processing device 100 via a network (or directly). As the network according to the embodiment, for example, a wired network such as a local area network (LAN) or a wide area network (WAN), a wireless network such as wireless local LAN (WLAN), or the Internet using a communication protocol such as Transmission Control Protocol/Internet Protocol (TCP/IP) can be exemplified.

The carried devices 300 are used in a state in which the carried devices 300 are worn on an arm or the like of the body of the user as, for example, the carried devices 300A, 300B, and 300C in FIG. 2 are indicated. In the use case illustrated in FIG. 2, movement amount vectors based on the second output information acquired from the carried devices 300A and 300B are equivalent to the detection result regarding the movement amount of the carried device, which is described in the foregoing (a). In the use case illustrated in FIG. 2, the spatial coordinates specified on the basis of the second output information acquired from the carried device 300C are equivalent to the detection result with which a behavior of the user is predictable, which is described in the foregoing (b).

In the carried device 300, an included sensor or a connected external sensor performs detection and the second output information in accordance with a detection result is transmitted to the information processing device 100. For example, the carried device 300 performs wireless or wired communication with the information processing device 100 via a network (or directly).

Here, for example, when it is determined that the carried device 300 is in a space in which the sensor 200 is installed, the carried device 300 may transmit the second output information to the information processing device 100. For example, when the position of the self-device (the carried device 300) is included in a set region or when communication with the sensor 200 is established, the carried device 300 determines that the carried device 300 is in the space in which the sensor 200 is installed.

As described above, by transmitting the second output information to the information processing device 100 when it is determined that the carried device 300 is in the space in which the sensor 200 is installed, there is a high possibility of the information processing device 100 correcting the preparation information on the basis of the first output information acquired from the sensor 200 present in the same space and the second output information acquired from the carried device 300. Accordingly, the information processing device 100 can gain the preparation information with which coordinate values in the predetermined coordinate system are calculable more accurately.

For example, as illustrated in FIG. 1, the information processing device 100 corrects the preparation information to generate the preparation information on the basis of the first output information acquired from the sensor 200 and the second output information acquired from the carried device 300. The preparation information is generated through the process of generating the preparation information, and thus the association of the sensor 200 with the predetermined coordinate system is controlled.

Here, when the process related to the first information processing method according to the embodiment is performed, a dedicated calibration jig necessary in a case in which a known technology is used at the time of the control of the association of the sensor 200 with the predetermined coordinate system is not necessary.

When the process related to the first information processing method according to the embodiment is performed, the sensor 200 can be calibrated by appropriately correcting the preparation information even when an environment is changed, for example, a new sensor is added or the calibrated sensor is moved. Accordingly, when the process related to the first information processing method according to the embodiment is performed, the sensor 200 can be easily calibrated again.

Accordingly, by performing the process related to the first information processing method according to the embodiment, it is possible to achieve convenience for the user when a sensor that senses a predetermined range of a space is used.

[2] Process Related to First Information Processing Method According to Embodiment Next, the process related to the first information processing method according to the embodiment will be described more specifically. Hereinafter, a case in which the information processing device 100 illustrated in FIG. 1 performs the process related to the first information processing method according to the embodiment will be exemplified.

The information processing device 100 performs the process of generating the preparation information on the basis of the first output information regarding the first target acquired from the sensor 200 that senses the predetermined range of the actual space and the second output information regarding the second target acquired from the carried device 300 carried by the user.

Figures 3, 4, 5:
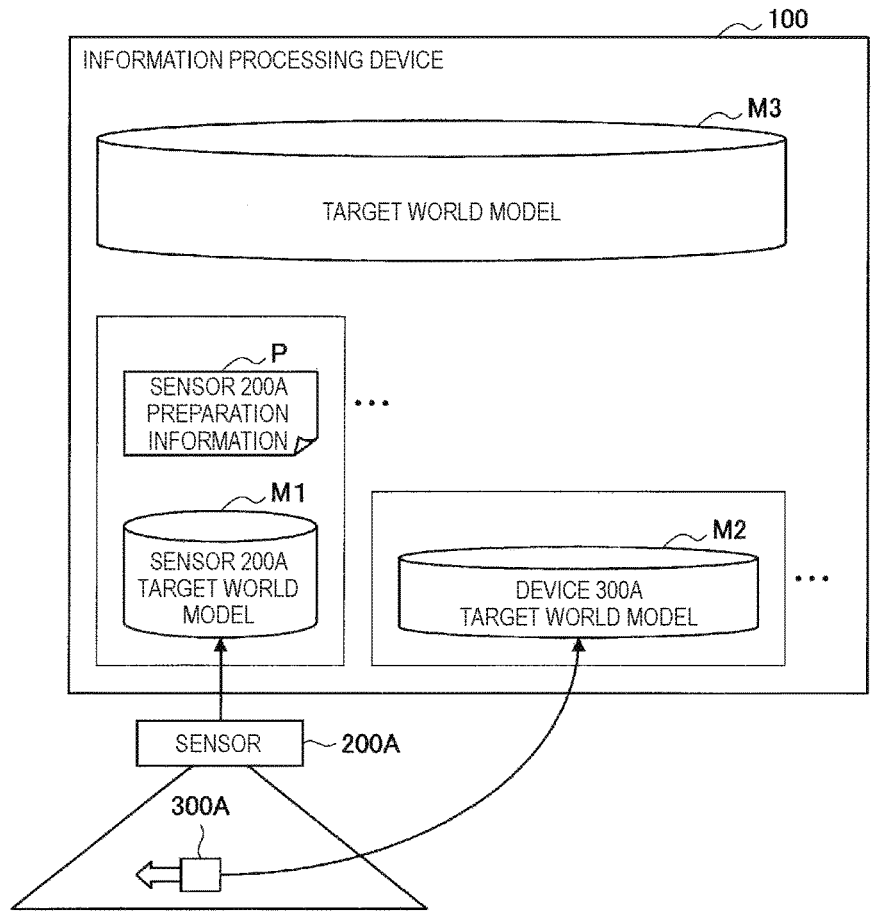
FIG. 3 is an explanatory diagram illustrating an example of a process related to the first information processing method according to the embodiment.
FIG. 4 is an explanatory diagram illustrating an example of data indicating a target world model according to the embodiment.
FIG. 5 is an explanatory diagram illustrating an example of data indicating a target world model according to the embodiment.

FIG. 3 is an explanatory diagram illustrating an example of the process related to the first information processing method according to the embodiment.

For example, the information processing device 100 corrects the preparation information (sensor 200A preparation information P illustrated in FIG. 3) for each sensor 200 by using the target world model M1 of each sensor 200 and a target world model M2 of each carried device 300.

FIGS. 4 and 5 are explanatory diagrams illustrating examples of data indicating target world models according to the embodiment. FIG. 4 illustrates an example of data indicating the target world model M1 of each sensor 200. FIG. 5 illustrates an example of data indicating the target world model M2 of each carried device 300.

The target world model M1 is, for example, a data model in which a target (hereinafter referred to as an "object") detected on the basis of the first output information of the sensor 200 in a space is associated with spatial coordinates of the object and which is retained chronologically. As the data indicating the target world model M1, for example, data indicating an object detected on the basis of the first output information of the sensor 200, as illustrated in FIG. 4, and a table (or a database) with which relative spatial coordinates of the object are associated and which is recorded chronologically can be exemplified.

For example, the information processing device 100 appropriately updates the data indicating the target world model M1 stored in a storage medium such as a storage unit (to be described below) included in the information processing device 100 or an external recording medium connected to the information processing device 100 on the basis of the first output information acquired from the sensor 200. Also, as described above, the process of gaining the position information on the basis of the first output information may be performed in the information processing device 100 or may be performed in an external device of the information processing device 100.

Referring to, for example, the data indicating the target world model M1 illustrated in FIG. 4, the information processing device 100 can acquire a change in the relative spatial coordinates of an object detected on the basis of the first output information of the sensor 200, that is, a motion of the object in a view from the sensor 200, as a detection result of the first target based on the first output information.

Also, the data indicating the target world model M1 is not limited to the example illustrated in FIG. 4. For example, data indicating a time corresponding to the first output information acquired from the sensor 200 may be further associated with the data indicating the target world model M1. As the time corresponding to the first output information acquired from the sensor 200, for example, data indicating a time at which the first output information is acquired or data indicating a time indicated by a timestamp of the first output information can be exemplified.

The target world model M2 is, for example, a data model in which the carried device 300 is associated with a detection result of the second target based on the second output information acquired from the carried device 300 and which is retained chronologically. As the data indicating the target world model M2, for example, a table (or a database) in which data indicating the carried device 300, a movement amount vector (an example of the detection result corresponding to the previous or current motion described in the foregoing (a)), as illustrated in FIG. 5, and target spatial coordinates (an example of the detection result corresponding to the future motion described in the foregoing (b)) at which the user is expected to look are associated and which is recorded chronologically can be exemplified.

For example, the information processing device 100 appropriately updates the data indicating the target world model M2 stored in a storage medium such as a storage unit (to be described below) included in the information processing device 100 or an external recording medium connected to the information processing device 100 on the basis of the second output information acquired from the carried device 300.

For example, when the detection result described in the foregoing (a) is obtained on the basis of the second output information acquired from the carried device 300, the information processing device 100 records the movement amount vector illustrated in FIG. 5 in the data indicating the target world model M2. For example, the information processing device 100 obtains the movement amount vector from spatial coordinates of an object at the time point before movement and spatial coordinates of the object at the time point after movement on the basis of the second output information acquired from the carried device 300. Then, when the movement amount vector is obtained, the information processing device 100 records the movement amount vector in the data indicating the target world model M2.

For example, when the detection result described in the foregoing (b) is obtained on the basis of the second output information acquired from the carried device 300, the information processing device 100 records the target spatial coordinates illustrated in FIG. 5 in the data indicating the target world model M2. Here, the target spatial coordinates are specified, for example, using any technology capable of specifying spatial coordinates, such as simultaneous localization and mapping (SLAM).

Referring to, for example, the data indicating the target world model M2 illustrated in FIG. 5, the information processing device 100 can acquire one or both of a detection result regarding a movement amount of the carried device and a detection result indicating an expected motion of the user as the detection result of the second target based on the second output information.

Also, the data indicating the target world model M2 is not limited to the example illustrated in FIG. 5.

For example, data indicating a time corresponding to the second output information acquired from the carried device 300 may be further associated with the data indicating the target world model M2. As the time corresponding to the information acquired from the carried device 300, for example, data indicating a time at which the second output information is acquired or data indicating a time indicated by a timestamp of the second output information can be exemplified.

In addition, for example, the target spatial coordinates (an example of the detection result described in the foregoing (b)) may not be included in the data indicating the target world model M2.

The information processing device 100 corrects the preparation information to generate the preparation information on the basis of the data indicating the target world model M1 based on the first output information acquired from the sensor 200 and the data indicating the target world model M2 based on the second output information acquired from the carried device 300. More specifically, the information processing device 100 corrects the preparation information, for example, by performing one process among the following processes (1) to (3).

(1) First Example of Process of Generating Preparation Information

For example, the information processing device 100 compares motion information of the first target based on the first output information acquired from the sensor 200 (an example of the detection result of the first target) to motion information of the second target based on the second output information acquired from the carried device 300 (an example of the detection result of the second target). Then, the information processing device 100 corrects the preparation information on the basis of a motion comparison result. Here, for example, the comparison between the motion information of the first target and the motion information of the second target is equivalent to an example of a process of determining whether the first and second targets are related targets. In addition, the case in which the preparation information is corrected on the basis of the motion comparison result is equivalent to, for example, a case in which the second target moves in accordance with a motion of the first target and the first and second targets can be said to be the related targets.

Here, as the motion information according to the embodiment, for example, a movement amount vector of each object can be exemplified. For example, the movement amount vector according to the embodiment can be obtained from the spatial coordinates of an object at a first time point and the spatial coordinates of the object at the second time point later than the first time point.

For example, the information processing device 100 obtains movement amount vectors from the data indicating the target world model M1 and the data indicating the target world model M2. In addition, for example, the information processing device 100 may obtain the movement amount vectors at corresponding time points. As the corresponding time points according to the embodiment, for example, the same time point or time points within a set error range can be exemplified. The error may be, for example, a fixed value which is set in advance or may be a variable value which can be set through an operation by the user or the like of the information processing device 100.

In addition, for example, the information processing device 100 determines whether correlation between the movement amount vectors obtained from the data indicating the target world model M1 and the data indicating the target world model M2 is high. Here, the determination of whether the correlation between the movement amount vectors is high is equivalent to determination of whether a detection value of the sensor 200 and a detection value of the carried device 300 are detection results of the same object.

For example, when a correlation coefficient of the movement amount vectors is equal to or greater than a set threshold (for example, 0<threshold<1) or the correlation coefficient is greater than the threshold, the information processing device 100 determines that the correlation between the movement amount vectors at the corresponding time points is high.

Here, as an example of the case in which the correlation between the movement amount vectors at the corresponding time points is high, for example, the following examples can be given:

a case in which the first target detected on the basis of the first output information of the sensor 200 and the second target detected on the basis of the second output information of the carried device 300 are the same (for example, a case in which a motion of an arm of the user is detected in both the sensor 200 and the carried device 300); and a case in which the first target detected on the basis of the first output information of the sensor 200 and the second target detected on the basis of the second output information of the carried device 300 are related targets (for example, a case in which the sensor 200 detects a palm of the user and the carried device 300 detects a motion of an arm of the user).

For example, when the information processing device 100 determines that the correlation between the movement amount vectors is high, the information processing device 100 calculates a correction parameter (hereinafter referred to as a "first correction parameter") for correcting a deviation between a movement amount vector based on information acquired from the sensor 200 and a movement amount vector based on information acquired from the carried device 300.

The first correction parameter according to the embodiment can be gained, for example, by obtaining a correction parameter for correcting a deviation between a movement amount vector based on the first output information acquired from the sensor 200 and a movement amount vector based on the second output information acquired from the carried device 300.

Then, the information processing device 100 corrects the preparation information in accordance with the first correction parameter. The correction of the preparation information in the process of generating the preparation information related to the first example is equivalent to correction of a positional deviation in the position of the first target based on the first output information.

Also, the first correction parameter according to the embodiment is not limited to the foregoing example.

For example, the first correction parameter according to the embodiment may be correction parameter for further correcting a temporal deviation between a time corresponding to the first output information acquired from the sensor 200 and a time corresponding to the second output information acquired from the carried device 300.

When there is the temporal deviation between the time corresponding to the first output information acquired from the sensor 200 and the time corresponding to the second output information acquired from the carried device 300, there is a possibility of a deviation occurring between a movement amount vector based on the first output information acquired from the sensor 200 and a movement amount vector based on the second output information acquired from the carried device 300 due to the temporal deviation. For example, the information processing device 100 corrects one or both of the movement amount vector based on the first output information acquired from the sensor 200 and the movement amount vector based on the second output information acquired from the carried device 300 in accordance with a correction value corresponding to the temporal deviation. Then, the information processing device 100 acquires the first correction parameter for further correcting the temporal deviation, for example, by obtaining a correction parameter for correcting a deviation from the corrected movement amount vector.

By correcting the preparation information in accordance with the first correction parameter for further correcting the foregoing temporal deviation, the information processing device 100 can gain the preparation information in which the temporal deviation between the time corresponding to the first output information and the time corresponding to the second output information is further corrected.

For example, the information processing device 100 calculates the foregoing first correction parameter to correct the preparation information. Also, a method of calculating the first correction parameter according to the embodiment is not limited to the foregoing example. The information processing device 100 can calculate the first correction information in accordance with any method capable of gaining the correction parameter for correcting "a positional deviation between the position of an object based on the first output information acquired from the sensor 200 and the position of the object based on the second output information acquired from the carried device 300" or "this positional deviation and a temporal deviation between a time corresponding to the first output information acquired from the sensor 200 and a time corresponding to the second output information acquired from the carried device 300."

For example, when the information processing device 100 determines that the correlation between the movement amount vectors is not high, the information processing device 100 does not correct the preparation information.

The information processing device 100 corrects the preparation information on the basis of the motion information of the first target based on a comparison result (a motion comparison result) of the first output information acquired from the sensor 200 (an example of the detection result of the first target) and the motion information of the second target based on the second output information acquired from the carried device 300 (an example of the detection result of the second target), for example, by performing the foregoing process.

In addition, for example, the information processing device 100 may record the calculated first correction parameter in, for example, a recording medium such as a storage unit (to be described below).

(2) Second Example of Process of Generating Preparation Information

For example, the information processing device 100 compares spatial coordinates specified on the basis of the first output information acquired from the sensor 200 (an example of the detection result of the first target) to spatial coordinates specified on the basis of the second output information acquired from the carried device 300 (an example of the detection result of the second target). Then, the information processing device 100 corrects the preparation information on the basis of a spatial coordinate comparison result. Here, for example, the comparison between the spatial coordinates specified on the basis of the first output information and the spatial coordinates specified on the basis of the second output information acquired from the carried device 300 is equivalent to another example of the process of determining whether the first and second targets are related targets.

For example, when the first output information acquired from the sensor 200 indicates spatial coordinates, the information processing device 100 uses the spatial coordinates indicated by the first output information acquired from the sensor 200. In addition, when the first output information acquired from the sensor 200 does not indicate the spatial coordinates, for example, the information processing device 100 specifies spatial coordinates on the basis of the first output information acquired from the sensor 200 using any technology such as SLAM capable of specifying spatial coordinates.

In addition, for example, the information processing device 100 extracts target spatial coordinates corresponding to the first output information acquired from the sensor 200 from the data indicating the target world model M2 and sets the extracted target spatial coordinates to spatial coordinates based on the second output information acquired from the carried device 300. Here, as the target spatial coordinates corresponding to the first output information acquired from the sensor 200 and extracted from the data indicating the target world model M2, for example, target spatial coordinates in which a distance to the spatial coordinates based on the first output information acquired from the sensor 200 is equal to or less than a set threshold (or target spatial coordinates in which the distance is less than the threshold) can be exemplified.

Then, for example, the information processing device 100 calculates a correction parameter for correcting a deviation between the target spatial coordinates and the specified spatial coordinates as the second correction parameter. In addition, for example, when there is no deviation between the target spatial coordinates and the specified spatial coordinates, the information processing device 100 does not calculate the second correction parameter. Here, the second correction parameter according to the embodiment is equivalent to a correction parameter related to correction of the preparation information based on a comparison result of spatial coordinates.

Then, the information processing device 100 corrects the preparation information in accordance with the calculated second correction parameter.

The information processing device 100 performs, for example, the foregoing process to correct the preparation information on the basis of the comparison result (the spatial coordinate comparison result) of the spatial coordinates specified on the basis of the first output information acquired from the sensor 200 and the spatial coordinates specified on the basis of the second output information acquired from the carried device 300.

In addition, for example, the information processing device 100 records the calculated second correction parameter in, for example, a recording medium such as a storage unit (to be described below).

Here, when identification information indicating the user of the carried device 300 is acquired from the carried device 300 or the identification information can be acquired from the carried device 300, the information processing device 100 may record the second correction parameter in a recording medium in association with the identification information indicating the user of the carried device 300. For example, the information processing device 100 records the second correction parameter and the identification information in a recording medium by any method capable of recording the second correction parameter and the identification information in association therewith, for example, recording the second correction parameter and the identification information in a table (or a database).

As the identification information according to the embodiment, for example, any data (or data group) capable of specifying a user, such as data indicating a user ID and a password or biometric information (data) of a user, can be exemplified.

Since the second correction parameter is, for example, as described above, the target spatial coordinates based on the second output information acquired from the carried device 300, that is, the correction parameter calculated on the basis of the detection result corresponding to the future motion described in the foregoing (b), there is a high possibility of the second correction parameter being a correction parameter unique for each user. Accordingly, the information processing device 100 can realize calibration of the sensor 200 in accordance with the correction parameter more suitable for each user by recording the second correction parameter and the identification information indicating the user of the carried device 300 in a recording medium in association therewith.

(3) Third Example of Process of Generating Preparation Information

For example, the information processing device 100 can also correct the preparation information in accordance with, for example, one or both of the first correction parameter and the second correction parameter by performing a process of combining the process of generating the preparation information related to the first example described in the foregoing (1) and the process of generating the preparation information related to the second example described in the foregoing (2). An example of the process of combining the process of generating the preparation information related to the first example described in the foregoing (1) and the process of generating the preparation information related to the second example described in the foregoing (2) will be described in a specific example of the process related to the first information processing method according to the embodiment to be described below.

The information processing device 100 corrects the preparation information to generate the preparation information by performing, for example, the foregoing process of generating the preparation information as the process related to the first information processing method according to the embodiment. By generating the preparation information through the process of generating the preparation information, the association of the sensor 200 with the predetermined coordinate system is controlled.

When both the first output information acquired from the sensor 200 and the second output information acquired from the carried device 300 are acquired, the information processing device 100 can perform the process of the generating the preparation information at, for example, the following timing:

periodically (intermittently) or aperiodically; or
at the time of detection of a predetermined action of a user.

Here, as the predetermined action of the user, for example, an action of a user such as a set gesture can be exemplified. Content of the predetermined action according to the embodiment can be delivered to the user by, for example, a physical medium such as a paper sheet or an electronic medium such as an online manual.

Also, a method of delivering the predetermined action according to the embodiment to the user is not limited to the foregoing example.

For example, the information processing device 100 can also deliver the content of the predetermined motion to the user and allow the user to perform the predetermined action by controlling notification for allowing the user to perform the predetermined action and causing the self-device (the information processing device 100) or an external device to perform the notification. The information processing device 100 delivers the content of the predetermined action to the user, for example, by performing visual notification for displaying text or an image on a display screen, auditory notification for outputting audio from an audio output device such as a speaker, or notification of combination of the notifications.

FIGS. 6 and 7 are explanatory diagrams illustrating an example of the process related to the first information processing method according to the embodiment and illustrate an example of notification for performing a predetermined action allowed to be performed by the information processing device 100.

For example, as illustrated in FIG. 6, when the new sensor 200 is detected, the information processing device 100 causes the self-device (the information processing device 100) or an external device to perform notification for performing the predetermined action. For example, when communication with the new sensor 200 is established, the information processing device 100 causes notification illustrated in FIG. 6 to be performed.

In addition, for example, as illustrated in FIG. 7, when movement of the position of the existing sensor 200 is detected, the information processing device 100 causes the self-device (the information processing device 100) or the external device to perform notification for the predetermined action. For example, when the movement of the position of the sensor 200 is detected based on data related to the determination of the movement of the position acquired from the existing sensor 200, the information processing device 100 causes the notification illustrated in FIG. 7 to be performed.

For example, the movement of a position at which the sensor 200 is installed is determined in accordance with a detection value of an external sensor such as a sensor capable of detecting a motion of an acceleration sensor included in the sensor 200 or an acceleration sensor connected to the sensor 200. For example, a process related to the determination of the movement of the position at which the sensor 200 is installed may be performed by the sensor 200 or may be performed by the information processing device 100. When the process related to the determination of the movement of the position by the sensor 200 is performed, for example, data indicating a determination result of the movement of the position can be exemplified as data related to the determination of the movement of the position. In addition, when the process related to the determination of the movement of the position is performed by the information processing device 100, for example, data indicating a detection value of a sensor or the like included in the sensor 200 can be exemplified as the data related to the determination of the movement of the position.

By performing the visual notification illustrated in FIGS. 6 and 7, the information processing device 100 can deliver content of the predetermined action to the user in a situation in which calibration of the sensor 200 is necessary (or a situation in which calibration of the sensor 200 is preferably performed) so that the user can perform the predetermined action. In addition, it is needless to say that an example of notification for performing a predetermined action caused to be performed by the information processing device 100 is not limited to the examples illustrated in FIG. 6 or 7.

Also, the process related to the first information processing method according to the embodiment is not limited to the process of generating the preparation information.

For example, the information processing device 100 can further perform the predetermined process on the basis of one or both of the first output information and the preparation information acquired from the sensor 200 as the process related to the first information processing method according to the embodiment.

As the predetermined process according to the embodiment, for example, one or both of (I) a conversion process to be described below and (II) an execution control process to be described below can be exemplified.

(I) Conversion Process

For example, on the basis of the preparation information, the information processing device 100 converts target position information obtained on the basis of the first output information acquired from the sensor 200 into coordinate values in a predetermined coordinate system.

For example, the information processing device 100 converts spatial coordinates recorded in the data indicating the target world model M1 of the sensor 200 (an example of the detection result of the first target based on the first output information acquired from the sensor 200) into coordinate values in the predetermined coordinate system using the preparation information. Then, the information processing device 100 reflects the converted result in, for example, a target world model in an entire target space (for example, the target world model M3 illustrated in FIG. 3).

FIG. 8 is an explanatory diagram illustrating an example of data indicating a target world model according to the embodiment and illustrates an example of data indicating the target world model M3 in an entire processing target space.

The target world model M3 in the entire space is, for example, a data model in which an object detected from the target space, absolute coordinates in the space of the object, and the carried device 300 equivalent to the object are associated and which is retained chronologically. For example, the absolute coordinates in the space are represented using a position set in the space as the origin. As the data indicating the target world model M3, for example, a table (or a database) in which data indicating an object detected from the target space, absolute coordinates in the space of the object, and the carried device 300 equivalent to the object are associated and which is recorded chronologically, as illustrated in FIG. 8, can be exemplified.

(II) Execution Control Process

For example, the information processing device 100 performs a process based on the coordinate values in the predetermined coordinate system which are obtained by converting the target position information obtained on the basis of the first output information acquired from the sensor 200 using the preparation information (hereinafter referred to as "a process based on a converted detection result" in some cases).

As a control target on which the information processing device 100 performs a process, for example, one or both of the self-device (the information processing device 100) and an external device of the information processing device 100 can be exemplified.

For example, the information processing device 100 decides the process based on the converted detection result which is caused to be performed by a control target on the basis of a change in the target world model M3 in the entire space, that is, a change in the position of the object in the space (the coordinate values in the predetermined coordinate system). Then, the information processing device 100 causes the control target to perform the process based on the converted detection result by delivering a process request including a command to perform the decided process to the control target.

Here, as the process based on the converted detection result, for example, any process which can be performed using a detection result of the object based on the first output information acquired from the sensor 200, for example, a process of executing an application corresponding to an operation in response to the operation on the UI displayed on the screen S (an example of the use case illustrated in FIG. 2), can be exemplified.

For example, the information processing device 100 performs one or both of (I) the conversion process and (II) the execution control process as the predetermined process. Also, the predetermined process according to the embodiment is not limited to (I) the conversion process and (II) the execution control process. For example, the information processing device 100 can perform any process which can be performed on the basis of one or both of the first output information and the preparation information as the predetermined process.

The information processing device 100 according to the embodiment performs, for example, "a process of generating the preparation information" or "a process of generating the preparation information and the predetermined process" as the process related to the first information processing method according to the embodiment.

Also, "the process of generating the preparation information" or "the process of generating the preparation information and the predetermined process" are separated processes of the process related to the first information processing method according to the embodiment for convenience. Accordingly, in the process related to the first information processing method according to the embodiment, for example, "the process of generating the preparation information" can be comprehended as two or more processes (in accordance with any separation method). In addition, in the process related to the first information processing method according to the embodiment, for example, "the process of generating the preparation information and the predetermined process" can be comprehended as one process and can also be comprehended as two or more processes (in accordance with any separation method).

[3] Specific Example of Process Related to First Information Processing Method According to Embodiment Next, a specific example of the process related to the first information processing method according to the embodiment in the information processing device 100 will be described.

Figure 9:
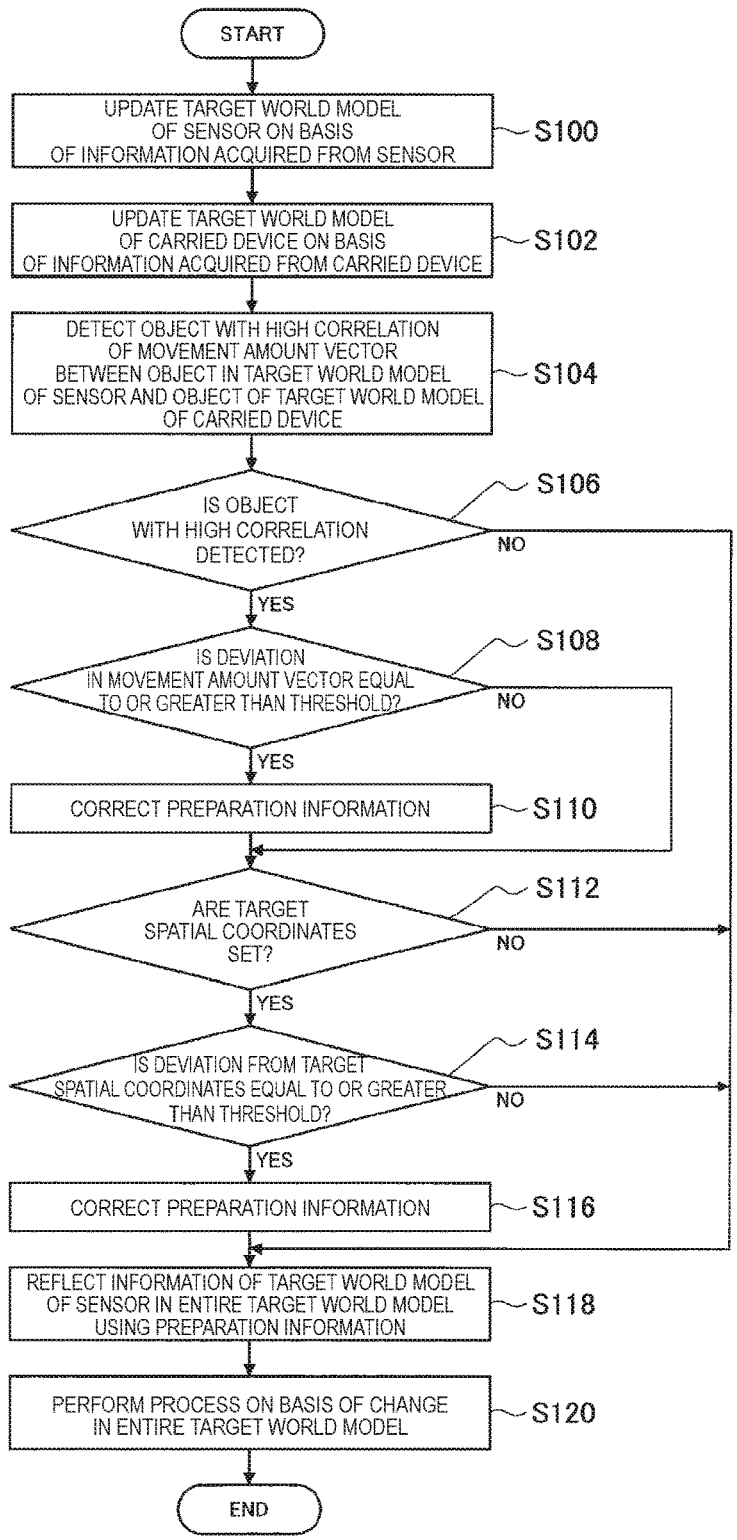
FIG. 9 is a flowchart illustrating an example of the process related to the first information processing method according to the embodiment.

FIG. 9 is a flowchart illustrating an example of the process related to the first information processing method according to the embodiment. Here, for example, processes of steps S104 to S120 illustrated in FIG. 9 are equivalent to an example of the process of generating the preparation information. In addition, for example, a process of step S122 illustrated in FIG. 9 is equivalent to an example of (I) the foregoing process (the conversion process) and a process of step S124 illustrated in FIG. 9 is equivalent to an example of (II) the foregoing process (the execution control process).

The information processing device 100 updates the data indicating the target world model M1 of the sensor 200 on the basis of the first output information acquired from the sensor 200 (S100). For example, when the data indicating the target world model M1 corresponding to the sensor 200 is not stored in the recording medium, the information processing device 100 generates and updates the data indicating the target world model M1 illustrated in FIG. 4. In addition, for example, when the data indicating the target world model M1 corresponding to the sensor 200 is stored in the recording medium, the information processing device 100 updates the stored data indicating the target world model M1.

The information processing device 100 updates the data indicating the target world model M2 of the carried device 300 on the basis of the second output information acquired from the carried device 300 (S102). For example, when the data indicating the target world model M2 corresponding to the carried device 300 is not stored in the recording medium, the information processing device 100 generates and updates the data indicating the target world model M2 illustrated in FIG. 5. In addition, for example, when the data indicating the target world model M2 corresponding to the carried device 300 is stored in the recording medium, the information processing device 100 updates the stored data indicating the target world model M2.

Also, FIG. 9 illustrates an example of the process of step S102 which is performed after the process of step S100 is performed, the process in the information processing device 100 is not limited to the foregoing example. For example, the information processing device 100 can independently perform the process of step S100 and the process of step S102. Accordingly, in the information processing device 100, the process of step S100 and the process of step S102 may be performed synchronously or the process of step S100 may be performed after the process of step S102.

For example, the information processing device 100 detects an object with the high correlation of the movement amount vector between the object of the data indicating the target world model M1 of the sensor 200 and the object of the data indicating the target world model M2 corresponding to the carried device 300 (S104). Here, the process of step S104 corresponds to the process of detecting the data corresponding the same object from the data indicating the target world model M1 corresponding to the sensor 200 and the data indicating the target world model M2 corresponding to the carried device 300.

For example, when the correlation coefficient of the movement amount vector is equal to or greater than a set threshold (for example, 0<threshold<1) or the correlation coefficient is greater than the threshold, the information processing device 100 determines that the correlation of the movement amount vector is high. In addition, when the information processing device 100 determines that the correlation of the movement amount vector is high, the information processing device 100 determines that an object with the high correlation of the movement amount vector is detected.

The information processing device 100 determines whether the object with the high correlation is detected (S106).

When the information processing device 100 determines in step S106 that the object with the high correlation is not detected, the information processing device 100 performs, for example, the process from step S118 to be described below.

Conversely, when the information processing device 100 determines in step S106 that the object with the high correlation is detected, the information processing device 100 determines whether the deviation in the movement amount vector is equal to or greater than the threshold (S108). Here, the determination of step S108 is equivalent to a process of evaluating the movement amount vector based on the first output information acquired from the sensor 200 and the movement amount vector based on the second output information acquired from the corresponding carried device 300.

Here, the threshold related to the process of step S108 may be a fixed value which is set in advance or may be a variable value which can be set through an operation by the user or the like of the information processing device 100. In addition, in step S108, whether the deviation in the movement amount vector is greater than the threshold may be determined.

When the information processing device 100 does not determine in step S108 that the deviation of the movement amount vector is equal to or greater than the threshold, the information processing device 100 performs the process from step S112 to be described below.

Conversely, when the information processing device 100 determines in step S108 that the deviation in the movement amount vector is equal to or greater than the threshold, the information processing device 100 corrects the preparation information corresponding to the sensor 200 (S110). For example, the information processing device 100 performs the process of generating the preparation information related to the first example described in the foregoing (1) to correct the preparation information in accordance with the calculated first correction parameter.

As a specific example, for example, the information processing device 100 calculates a correction parameter for matching the movement amount vector based on the first output information acquired from the sensor 200 to the movement amount vector based on the second output information acquired from the corresponding carried device 300 as the first correction parameter. By calculating the first correction parameter in the foregoing way, the information processing device 100 can calculate, as the first correction parameter, the correction parameter for correcting a positional deviation between the position of the object based on the first output information acquired from the sensor 200 and the position of the object based on the second output information acquired from the carried device 300.

Also, as described above, for example, the information processing device 100 may calculate a correction parameter for further correcting a temporal deviation between a time corresponding to the first output information acquired from the sensor 200 and a time corresponding to the first output information acquired from the carried device 300 as the first correction parameter.

Then, the information processing device 100 corrects the preparation information in accordance with the calculated first correction parameter.

When it is not determined in step S108 that the deviation in the movement amount vector is equal to or greater than the threshold or the process of step S110 is performed, whether a target spatial coordinates are set is determined (S112). Here, for example, the target spatial coordinates are spatial coordinates which are set by gaining the detection result corresponding to the future motion described in the foregoing (b) on the basis of the second output information acquired from the carried device 300 and are based on the second output information acquired from the carried device 300.

When the information processing device 100 determines in step S112 that the target spatial coordinates are not set, the information processing device 100 performs, for example, the process from step S118 to be described below.

In addition, when the information processing device 100 determines in step S112 that the target spatial coordinates are set, the information processing device 100 determines whether the deviation between the spatial coordinate specified on the basis of the first output information acquired from the sensor 200 and the target spatial coordinates is equal to or greater than the threshold (S114). Here, the determination of step S114 is equivalent to a process of evaluating the spatial coordinates based on the first output information acquired from the sensor 200 and the target spatial coordinates.

Here, the threshold related to the process of step S114 may be a fixed value which is set in advance or may be a variable value which can be set through an operation by the user or the like of the information processing device 100. In addition, in step S114, whether the deviation between the spatial coordinates specified on the basis of the first output information acquired from the sensor 200 and the target spatial coordinates is greater than the threshold may be determined.

In step S114, when the information processing device 100 does not determine in step S114 that the deviation between the spatial coordinate specified on the basis of the first output information acquired from the sensor 200 and the target spatial coordinates is equal to or greater than the threshold, the information processing device 100 performs, for example, the process from step S118 to be described below.

Conversely, in step S114, when the information processing device 100 determines that the deviation between the spatial coordinate specified on the basis of the first output information acquired from the sensor 200 and the target spatial coordinates is equal to or greater than the threshold, the information processing device 100 corrects the preparation information corresponding to the sensor 200 (S116). For example, the information processing device 100 performs the process of generating the preparation information related to the second example described in the foregoing (2) to correct the preparation information in accordance with the calculated second correction parameter.

As a specific example, for example, the information processing device 100 calculates the correction parameter for correcting the deviation between the target spatial coordinates and the specified spatial coordinates as the second correction parameter. Then, the information processing device 100 corrects the preparation information in accordance with the calculated second correction parameter.

In addition, when identification information corresponding to the carried device 300 is acquired, the information processing device 100 retrieves the second correction parameter associated with the acquired identification information. Then, when there is the second correction parameter associated with the identification information, the information processing device 100 corrects the preparation information in accordance with the second correction parameter associated with the identification information.

When the preparation information is selectively corrected in accordance with the foregoing processes of steps S106 to S120, the information processing device 100 reflects the data indicating the target world model M1 of the sensor 200 in the data indicating the target world model M3 in the entire space using the preparation information (S118).

For example, the information processing device 100 converts the spatial coordinates of the data indicating the target world model M1 of the sensor 200 into absolute spatial coordinates (coordinate values in the predetermined coordinate system) on the basis of the preparation information by performing (I) the foregoing process (the conversion process). Then, the information processing device 100 records the converted absolute spatial coordinates in the data indicating the target world model M3.

The information processing device 100 performs the process on the basis of the change in the target world model M3 in the entire space (S120).

For example, the information processing device 100 decides the process based on the converted detection result by performing (II) the foregoing process (the execution control process) and causes the control target to perform the process based on the converted detection result by delivering the process request including the command to perform the decided process to the control target.

The information processing device 100 performs, for example, the process illustrated in FIG. 9 as the process related to the first information processing method according to the embodiment.

For example, when the process illustrated in FIG. 9 is performed, the preparation information is selectively corrected on the basis of the first output information acquired from the sensor 200 and the second output information acquired from the carried device 300.

Accordingly, for example, by performing the process illustrated in FIG. 9, the information processing device 100 can control the association of the sensor 200 with the predetermined coordinate system.

In addition, for example, by performing the process illustrated in FIG. 9, the information processing device 100 can convert the spatial coordinates based on the second output information acquired from the carried device 300 into the absolute spatial coordinates on the basis of the preparation information. Further, for example, by performing the process illustrated in FIG. 9, the information processing device 100 can perform the process based on the converted detection result on the control target.

Accordingly, for example, by performing the process illustrated in FIG. 9, the information processing device 100 can raise a possibility of performing a process intended by the user in accordance with an action of the user, for example, in the use case in which the UI illustrated in FIG. 2 is operated. Therefore, it is possible to further improve operability and convenience for the user.

In addition, the process related to the first information processing method according to the embodiment is not limited to the example illustrated in FIG. 9.

For example, the information processing device 100 may not perform the processes of steps S112 to S116 of FIG. 9, that is, may not correct the preparation information based on the second correction parameter.

In addition, for example, the information processing device 100 may not perform "the process of step S120 of FIG. 9" or "the process of step S118 of FIG. 9 and the process of step S120" either.

Even when the information processing device 100 does not perform "the process of step S120 of FIG. 9" or "the process of step S118 of FIG. 9 and the process of step S120," the information processing device 100 can correct the preparation information through the process of generating the preparation information. Accordingly, even when the information processing device 100 does not perform "the process of step S120 of FIG. 9" or "the process of step S118 of FIG. 9 and the process of step S120," the information processing device 100 can control the association of the sensor 200 with the predetermined coordinate system. Thus, when the sensor that senses the predetermined range of the space is used, it is possible to achieve the improvement in convenience for the user.

[4] Use Case to which First Information Processing Method According to Embodiment can be Applied Next, a use case to which the first information processing method according to the embodiment can be applied will be described. Hereinafter, a case in which the information processing device 100 performs the process related to the first information processing method according to the embodiment in the use case will be exemplified.

[4-1] First Example of Use Case

In previously set preparation information, precision of a detection result by a sensor such as an image sensor can considerably deteriorate due to a change in a use environment such as an influence of sunlight. In addition, whenever a use environment changes, the user takes trouble to perform an operation related to any calibration.

When the first information processing method according to the embodiment is used, for example, the preparation information more suitable at each time point can be gained using the second output information acquired from a wearable device worn on the body of the user (an example of the carried device 300). Thus, it is possible to maintain a state in which precision of the detection result of the object based on the first output information acquired from the sensor 200 is high.

[4-2] Second Example of Use Case

As described above, by performing the process related to the first information processing method according to the embodiment, it is possible to maintain the state in which the precision of the detection result of the object based on the first output information acquired from the sensor 200 is high.

When the plurality of sensors 200 are installed in a space and the sensors are calibrated, for example, the sensors 200 can share information regarding the position of a mutually detected object on the basis of the second output information acquired from a wearable device worn on the body of the user (an example of the carried device 300) to broaden a detection range.

Figure 10:
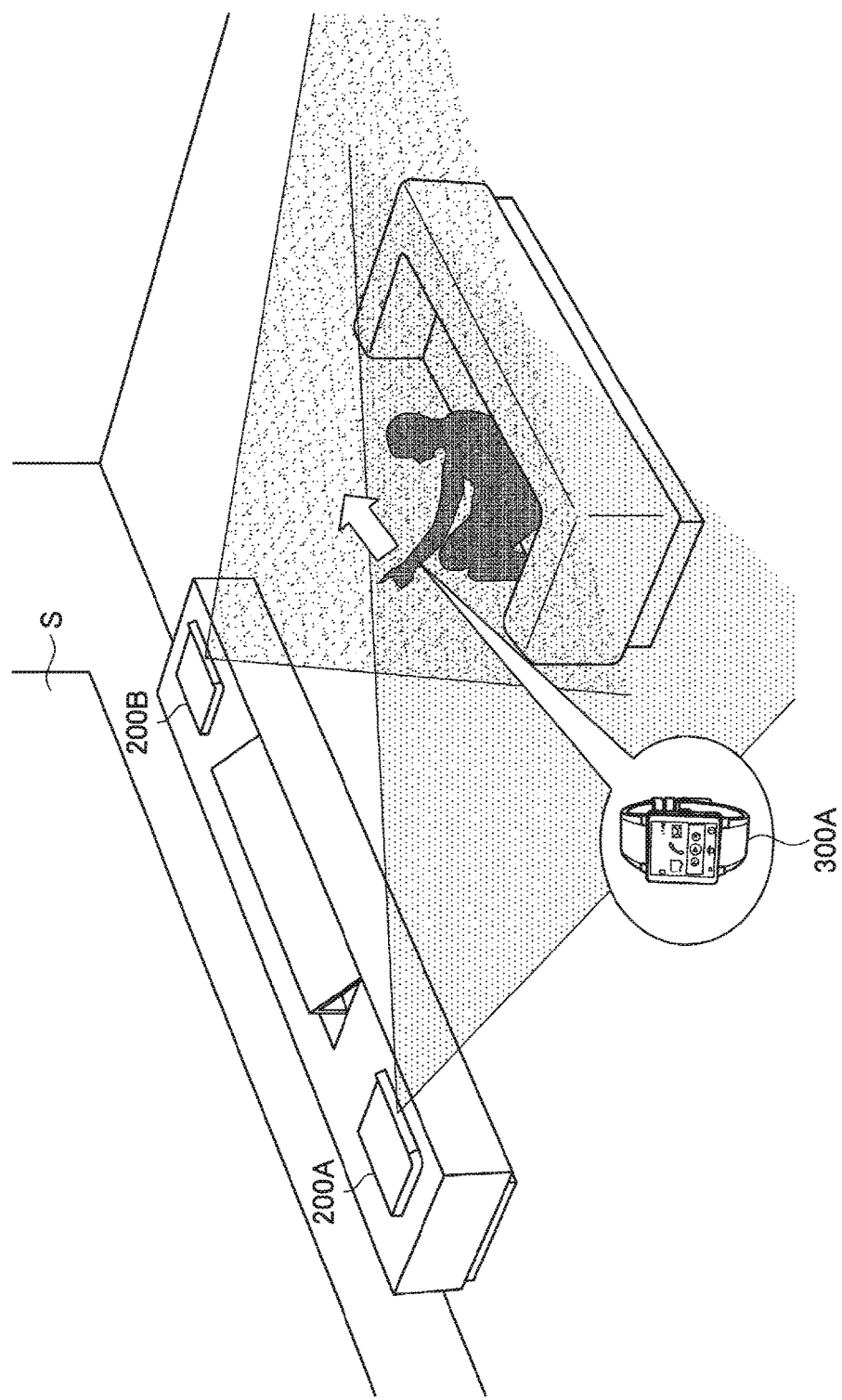
FIG. 10 is an explanatory diagram illustrating an example of a use case to which the first information processing method according to the embodiment can be applied.

FIG. 10 is an explanatory diagram illustrating an example of a use case to which the first information processing method according to the embodiment can be applied. FIG. 10 illustrates an example in which a sensor 200B is newly installed in addition to the sensor 200A which has been installed.

Here, by performing the process related to the first information processing method according to the embodiment on the newly installed sensor 200B, as described above, it is possible to maintain the state in which the precision of the detection result of the object based on the first output information acquired from the sensor 200B is high.

In addition, a method of maintaining the state in which the precision of the detection result of the object based on the first output information acquired from the newly installed sensor 200B is high is not limited to the foregoing example.

For example, when the same object is detected on the basis of pieces of output information of the sensor 200A, the sensor 200B, and the carried device 300C, the movement amount vector based on the first output information acquired from the sensor 200A, the movement amount vector based on the first output information acquired from the sensor 200B, and the movement amount vector based on the second output information acquired from the carried device 300C are the same.

As described above, the information processing device 100 automatically associate the target world model M1 of the sensor 200A with the target world model M1 of the sensor 200B using the fact that the movement amount vectors corresponding to the sensor 200A, the sensor 200B, and the carried device 300C are the same. For example, by associating the target world model M1 of the sensor 200B which is newly installed with the target world model M1 of the sensor 200A which has been installed, it is possible to maintain the state in which the precision of the detection result of the object based on the first output information acquired from the newly installed sensor 200B is high.

Here, the information processing device 100 may actively associate the target world model M1 of the sensor 200A with the target world model M1 of the sensor 200B, for example, by allowing the user to perform the notification illustrated in FIG. 6.

[4-3] Third Example of Use Case

For example, when the plurality of sensors 200 are installed, the user can also move the sensors 200 intentionally or unintentionally.

Here, as described above, for example, the information processing device 100 can determine that the sensors 200 are moved in accordance with detection values of acceleration sensors included in the sensors 200 and correct the preparation information again.

The process when the sensors 200 are moved is not limited to the foregoing example.

For example, the information processing device 100 can determine whether the sensors 200 are moved by evaluating the movement amount vector based on the second output information acquired from the carried device 300. When the information processing device 100 determines that the sensors 200 are moved, the information processing device 100 corrects the preparation information again.

In addition, when the information processing device 100 determines whether the sensors 200 are moved by evaluating the movement amount vector based on the second output information acquired from the carried device 300, the information processing device 100 can actively perform the determination, for example, by allowing the user to perform the notification illustrated in FIG. 7.

[4-4] Fourth Example of Use Case

As described above, the information processing device 100 can correct the preparation information in accordance with the target spatial coordinates at which the user is expected to look (an example of the detection result corresponding to the future motion described in the foregoing (b)). Thus, it is possible to reflect an intention of the user in the detection result of the object in the sensor 200.

Figure 11:
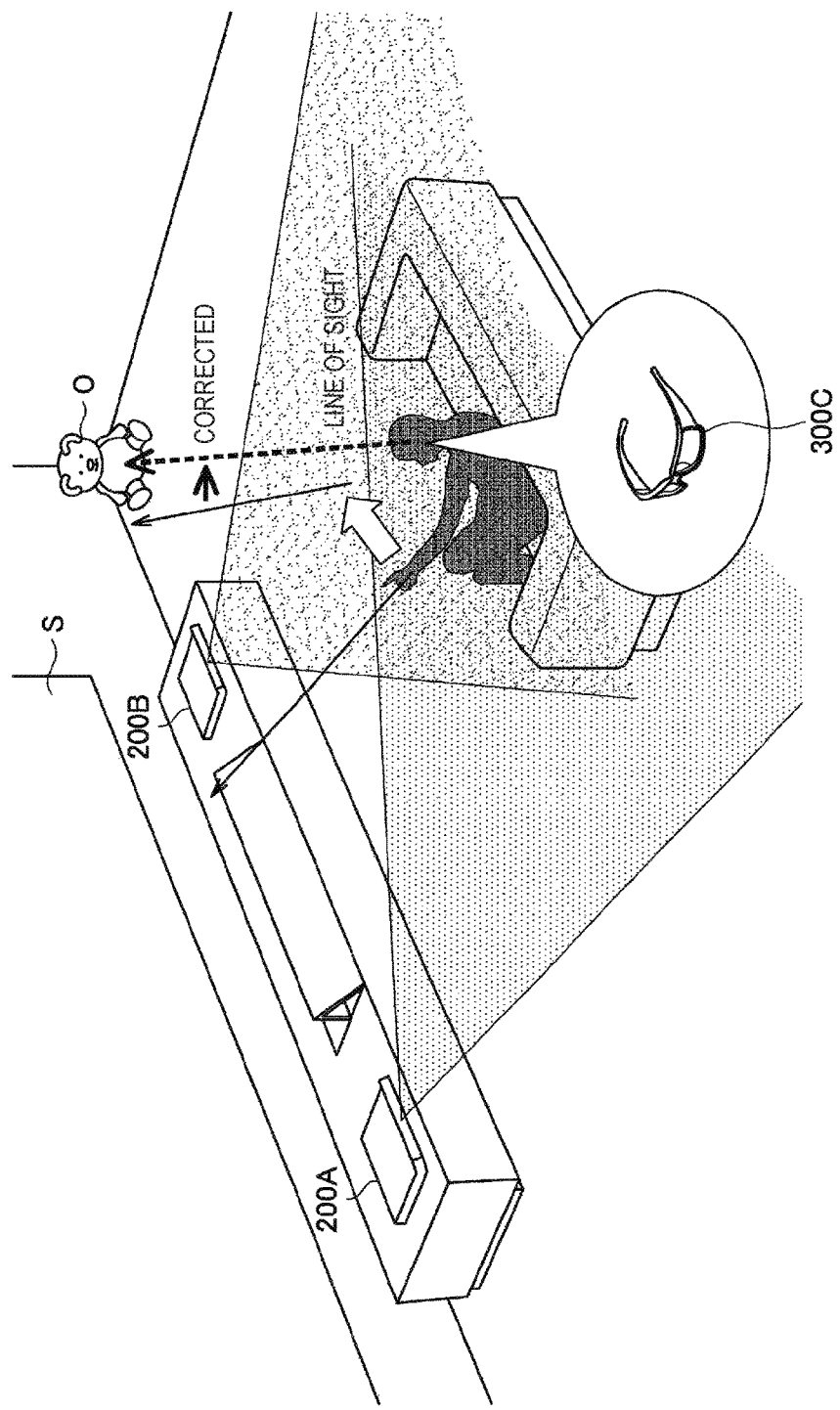
FIG. 11 is an explanatory diagram illustrating another example of the use case to which the first information processing method according to the embodiment can be applied.

FIG. 11 is an explanatory diagram illustrating another example of the use case to which the first information processing method according to the embodiment can be applied. FIG. 11 illustrates an example in which the user looks at a rag doll O which is a desired object before the user performs an action of moving his or her arm toward the desired object.

The information processing device 100 acquires information regarding a line of sight of the user from the carried device 300C and specifies the target spatial coordinates.

Thereafter, when the user moves his or her arm toward the rag doll O, a deviation of a direction of the arm from a direction in which there is the rag doll O can occur. For example, the information processing device 100 corrects the preparation information on the basis of the target spatial coordinates and converts the spatial coordinates based on the first output information of each of the sensors 200A and 200B into absolute spatial coordinates (coordinate values in the predetermined coordinate system) in accordance with the preparation information.

As described above, by converting the spatial coordinates based on the first output information of each of the sensors 200A and 200B into the absolute spatial coordinates in accordance with the preparation information, it is possible to reflect an intention of the user desiring to move his or her arm toward the rag doll O. In addition, in another situation, by converting the spatial coordinates based on the first output information of each of the sensors 200A and 200B into absolute spatial coordinates (coordinate values in the predetermined coordinate system) in accordance with the preparation information, it is possible to correct a difference between an intention of the user and a detection result of the sensor obtained by an actual operation of the user.

[5] Example of Advantageous Effects Obtained by Using First Information Processing Method According to Embodiment By using the first information processing method according to the embodiment, for example, the following advantageous effects are obtained. Also, it is needless to say that the advantageous effects obtained by using the first information processing method according to the embodiment are not limited to the following examples.

- When calibration of the sensor 200 is set, the second output information acquired from a wearable device worn on the body of the user (an example of the carried device 300) is used. Therefore, a special dedicated operation of the user related to the calibration of the sensor 200 is not necessary. In addition, a general-purpose sensor can be used in the wearable device (an example of the carried device 300) and it is not necessary to mount a dedicated sensor on the wearable device (an example of the carried device 300).
- By setting the preparation information corresponding to a use environment, it is possible to maintain a state in which the precision of the detection result of the object based on the first output information acquired from the sensor 200 is high.
- When the number of sensors 200 is increased, it is possible to calibrate the sensors 200 using the second output information acquired from the wearable device (an example of the carried device 300). When the sensors 200 using the second output information acquired from the wearable device (an example of the carried device 300) are calibrated, a special dedicated operation of the user related to the calibration of the sensors 200 is not necessary at the time of installation of the sensors 200.
- By converting the spatial coordinates based on the first output information of the sensor 200 into the absolute spatial coordinates (the coordinate values in the predetermined coordinate system) in accordance with the preparation information corresponding to an operation target of the user, it is possible to reflect an intention of the user in the detection result based on the first output information acquired from the sensor 200.

(First Information Processing Device According to Embodiment)

Next, an example of a configuration of the information processing device according to the embodiment capable of performing a process related to the first information processing method according to the above-described embodiment will be described.

Figure 12:
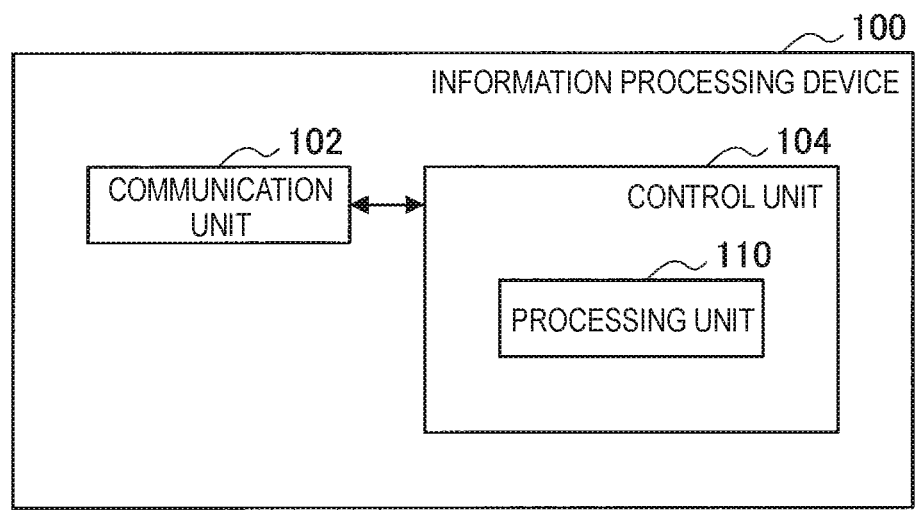
FIG. 12 is a block diagram illustrating an example of a configuration of an information processing device according to the embodiment capable of performing the process related to the first information processing method according to the embodiment.

FIG. 12 is a block diagram illustrating an example of a configuration of the information processing device 100 according to the embodiment capable of performing the process related to the first information processing method according to the embodiment. The information processing device 100 includes, for example, a communication unit 102 and a control unit 104.

The information processing device 100 may also include, for example, a read-only memory (ROM: not illustrated), a random access memory (RAM: not illustrated), a storage unit (not illustrated), an operation unit (not illustrated) which can be operated by the user, and a display unit (not illustrated) that displays various screens on a display screen. In the information processing device 100, for example, the constituent elements are connected to each other by a bus which is a data transferring path.

The ROM (not illustrated) stores a program to be used by the control unit 104 and control data such as an arithmetic parameter. The RAM (not illustrated) temporarily stores the program executed by the control unit 104.

The storage unit (not illustrated) is storage means included in the information processing device 100 and stores, for example, the data indicating the target world model M1 of each sensor 200, the data indicating the target world model M2 of each carried device 300, the data indicating the target world model M3 in the entire target space, data related to the first information processing method according to the embodiment, such as the preparation information of each sensor 200, and various kinds of data such as various applications. Here, as the storage unit (not illustrated), for example, a magnetic recording medium such as a hard disk or a nonvolatile memory such as a flash memory can be exemplified. In addition, the storage unit (not illustrated) may be detachably mounted on the information processing device 100.

As the operation unit (not illustrated), an operation input device to be described below can be exemplified. In addition, as the display unit (not illustrated), a display device to be described below can be exemplified.

[Example of Hardware Configuration of Information Processing Device 100]

Figure 13:
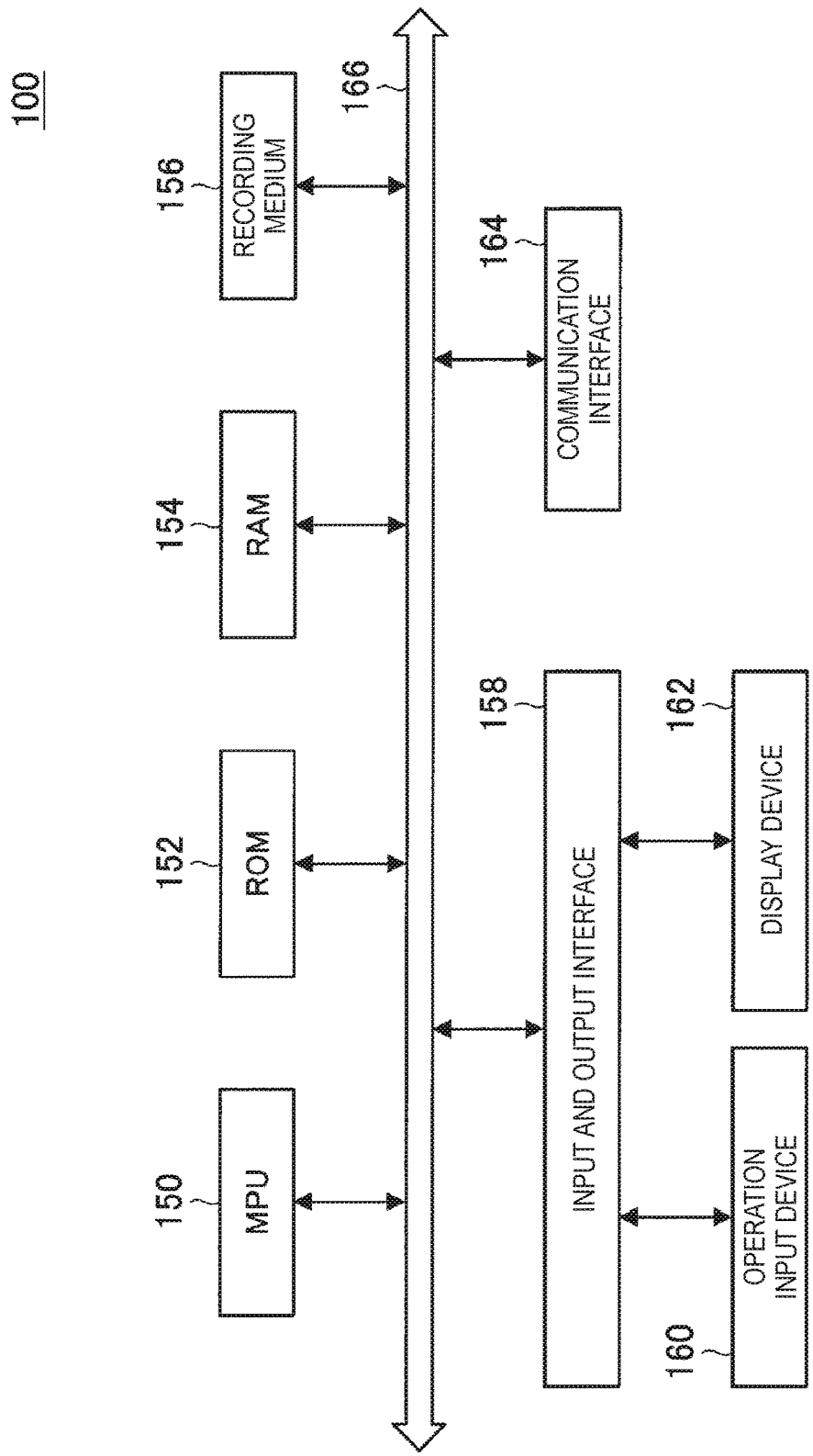
FIG. 13 is an explanatory diagram illustrating an example of a hardware configuration of the information processing device according to the embodiment capable of performing the process related to the first information processing method according to the embodiment.

FIG. 13 is an explanatory diagram illustrating an example of a hardware configuration of the information processing device 100 according to the embodiment capable of performing the process related to the first information processing method according to the embodiment. The information processing device 100 includes, for example, an MPU 150, a ROM 152, a RAM 154, a recording medium 156, an input and output interface 158, an operation input device 160, a display device 162, and a communication interface 164. In addition, in the information processing device 100, for example, the constituent elements are connected to each other by a bus 166 which is a data transferring path.

The MPU 150 is configured of an arithmetic circuit such as a microprocessing unit (MPU) and is configured to include one or two or more processors or various processing circuits and functions as the control unit 104 that controls the entire information processing device 100. In addition, the MPU 150 serves as, for example, a processing unit 110 to be described in the information processing device 100. Also, the processing unit 110 may be configured of a dedicated (or general-purpose) circuit capable of realizing a process.

The ROM 152 stores a program to be used by the MPU 150 or control data such as an arithmetic parameter. The RAM 154 temporarily stores, for example, the program executed by the MPU 150.

The recording medium 156 functions as a storage unit (not illustrated) and stores, for example, the data indicating the target world model M1 of each sensor 200, the data indicating the target world model M2 of each carried device 300, the data indicating the target world model M3 in the entire target space, the data related to the first information processing method according to the embodiment, such as the preparation information of each sensor 200, and various kinds of data such as various applications. Here, as the recording medium 156, for example, a magnetic recording medium such as a hard disk or a nonvolatile memory such as a flash memory can be exemplified. In addition, the recording medium 156 may be detachably mounted on the information processing device 100.

The input and output interface 158 connects, for example, the operation input device 160 or the display device 162. The operation input device 160 functions as an operation unit (not illustrated). In addition, the display device 162 functions as a display unit (not illustrated). Here, as the input and output interface 158, for example, a Universal Serial Bus (USB) terminal, a Digital Visual Interface (DVI) terminal, a High-Definition Multimedia Interface (HDMI) (registered trademark) terminal, or various processing circuits can be exemplified.

In addition, for example, the operation input device 160 is included on the information processing device 100 and is connected to the input and output interface 158 inside the information processing device 100. As the operation input device 160, for example, a button, a direction key, a rotary selector such as a jog dial, or a combination thereof can be exemplified.

In addition, for example, the display device 162 is included on the information processing device 100 and is connected to the input and output interface 158 inside the information processing device 100. As the display device 162, for example, a liquid crystal display, an organic electroluminescence (EL) display, or an organic light emitting diode (OLED) display can be exemplified.

Also, it is needless to say that the input and output interface 158 can be connected to an external device such as an external operation input device (for example, a keyboard or a mouse) or an external display device which is an external device of the information processing device 100. In addition, the display device 162 may be, for example, a device such as a touch panel capable of performing display or a user operation.

The communication interface 164 is communication means included in the information processing device 100 and functions as the communication unit 102 that performs wireless or wired communication with an external device such as the sensor 200 or the carried device 300 via a network (or directly). Here, as the communication interface 164, for example, a communication antenna and a radio frequency (RF) circuit (wireless communication), an IEEE 802.15.1 port and a transmission and reception circuit (wireless communication), an IEEE 802.11 port and a transmission and reception circuit (wireless communication), or a LAN terminal and a transmission and reception circuit (wired communication) can be exemplified.

For example, in the configuration illustrated in FIG. 13, the information processing device 100 performs the process related to the first information processing method according to the embodiment. Also, the hardware configuration of the information processing device 100 according to the embodiment is not limited to the configuration illustrated in FIG. 13.

For example, when communication with an external device is performed via a connected external communication device, the information processing device 100 may not include the communication interface 164. In addition, the communication interface 164 may be configured to be able to perform communication with one device or two or more external devices in conformity to a plurality of communication schemes.

In addition, for example, the information processing device 100 may be configured not to include the recording medium 156 or the operation input device 160 and the display device 162.

In addition, for example, the configuration illustrated in FIG. 13 (or a configuration according to a modification example) may be realized with one integrated circuit (IC) or two or more ICs.

Referring back to FIG. 12, an example of the configuration of the information processing device 100 will be described. The communication unit 102 is communication means included in the information processing device 100 and performs wireless or wired communication with an external device such as the sensor 200 or the carried device 300 via a network (or directly). In addition, for example, communication of the communication unit 102 is controlled by the control unit 104.

Here, as the communication unit 102, for example, a communication antenna and an RF circuit or a LAN terminal and a transmission and reception circuit can be exemplified, but the configuration of the communication unit 102 is not limited thereto. For example, the communication unit 102 can have a configuration corresponding to any standard capable of performing communication of a USB terminal and a transmission and reception circuit or the like or any configuration capable of communicating with an external device via a network. In addition, the communication unit 102 may be configured to be able to perform communication with one external device or two or more external devices in accordance with a plurality of communication schemes.

The control unit 104 is configured of, for example, an MPU and serves to control the entire information processing device 100. In addition, for example, the control unit 104 includes the processing unit 110 and takes a leading role of performing the process related to the first information processing method according to the embodiment.

The processing unit 110 takes a leading role of performing the process of generating the preparation information and performs the process of generating the preparation information on the basis of the first output information regarding the first target acquired from the sensor 200 and the second output information regarding the second target acquired from the carried device 300. For example, the processing unit 110 corrects the preparation information on the basis of the first output information regarding the first target acquired from the sensor 200 and the second output information regarding the second target related to the first target and acquired from the carried device 300.

In addition, the processing unit 110 may further perform the predetermined process according to the embodiment. For example, the processing unit 110 performs one or both of (I) the foregoing process (the conversion process) and (II) foregoing process (the execution control process) as the predetermined process according to the embodiment.

For example, the control unit 104 includes the processing unit 110 and takes a leading role of performing the process related to the first information processing method according to the embodiment (for example, the process of generating the preparation information and the predetermined process).

For example, in the configuration illustrated in FIG. 12, the information processing device 100 performs the process related to the first information processing method according to the embodiment (for example, the process of generating the preparation information and the predetermined process).

Accordingly, for example, in the configuration illustrated in FIG. 12, the information processing device 100 can achieve the improvement in the convenience for the user when a sensor that senses a predetermined range of a space is used.

In addition, for example, in the configuration illustrated in FIG. 12, it is possible to obtain the advantageous effects obtained by the information processing device 100 performing the process related to the first information processing method according to the embodiment described above.

Also, a configuration of the information processing device according to the embodiment is not limited to the configuration illustrated in FIG. 12.

For example, the information processing device according to the embodiment can include the processing unit 110 (for example, realized by another processing circuit such as a processor) illustrated in FIG. 12 separately from the control unit 104.

In addition, as described above, "the process of generating the preparation information" or "the process of generating the preparation information and the predetermined process" are separated processes of the process related to the first information processing method according to the embodiment for convenience. Accordingly, a configuration for realizing the process related to the first information processing method according to the embodiment is not limited to the processing unit 110 illustrated in FIG. 12, but a configuration in accordance with the method of separating the process related to the first information processing method according to the embodiment can be adopted.

In addition, for example, when communication is performed with an external device via an external communication device having the same function and configuration as the communication unit 102, the information processing device according to the embodiment may not include the communication unit 102.

In addition, the information processing device according to the embodiment may have, for example, a configuration in which the processing unit 110 illustrated in FIG. 12 may not perform the predetermined process.

For example, even in the configuration in which the processing unit 110 illustrated in FIG. 12 does not perform the predetermined process, the information processing device according to the embodiment can perform the process of generating the preparation information. Thus, when a sensor that senses a predetermined range of a space is used, it is possible to improve convenience for the user. In addition, for example, even in the configuration in which the processing unit 110 illustrated in FIG. 12 does not perform the predetermined process, the information processing device according to the embodiment can obtain the advantageous effects obtained through the process of generating the preparation information.

The information processing device has been described as an example according to the embodiment, but an embodiment is not limited to the embodiment. The embodiment can be applied to, for example, various devices capable of performing the process related to the first information processing method according to the embodiment, such as a computer such as a personal computer (PC) or a server, a sensor according to the embodiment installed in a space, a communication device such as a cellular phone or smartphone, or a tablet device. In addition, the embodiment can also be applied to, for example, a processing IC which can be embedded in the foregoing device.

In addition, the information processing device according to the embodiment may be applied to, for example, a system formed by one device or two or more devices on the assumption that the devices are connected to a network (or communication is performed between the devices), such as cloud computing. That is, the information processing device according to the embodiment described above can also be realized as, for example, an information processing system in which the process related to the first information processing method according to the embodiment is performed by a plurality of devices.

(First Program According to Embodiment)

By causing a processor or the like in a computer to execute a program (for example, a program capable of performing the process related to the first information processing method according to the embodiment, such as "the process of generating the preparation information" or "the process of generating the preparation information and the predetermined process") causing the computer to function as a first information processing device according to the embodiment, it is possible to achieve convenience for the user when a sensor that senses a predetermined range of a space is used.

In addition, when the program causing the computer to function as the first information processing device according to the embodiment is executed by the processor or the like in the computer, it is possible to obtain the advantageous effects obtained through the process related to the first information processing method according to the embodiment described above.

(Second Information Processing Method According to Embodiment)

Before a configuration of an information processing device according to an embodiment is described, a second information processing method according to the embodiment will first be described. Hereinafter, the second information processing method according to the embodiment will be described exemplifying a case in which the information processing device according to the embodiment performs a process related to the second information processing method according to the embodiment.

[I] Overview of Second Information Processing Method According to Embodiment

First, an overview of the second information processing method according to the embodiment will be described.

As described above, in the system in which an operation such as execution of an application can be performed on the basis of a recognition result of a motion of an object such as a user, a plurality of sensors are disposed in a space in order to improve a UX in some cases.

Figure 14A:
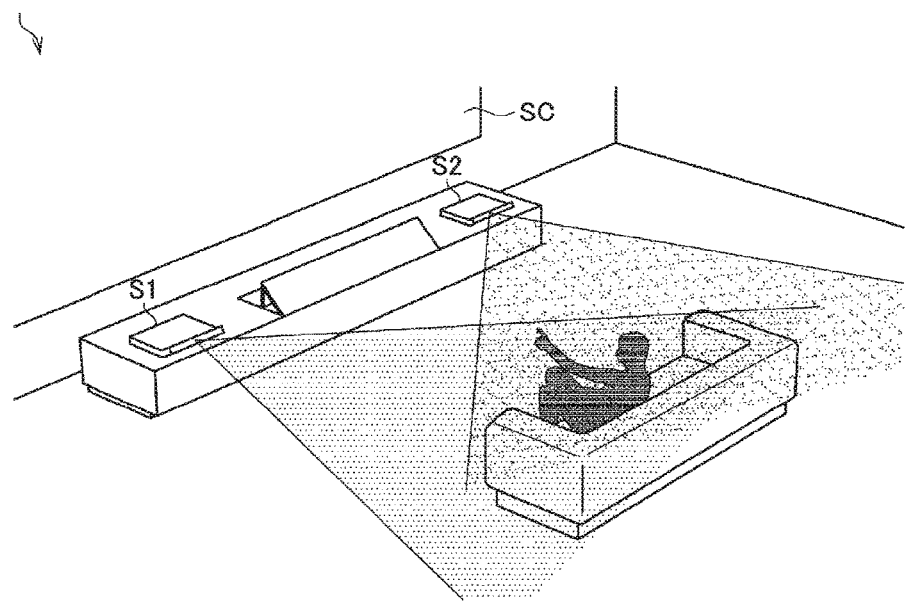
FIGS. 14A and 14B are explanatory diagrams illustrating an overview of a second information processing method according to the embodiment.
Figure 14B:
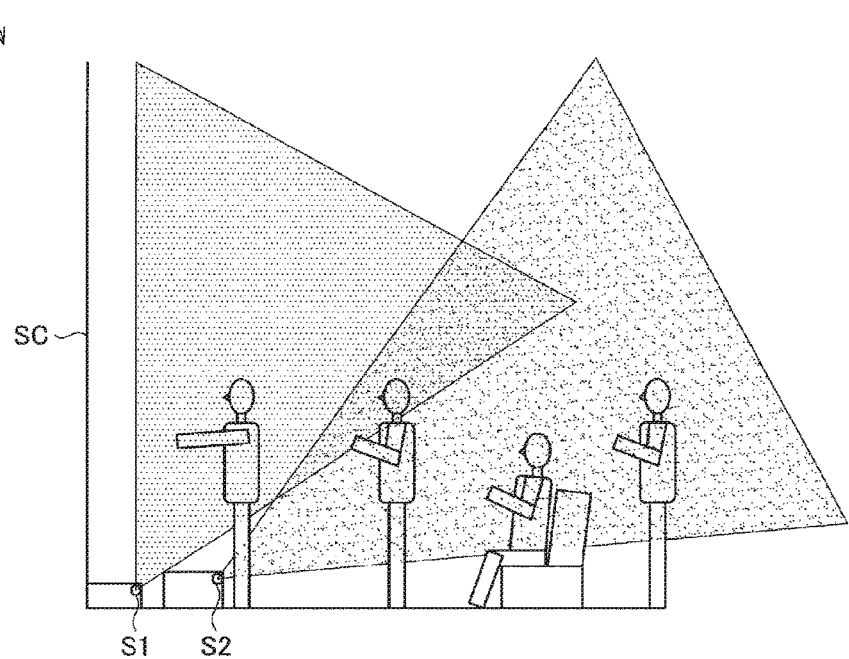

FIGS. 14A and 14B is an explanatory diagram illustrating an overview of the second information processing method according to the embodiment and illustrates a use case in which a user performs an operation to operate a UI using his or her body, such as a pointing action, on a screen SC (an example of a display screen) on which the UI is displayed. FIG. 14A illustrates an example in which sensors S1 and S2 are disposed on the left and right sides of the screen SC. FIG. 14B illustrates an example in which the sensors S1 and S2 are disposed in the front and rear side of the screen SC.

Here, as the sensor according to the embodiment, for example, an image sensor which configures a stereo image sensor or a depth sensor of any scheme such as a TOF scheme can be exemplified. In addition, the sensor according to the embodiment may be, for example, any sensor capable of setting a space as a sensing range and outputting output information available in recognition of a gesture in the space. That is, the sensor according to the embodiment is, for example, a sensor that senses an operation instruction from the user. In the example illustrated in FIG. 14A, a case in which the sensors S1 and S2 are image sensors which configure a stereo image sensor is illustrated. In addition, in the example illustrated in FIG. 14B, an example in which the sensor S1 is a depth sensor setting a range closer to the screen SC as a sensing range and the sensor S2 is a depth sensor setting a range more distant from the screen SC as a sensing range is illustrated.

As in the use case illustrated in FIGS. 14A and 14B, in the system in which the plurality of sensors are disposed, for example, a process on the basis of output information of the sensors, such as recognition of a gesture or an execution of an application, is performed on the basis of the output information of each sensor.

Here, as one method of improving a UX of a user using the foregoing system, a method of further improving detection precision of the sensor can be exemplified. In addition, as one method of further improving the detection precision of the sensor, for example, a method of calibrating the sensor when a sensor is newly installed or a position at which the sensor is installed is moved can be exemplified.

It is possible to realize calibration of a sensor, for example, by using a dedicated calibration jig such as a calibration board or a light-emitting sphere disclosed in JP 2009-071844A applied by the applicant of the present specification.

However, for example, whenever a situation in which it is desirable to calibrate a sensor arises, for example, whenever a sensor is newly installed or a position at which a sensor is installed is moved, there is concern of an excessive burden being imposed on a user when the sensor is calibrated using the foregoing dedicated calibration jig.

Accordingly, an information processing device according to the embodiment calibrates a target sensor to be newly calibrated using output information of the sensor on which the calibration is performed.

In addition, the information processing device according to the embodiment may perform a predetermined process on the basis of output information of each sensor on which calibration is performed, as described above. As the predetermined process according to the embodiment, for example, any process which can be realized using the output information of the sensor, such as a process of recognizing a gesture, can be exemplified.

In addition, for example, the information processing device according to the embodiment may cause a control target to perform a process based on the output information of the sensor, such as a process of recognizing a gesture. As the control target according to the embodiment, for example, one or both of the self-device (the information processing device according to the embodiment) and an external device of the information processing device according to the embodiment can be exemplified. In addition, as the process based on the output information of the sensor according to the embodiment, for example, various processes such as execution of an application and a process related to control of a UI can be exemplified.

For example, as described above, when the information processing device according to the embodiment calibrates a sensor to be newly calibrated using a detection result of the sensor on which the calibration is performed, it is not necessary for the user to calibrate the sensor using the foregoing dedicated calibration jig, for example, whenever a sensor is newly installed.

In addition, the user using a system which performs a predetermined process on the basis of output information of each sensor on which calibration is performed, as described above, for example, the system related to the use case illustrated in FIGS. 14A and 14B, can perform an intended UI operation in the system by performing a gesture.

Accordingly, by using the second information processing method according to the embodiment, it is possible to achieve an improvement in convenience for the user when a plurality of sensors are disposed.

[II] Process Related to Second Information Processing Method According to Embodiment Next, an example of a process related to the second information processing method according to embodiment will be described.

Figure 15:
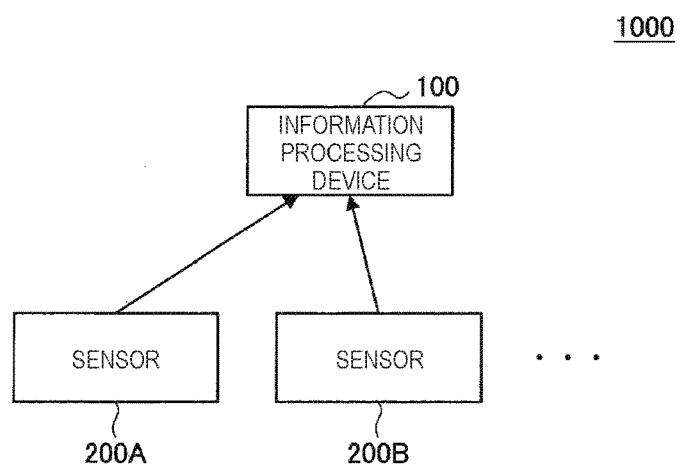
FIG. 15 is an explanatory diagram illustrating an example of a process related to the second information processing method according to the embodiment.

FIG. 15 is an explanatory diagram illustrating an example of a process related to the second information processing method according to embodiment. FIG. 15 illustrates an example of an information processing system 1000 according to the embodiment that includes an information processing device 100 performing the process related to the second information processing method according to embodiment.

The information processing system according to the embodiment includes, for example, the information processing device 100 and sensors 200A and 200B. Hereinafter, the plurality of sensors included in the information processing system according to the embodiment are collectively referred to as the "sensor 200" or one sensor included in the information processing system according to the embodiment is referred to as the "sensor 200" in some cases.

Also, in the information processing system according to the embodiment, for example, the information processing device 100 and the sensors 200 may be an integrated device. Hereinafter, a case in which the information processing device 100 and the sensors 200 are different devices, as illustrated in FIGS. 14A and 14B, will be exemplified.

[II-1] Sensor 200

For example, as the sensors S1 and S2 in FIGS. 14A and 14B are indicated, the sensors 200 are installed in a space. The sensors 200 sense sensing ranges in the space and transmit output information (data) to the information processing device 100. For example, in a use case illustrated in FIGS. 14A and 14B, the output information of the sensors 200 is used to detect, for example, a body part (for example, an arm or a finger) of the user as an object.

Here, as the output information transmitted by the sensors 200, for example, data with which target position information within the sensing ranges can be gained, such as captured image data or data indicating a depth value, can be exemplified.

In addition, as the position information based on the output information of the sensors 200, for example, coordinate data in which a position is represented with coordinate values of a relative spatial coordinate system to the sensors 200 can be exemplified. For example, when the output information is captured image data or data indicating a depth value, a process of gaining the position information based on the output information is performed in, for example, the information processing device 100 or an external device of the information processing device 100 such as a server. For example, the information processing device 100 or the external device gains the position information through a process related to any method capable of gaining the position information from the image data in which the output information is captured, the data indicating a depth value, or the like.

Also, the output information according to the embodiment may be, for example, coordinate data in which a position is represented with coordinate values of the relative spatial coordinate system to the sensors 200. Hereinafter, coordinates in the relative spatial coordinate system to the sensors 200 in regard to each sensor 200 are referred to as "relative spatial coordinates" in some cases.

Figure 16:
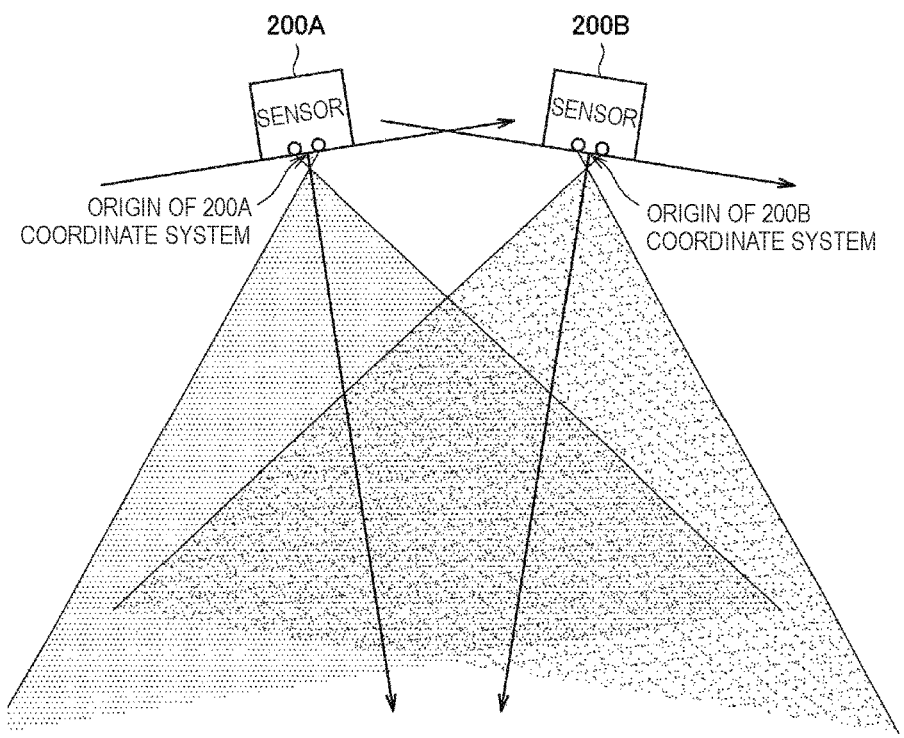
FIG. 16 is an explanatory diagram illustrating an example of a process related to the second information processing method according to the embodiment.

FIG. 16 is an explanatory diagram illustrating an example of the process related to the second information processing method according to the embodiment and illustrates an example of the relative spatial coordinate system to the sensors 200. Also, FIG. 16 illustrates an example of a coordinate system when the sensors 200 are viewed from the upper surface for convenience.

For example, as illustrated in FIG. 16, the relative spatial coordinates are represented with, for example, spatial coordinates for which the position of the sensor 200 is set as the origin. That is, the relative spatial coordinate system to the sensors 200 differs for each sensor 200.

For example, the sensors 200 perform wireless or wired communication with the information processing device 100 via a network (or directly). As the network according to the embodiment, for example, a wired network such as LAN or WAN, a wireless network such as wireless LAN (WLAN), or the Internet using a communication protocol such as Transmission Control Protocol/Internet Protocol (TCP/IP) can be exemplified.

[II-2] Information Processing Device 100

The information processing device 100 acquires the output information from each sensor 200. Then, the information processing device 100 performs, for example, (I) the following association process as the process related to the second information processing method according to the embodiment on the basis of the output information of each sensor 200.

(I) Association Process

The information processing device 100 calibrates the sensor 200 to be newly calibrated using the output information of the sensor 200 on which the calibration is performed.

Here, as the sensor 200 on which the calibration according to the embodiment is performed, the sensor 200 associated with a predetermined coordinate system can be exemplified. Hereinafter, the sensor 200 associated with the predetermined coordinate system is referred to as a "first sensor" or a "reference sensor" in some cases. In addition, hereinafter, the output information of the sensor 200 associated with the predetermined coordinate system is referred to as "first output information" in some cases.

As the predetermined coordinate system according to the embodiment, for example, a spatial coordinate system in which any position on the screen SC illustrated in FIGS. 14A and 14B are set as the origins (hereinafter referred to as a "screen coordinate system" in some cases) can be exemplified. Here, the screen SC illustrated in FIGS. 14A and 14B are display screens on which an operation target (for example, an icon related to a UI) operated on the basis of the output information of the sensors S1 and S2 (examples of the sensors 200) is displayed. That is, hereinafter, the screen coordinate system can be said to be a coordinate system related to a display screen on which an operation target operated on the basis of the output information of the sensors 200 is displayed.

Also, the predetermined coordinate system according to the embodiment is not limited to the foregoing screen coordinate system. A spatial coordinate system that has any position which can represent a position in a space as the origin can be exemplified. That is, a position in a space can be represented by coordinates indicating an absolute position for which the origin of the predetermined coordinate system is a reference. Hereinafter, coordinates represented by the predetermined coordinate system according to the embodiment are referred to as "absolute space coordinates" in some cases.

Here, as the reference sensor (a first sensor) according to the embodiment, for example, the sensor 200 associated with the predetermined coordinate system in accordance with any method capable of associating the sensor with the predetermined coordinate system, for example, the sensor 200 associated with the predetermined coordinate system using the dedicated calibration jig such as a light-emitting sphere disclosed in JP 2009-071844A applied by the applicant of the present specification, can be exemplified. In addition, the reference sensor according to the embodiment may also be, for example, the sensor 200 associated with the predetermined coordinate system in accordance with the second information processing method according to the embodiment.

The target sensor 200 on which the calibration according to the embodiment is performed is the sensor 200 different from the reference sensor (the first sensor). Hereinafter, the sensor 200 different from the reference sensor (the first sensor) is referred to as a "second sensor" or a "target sensor" in some cases. In addition, output information of the target sensor (the second sensor) is referred to as "second output information" in some cases. A specific example of the target sensor (the second sensor) according to the embodiment will be described below.

More specifically, for example, the information processing device 100 associates the target sensor (the second sensor) with the predetermined coordinate system on the basis of the first output information acquired from the reference sensor (the first sensor) and the second output information acquired from the target sensor (the second sensor).

Here, position information of the sensor 200 based on the output information of the sensor 200 is represented with relative spatial coordinates corresponding to the relative spatial coordinate system of each sensor 200, for example, as illustrated in FIG. 16. The information processing device 100 calibrates the sensor 200 by performing the association process of associating the sensor 200 (the second sensor) which is the target sensor with the predetermined coordinate system.

Here, the association process according to the embodiment is, for example, a process of generating information used to calculate predetermined coordinate values in the predetermined coordinate system on the basis of the output information (the second output information) of the sensor 200 which is the target sensor. More specifically, the association process according to the embodiment is, for example, a process of generating information used for a process of converting the output information (the second output information) of the sensor 200 which is the target sensor into coordinate values in the predetermined coordinate system.

Hereinafter, the information used for the process of converting the second output information according to the embodiment into coordinate values in the predetermined coordinate system (that is, the information used to calculate the predetermined coordinate values in the predetermined coordinate system on the basis of the second output information) is referred to as "conversion information" or "screen coordinate system conversion information" in some cases.

For example, the information processing device 100 sets the sensor 200 detecting the same object as the reference sensor (the first sensor) among the plurality of sensors 200 as the target sensor (the second sensor). Then, for example, the information processing device 100 generates the conversion information for associating the target sensor with the predetermined coordinate system (the information used for the process of converting the second output information according to the embodiment into coordinate values in the predetermined coordinate system) on the basis of the first output information of the reference sensor and the second output information of the target sensor.

Here, when the same object in both the reference sensor and the target sensor is detected, absolute spatial coordinates based on the first output information of the reference sensor match absolute spatial coordinates based on the second output information of the target sensor. Accordingly, the information processing device 100 associates the target sensor with the predetermined coordinate system by generating conversion information for matching the absolute spatial coordinates based on the first output information of the reference sensor to the absolute spatial coordinates based on the second output information of the target sensor.

Specifically, as the target sensor (the second sensor) according to the embodiment, for example, the sensors 200 in the following (a) to (c) can be exemplified:

(a) the sensor 200 which is not associated with the predetermined coordinate system;

(b) the sensor 200 in which deviation occurs in the association with the predetermined coordinate system among the sensors 200 associated with the predetermined coordinate system; and (c) the sensor 200 in which set reliability is equal to or less than a set threshold or the sensor 200 in which the reliability is less than the threshold among the sensors 200 associated with the predetermined coordinate system.

As the target sensor related to the foregoing (a), for example, a newly disposed sensor 200 can be exemplified. For example, when communication with the new sensor 200 is established, the information processing device 100 recognizes the sensor 200 as a target sensor related to the foregoing (a).

As the target sensor related to the foregoing (b), for example, the sensor 200 for which there is a possibility of a disposition position being changed among the sensors 200 associated with the predetermined coordinate system can be exemplified.

For example, the information processing device 100 determines whether the position of the sensor 200 is changed on the basis of information regarding a disposition position acquired from the sensor 200 associated with the predetermined coordinate system and recognizes the sensor 200 of which the position is determined to be changed as the target sensor related to the foregoing (b).

As the information regarding the disposition position according to the embodiment, for example, position data of the sensor 200 detected by a position detection device such as a Global Positioning System (GPS) device or data indicating a motion of the sensor 200 detected by a sensor capable of detecting a motion of an acceleration sensor or a gyro sensor can be exemplified. The position detection device or the sensor capable of detecting the motion may be, for example, a device including the sensors 200 or may be an external device connected to the sensors 200.

For example, the information processing device 100 determines whether the position of the sensor 200 is changed by performing threshold processing using the information regarding the disposition position acquired from the sensor 200.

Also, a method of determining whether the position of the sensor 200 is changed is not limited to the foregoing example.

For example, the information processing device 100 can also determine whether the position of the sensor 200 is changed on the basis of a detection result of the sensor 200 associated with the predetermined coordinate system. An example of a process of determining whether the position of the sensor 200 is changed on the basis of a detection result of the sensor 200 associated with the predetermined coordinate system and performing the association with the predetermined coordinate system again will be described below.

In addition, the reliability related to the foregoing (c) is set in each sensor 200 associated with the predetermined coordinate system in accordance with, for example, the following indexes by the information processing device 100 or an external device of the information processing device 100 such as a server. Also, it is needless to say that the reliability according to the embodiment is not limited to the reliability set in accordance with the following indexes:

an elapsed time from the association with the predetermined coordinate system (for example, the reliability is set such that the reliability is lower as the elapsed time is longer or, for example, the reliability may be set such that the reliability is higher as the elapsed time is longer);

a period in which a predetermined action by a user, such as a pointing action in the use case in FIGS. 14A and 14B are continuously detected (for example, the reliability is set such that the reliability is lower as this period is longer); and a combination of the elapsed time and the period in which the predetermined action is continuously detected.

In addition, the threshold related to the foregoing (c) may be a fixed value which is set in advance or may be a variable value which can be changed through an operation of the user or the like of the information processing device 100.

For example, as described above, the information processing device 100 sets the sensor 200 detecting the same object as the reference sensor as the target sensor and associates the target sensor with the predetermined coordinate system on the basis of the first output information of the reference sensor and the second output information of the target sensor.

Accordingly, the information processing device 100 can calibrate the target sensor which is the sensor 200 to be newly calibrated using the first output information of the reference sensor which is the sensor 200 on which the calibration is performed.

The information processing device 100 performs, for example, (1) the foregoing process (the association process) as the process related to the second information processing method according to the embodiment.

Here, in (1) the foregoing process (the association process), the information processing device 100 associates the target sensor with the predetermined coordinate system on the basis of the first output information of the reference sensor (the first sensor) and the second output information of the target sensor (the second sensor).

Accordingly, the target sensor which is the sensor 200 to be newly calibrated can be calibrated using the output information of the reference sensor 200 which is the sensor on which the calibration is performed. Therefore, even several sensors 200 can be installed anywhere in the space without imposing an excessive burden on the user.

Accordingly, the information processing device 100 performs (1) the foregoing process (the association process) as the process related to the second information processing method according to the embodiment. Thus, it is possible to achieve an improvement in convenience for the user when the plurality of sensors are disposed.

Also, the process related to the second information processing method according to the embodiment is not limited to (1) the foregoing process (the association process). For example, the information processing device 100 can also further perform (2) the following execution process as the process related to the second information processing method according to the embodiment.

(2) Execution Process

The information processing device 100 performs a predetermined process on the basis of the output information of each sensor 200 associated with the predetermined coordinate system. The information processing device 100 performs the predetermined process on the basis of one or both of the first output information acquired from the reference sensor (the first sensor) and the second output information acquired from the target sensor (the second sensor) associated with the predetermined coordinate system.

As the predetermined process according to the embodiment, as described above, for example, any process which can be realized using the output information of the sensors, such as a process of recognizing a gesture, can be exemplified.

In addition, for example, the information processing device 100 may cause a control target to perform a process based on the output information of the sensors, such as a process of recognizing a gesture.

As a control target on which the information processing device 100 performs a process, for example, one or both of the self-device (the information processing device 100) and an external device of the information processing device 100 can be exemplified.

For example, the information processing device 100 detects a change in the position of an object in the space in accordance with one or both of a change in position information based on the first output information and a change in position information based on the second output information. Also, a process related to the detection of the change in the position of the object may be performed in an external device of the information processing device 100 such as a server.

For example, the information processing device 100 recognizes a gesture on the basis of the change in the position of the object in the space.

In addition, the information processing device 100 decides a process based on output information and caused to be performed by the control target on the basis of the change in the position of the object in the space. For example, the information processing device 100 decides a process corresponding to the recognized gesture as the process based on the output information using a table (or a database) in which the gesture and the process are associated. Then, the information processing device 100 causes the control target to perform the process based on the output information by delivering a process request including a command to perform the decided process to the control target.

Here, as the process based on the output information, for example, any process which can be performed using the output information of the sensor 200, such as a process of executing an application corresponding to an operation in response to an operation on a UI displayed on the screen SC (an example in the use case illustrated in FIGS. 14A and 14B), can be exemplified. A specific example of the process based on the output information will be described below.

The information processing device 100 can also perform, for example, (1) the foregoing process (the association process) and (2) the foregoing process (the execution process) as the process related to the second information processing method according to the embodiment.

Here, the information processing device 100 performs the foregoing predetermined process on the basis of the output information of the sensor 200 associated with the predetermined coordinate system, that is, the sensor 200 on which the calibration is performed, in (2) the foregoing process (the execution process).

Accordingly, by performing (2) the foregoing process (the execution process), for example, it is possible to cause the control target to perform the process using a result obtained by detecting the target in the space more accurately. Therefore, for example, it is possible to raise a possibility of performing a process intended by the user, in accordance with an action of the user in the use case in which the UI illustrated in FIGS. 14A and 14B are operated. In addition, by performing (2) the foregoing process (the execution process), it is possible to further improve operability and convenience for the user.

Accordingly, the information processing device 100 performs (1) the foregoing process (the association process) and (2) the foregoing process (the execution process) as the process related to the second information processing method according to the embodiment. Thus, when the plurality of sensors are disposed, it is possible to achieve convenience for the user.

Also, (1) the foregoing process (the association process) and (2) the foregoing process (the execution process) are separated processes of the process related to the second information processing method according to the embodiment for convenience. Accordingly, in the process related to the second information processing method according to the embodiment, for example, (1) the foregoing process (the association process) and (2) the foregoing process (the execution process) can be comprehended as one process. In addition, (1) the foregoing process (the association process) and (2) the foregoing process (the execution process) can also be comprehended as two or more processes (in accordance with any separation method).

[III] Specific example of process related to second information processing method according to embodiment Hereinafter, the process related to the second information processing method according to the embodiment will be described specifically. Hereinafter, a case in which the information processing device 100 performs (1) the foregoing process (the association process) and (2) the foregoing process (the execution process) as the process related to the second information processing method according to the embodiment will be exemplified. In addition, hereinafter, a case in which the information processing system 1000 is applied to the use case in which the UI illustrated in FIGS. 14A and 14B are operated will be mainly exemplified.

(1) Association Process

As described above, the information processing device 100 associates the target sensor with the predetermined coordinate system on the basis of the first output information of the reference sensor (the first sensor) and the second output information of the target sensor (the second sensor).

Figure 17:
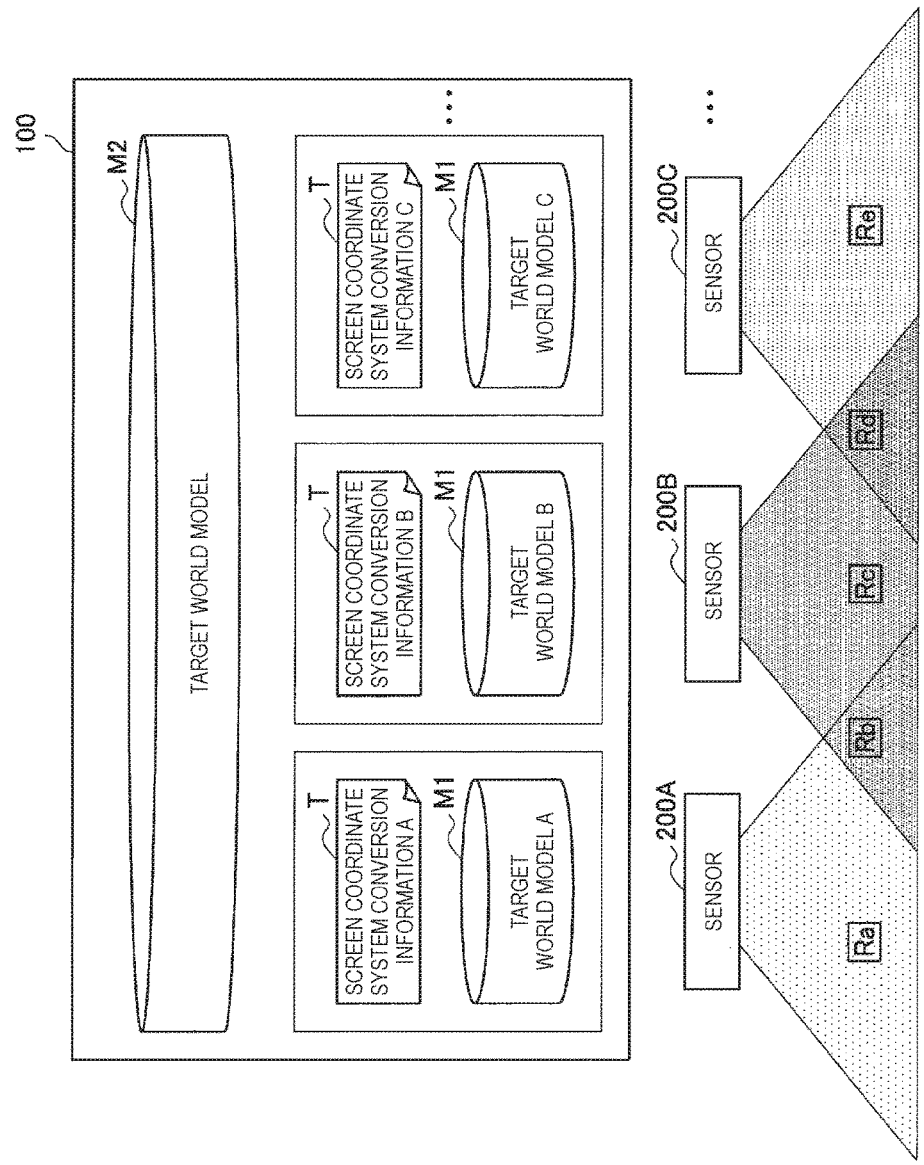
FIG. 17 is an explanatory diagram illustrating an example of a process related to the second information processing method according to the embodiment.

FIG. 17 is an explanatory diagram illustrating an example of the process related to the second information processing method according to the embodiment.

For example, the information processing device 100 updates the target world model M1 of each sensor 200 on the basis of the output information acquired from each sensor 200 and manages the relative spatial coordinates in regard to each sensor 200 (coordinates in the relative spatial coordinate system to the sensor 200).

FIGS. 18A, 18B and 18C are explanatory diagrams illustrating an example of the data indicating target world models according to the embodiment. FIG. 18A illustrates an example of the data indicating the target world model M1 of the sensor 200A illustrated in FIGS. 18A, 18B and 18C. FIG. 18B and FIG. 18C illustrate examples of the data indicating the target world models M1 of the sensors 200B and 200C illustrated in FIGS. 18A, 18B and 18C, respectively.

The target world model M1 is, for example, a data model in which a target (hereinafter referred to as an "object") detected on the basis of the output information of the sensor 200 in a space is associated with relative spatial coordinates of the object and which is retained chronologically. As the data indicating the target world model M1, for example, data indicating an object detected on the basis of the output information of the sensor 200, as illustrated in FIGS. 18A, 18B and 18C, and a table (or a database) with which relative spatial coordinates of the object are associated and which is recorded chronologically can be exemplified.

For example, the information processing device 100 appropriately updates the data indicating the target world model M1 stored in a storage medium such as a storage unit (to be described below) included in the information processing device 100 or an external recording medium connected to the information processing device 100 on the basis of the output information acquired from the sensor 200. Also, as described above, the process of gaining the position information on the basis of the output information may be performed in the information processing device 100 or may be performed in an external device of the information processing device 100.

Referring to, for example, the data indicating the target world model M1 illustrated in FIGS. 18A, 18B and 18C, the information processing device 100 can acquire a change in the relative spatial coordinates of an object detected on the basis of the output information of the sensor 200, that is, a motion of the object in a view from the sensor 200.

Also, the data indicating the target world model M1 is not limited to the example illustrated in FIGS. 18A, 18B and 18C. For example, data indicating a time corresponding to the output information acquired from the sensor 200 may be further associated with the data indicating the target world model M1. As the time corresponding to the output information acquired from the sensor 200, for example, data indicating a time at which the output information is acquired or data indicating a time indicated by a timestamp of the first output information can be exemplified. sensor 200, for example, data indicating a time at which the output information is acquired or data indicating a time indicated by a timestamp of the first output information can be exemplified.

In addition, the generated screen coordinate system conversion information T is recorded on a recording medium such as a storage unit (to be described below), and thus the screen coordinate system conversion information T is set in the sensor 200B which is the target sensor.

In addition, for example, the information processing device 100 converts the relative spatial coordinates indicated by the data indicating the target world model M1 into absolute spatial coordinates by using a screen coordinate system conversion information T of each sensor 200.

Here, of the screen coordinate system conversion information T corresponding to the sensors 200, the screen coordinate system conversion information T corresponding to at least one sensor 200 is given in advance. The screen coordinate system conversion information T given in advance is gained by obtaining a parameter for converting the relative spatial coordinates into the absolute spatial coordinates, for example, using a dedicated calibration jig such as a light-emitting sphere disclosed in JP 2009-071844A applied by the applicant of the present specification.

In addition, the screen coordinate system conversion information T corresponding to sensors 200 other than the sensor 200 in which the screen coordinate system conversion information T is given in advance is generated through the association process according to the embodiment. Also, when there is the screen coordinate system conversion information T corresponding to the sensor 200, the screen coordinate system conversion information T is updated through the association process according to the embodiment.

For example, in an initial installation stage of the sensor 200, that is, a state in which each sensor 200 has no association relation, the screen coordinate system conversion information T is given in the sensor 200A and the screen coordinate system conversion information T of the sensors 200B and 200C which are the other sensors 200 are not set (that is, the screen coordinate system conversion information T of the sensors 200B, 200C, and the like is unknown).

When the initial installation stage of the sensors 200 is the foregoing example, for example, the information processing device 100 sets the sensor 200A as the reference sensor (the first sensor) and considers the sensor 200B of which the sensing range overlaps with the sensing range of the sensor 200A which is the reference sensor as the target sensor (the second sensor).

For example, when the sensor 200A is the reference sensor in the example illustrated in FIG. 17, the sensor 200 of which the sensing range overlaps with the sensing range of the reference sensor is the sensor 200B. In addition, when the sensor 200B is the reference sensor in the example illustrated in FIG. 17, the sensors 200 of which the sensing ranges overlap with the sensing range of the reference sensor are the sensors 200A and 200C. In addition, when the sensor 200C is the reference sensor in the example illustrated in FIG. 17, the sensor 200 of which the sensing range overlaps with the sensing range of the reference sensor is the sensor 200B.

Then, the information processing device 100 generates the screen coordinate system conversion information T corresponding to the sensor 200B using information regarding a detection result of an object based on output information of the sensor 200A which is the reference sensor (for example, the target world model A and the screen coordinate system conversion information A illustrated in FIG. 17) and information regarding a detection result of an object based on output information of the sensor 200B which is the target sensor (for example, the target world model B illustrated in FIG. 17). For example, the information processing device 100 generates the screen coordinate system conversion information T by obtaining the parameter for converting the relative spatial coordinates corresponding to the output information of the sensor 200B into the absolute spatial coordinates corresponding to the output information of the sensor 200A.

For example, as described above, by generating the screen coordinate system conversion information T corresponding to the sensor 200B, the detection result of the sensor 200B is associated with the predetermined coordinate system.

In addition, the sensor 200B associated with the predetermined coordinate system can serve as the reference sensor. Accordingly, when the sensor 200B is considered as the reference sensor, the information processing device 100 can set the sensor 200C of which the sensing range overlaps with the sensing range of the sensor 200B which is the reference sensor as the target sensor and generate the screen coordinate system conversion information T corresponding to the sensor 200C and can associate the detection result of the sensor 200C with the predetermined coordinate system.

For example, as described above, the information processing device 100 can set the sensor 200 associated with the predetermined coordinate system as the reference sensor and generate or update the screen coordinate system conversion information T of the target sensor which is the sensor 200 of which the sensing range overlaps with the sensing range of the reference sensor. In addition, by generating or updating the screen coordinate system conversion information T of the target sensor, the information processing device 100 can associate the target sensor with the predetermined coordinate system.

In addition, for example, the information processing device 100 aggregates the target world models M1 corresponding to the sensors 200 in accordance with the target world model M2 in an entire target space.

FIG. 19 is an explanatory diagram illustrating an example of data indicating a target world model according to the embodiment and illustrates an example of data indicating the target world model M2 in an entire processing target space.

The target world model M2 in the entire space is, for example, a data model in which an object detected from the target space, the absolute spatial coordinates of the object, and information indicating the object in the target world model M1 of the sensor 200 are associated. As the data indicating the target world model M2, for example, a table (or a database) in which data indicating an object detected from a target space, the absolute spatial coordinates of the object, and an ID indicating the object in the target world model M1 of the sensor 200 are associated, as illustrated in FIG. 19, can be exemplified.

Also, the data indicating the target world model M2 is not limited to the example illustrated in FIG. 19. For example, when data indicating a time corresponding to the output information acquired from the sensor 200 is associated with the data indicating the target world model M1, the data indicating the time corresponding to the output information acquired from the sensor 200 may be further associated with the data indicating the target world model M2.

When there is the corresponding screen conversion information T, the information processing device 100 reflects the data indicating the target world model M1 corresponding to the sensor 200 in the data indicating the target world model M2 using the corresponding screen conversion information T. In addition, when there is no corresponding screen conversion information T, the information processing device 100 does not reflect the data indicating the target world model M1 in the data indicating the target world model M2.

Hereinafter, an example of a process using the target world model M1 illustrated in FIG. 17 and the target world model M2 will be described as a specific example of the association process according to the embodiment.

Figure 20:
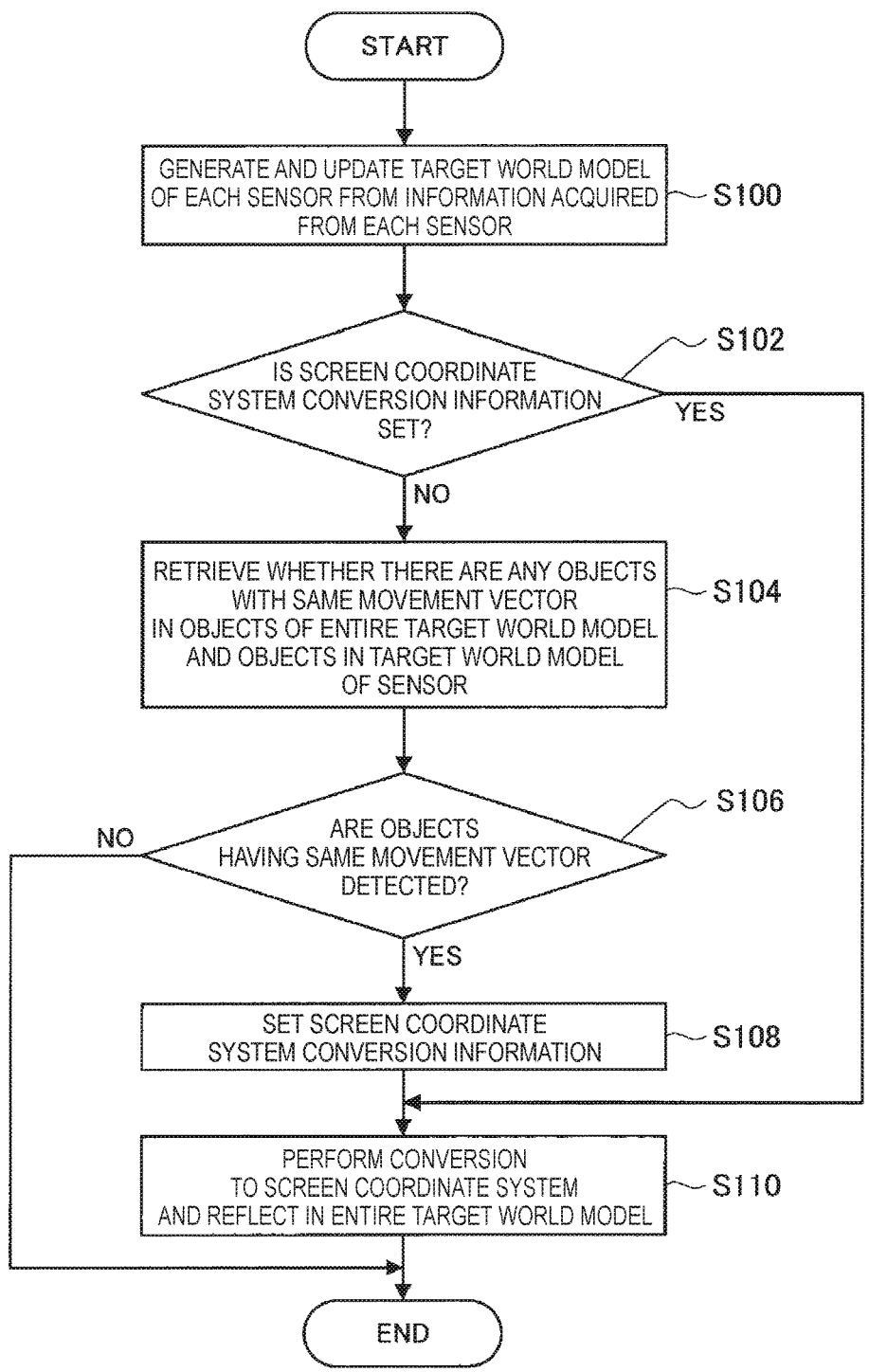
FIG. 20 is a flowchart illustrating an example of a process related to the second information processing method according to the embodiment.

FIG. 20 is a flowchart illustrating an example of the process related to the second information processing method according to the embodiment.

The information processing device 100 generates and updates the data indicating the target world model M1 corresponding to the sensor 200 on the basis of the output information acquired from each sensor 200 (S100).

The information processing device 100 determines whether the screen coordinate system conversion information T is set for each sensor 200 (S102). For example, when the screen coordinate system conversion information T corresponding to the sensor 200 is stored in a recording medium such as a storage unit (to be described below), the information processing device 100 determines that the screen coordinate system conversion information T is set.

The information processing device 100 performs, for example, a process of step S100 to be described below on the sensor 200 for which the screen coordinate system conversion information T is determined to be set in step S102 among the plurality of sensors 200.

In addition, for example, the sensor 200 for which the screen coordinate system conversion information T is determined not to be set in step S102 among the plurality of sensors 200 is the sensor 200 which becomes a target sensor. For a target sensor for which the screen coordinate system conversion information T is determined not to be set in step S102, the information processing device 100 detects objects which have the same movement vector from objects included in the data indicating the target world model M2 in the entire space and objects included in the data indicating the target world model M1 of the sensor 200 which is the target sensor (S104).

Then, the information processing device 100 determines whether the objects which have the same movement vector are detected (S106). Here, the determination of step S106 is equivalent to determination of whether the same object is detected on the basis of the first output information of the reference sensor and the second output information of the target sensor. For example, when the same amount of movement vector is detected from corresponding time data, the information processing device 100 determines that the objects which have the same movement vector are detected.

When the information processing device 100 determines in step S106 that the objects which have the same movement vector are not detected, the information processing device 100 ends the association process on the target sensor.

In addition, when the information processing device 100 determines in step S106 that the objects which have the same movement vector are detected, the information processing device 100 sets the screen coordinate system conversion information T in the sensor 200 which is the target sensor (S108). For example, the information processing device 100 sets the screen coordinate system conversion information T corresponding to the sensor 200B which is the target sensor using the information regarding the detection result of the object based on the output information of the sensor 200 which is the reference sensor (for example, the data indicating the target world model and the screen coordinate system conversion information) and the information regarding the detection result of the object based on the output information of the sensor 200 which is the target sensor (for example, the data indicating the target world model).

Here, as an example, for example, a case in which a detection result of an object "a" in the data indicating the target world model M2 illustrated in FIG. 19, that is, an object "IDA001" based on the output information of the sensor 200A illustrated in FIG. 18A, and an object "IDB001" based on the output information of the sensor 200B illustrated in FIG. 18B have the same amount of movement vector will be exemplified. At this time, the information processing device 100 generates, for example, the screen coordinate system conversion information T corresponding to the sensor 200B from the screen coordinate system conversion information T corresponding to the sensor 200a using the fact that the same object is detected on the basis of the output information of the sensor 200A corresponding to the reference sensor and the output information of the sensor 200B corresponding to the target sensor. In addition, the generated screen coordinate system conversion information T is recorded on a recording medium such as a storage unit (to be described below), and thus the screen coordinate system conversion information T is set in the sensor 200B which is the target sensor.

In addition, as described above, when the screen coordinate system conversion information T corresponding to the sensor 200B is generated from the screen coordinate system conversion information T corresponding to the sensor 200A, the information processing device 100 may record data indicating that the screen coordinate system conversion information T is shared between the sensors 200A and 200B in a recording medium such as a storage unit (to be described below), for example, at a time point related to the generation of the screen coordinate system conversion information T corresponding to the sensor 200B. The data indicating that the screen coordinate system conversion information T is shared between the sensors 200A and 200B is recorded in, for example, any format such as a table format. In addition, as the time point related to the generation of the screen coordinate system conversion information T corresponding to the sensor 200B, for example, a time point at which the screen coordinate system conversion information T corresponding to the sensor 200B is generated or a time point at which the screen coordinate system conversion information T corresponding to the sensor 200A is referred to can be exemplified.

The information processing device 100 can similarly set the screen coordinate system conversion information T, for example, even in another sensors 200 such as the sensor 200C illustrated in FIG. 17.

The information processing device 100 reflects the data indicating the target world model M1 corresponding to each sensor 200, in which the screen coordinate system conversion information T is set, in the data indicating the target world model M2 using the screen coordinate system conversion information T corresponding to each sensor 200 (S110). The information processing device 100 converts the relative spatial coordinates corresponding to the output information of each sensor 200 into the absolute spatial coordinates using the corresponding screen coordinate system conversion information T and reflects the data indicating the target world model M1 corresponding to each sensor 200 in the data of the target world model M2.

The information processing device 100 performs, for example, the process illustrated in FIG. 20 as the association process according to the embodiment.

Also, the association process according to the embodiment is not limited to the example illustrated in FIG. 20.

For example, the determination related to the set reliability may further be performed on the sensor 200 for which the screen coordinate system conversion information T is determined to be set in step S102 illustrated in FIG. 20. When the determination related to the reliability is performed, the information processing device 100 performs the process from step S104, for example, when the set reliability is equal to or less than the threshold or the reliability is less than the threshold.

In addition, as described above, the information processing device 100 can also determine whether the position of the sensor 200 is changed on the basis of the detection result of the sensor 200 associated with the predetermined coordinate system and perform the association with the predetermined coordinate system again.

Figure 21:
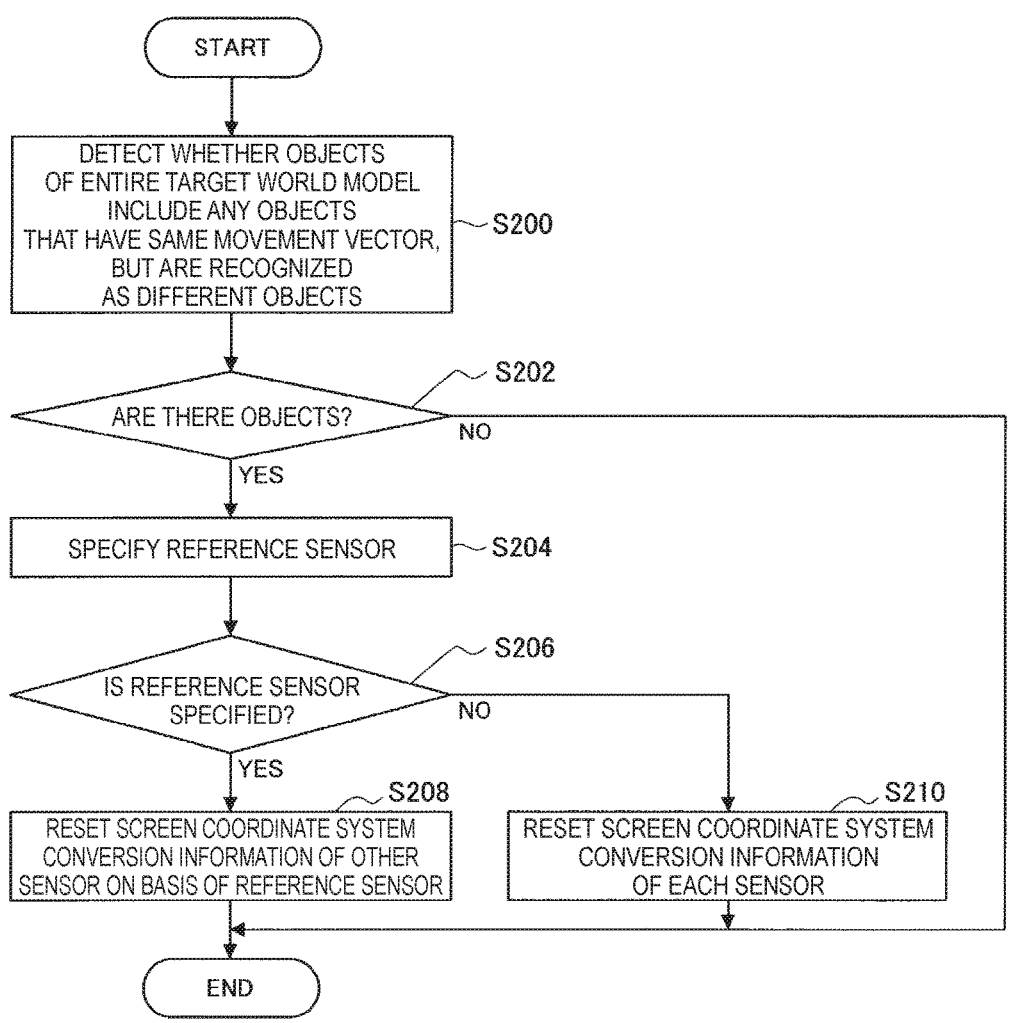
FIG. 21 is a flowchart illustrating another example of a process related to the second information processing method according to the embodiment.

FIG. 21 is a flowchart illustrating another example of the process related to the second information processing method according to the embodiment.

For example, the information processing device 100 detects objects which have the same movement vector and different absolute coordinate values from objects reflected in the data indicating the target world model M2 in the entire space (S200). Then, the information processing device 100 determines whether there are objects which have the same movement vector and the different absolute coordinate values (S202).

Here, the determination of step S202 is equivalent to determination of whether there is the sensor 200 in which a deviation occurs in the association with the predetermined coordinate system among the sensors 200 associated with the predetermined coordinate system. In addition, the case in which it is determined that there are objects which have the same movement vector and the different absolute coordinate values corresponds to presence of the sensor 200 for which there is a possibility of the deviation occurring in the association with the predetermined coordinate system.

When the information processing device 100 determines in step S202 that there are no objects which have the same movement vector and the different absolute coordinate values, the information processing device 100 ends the process illustrated in FIG. 21.

Conversely, when the information processing device 100 determines in step S202 that there are objects which have the same movement vector and the different absolute coordinate values, the information processing device 100 specifies a reference sensor among the sensors detecting the objects which have the same movement vector and the different absolute coordinate values (S204).

For example, when the sensor 200 in which the screen coordinate system conversion information T is given in the initial installation stage of the sensor 200 is included in the sensors 200 detecting the objects which have the same movement vector and the different absolute coordinate values, the information processing device 100 specifies the sensor 200 in which the screen coordinate system conversion information T is given as the reference sensor. In addition, for example, the information processing device 100 may specify, as the reference sensor, the sensor 200 in which the screen coordinate system conversion information T is set within a predetermined period set from a time point at which the process of step S204 is performed among the sensors 200 detecting the objects which have the same movement vector and the different absolute coordinate values. In addition, for example, the information processing device 100 may also specifies, as the reference sensor, the sensor 200 with higher set reliability among the sensors 200 detecting the objects which have the same movement vectors and the different absolute coordinate values.

When the information processing device 100 specifies the reference sensor in step S204, for example, the information processing device 100 resets the screen coordinate system conversion information T corresponding to the other sensor 200 on the basis of the information regarding the detection result of the object based on the output information of the reference sensor, as in step S108 of FIG. 20 (S206).

Conversely, when the information processing device 100 does not specify the reference sensor in step S204, for example, the information processing device 100 resets the screen coordinate system conversion information T of each sensor 200 detecting the objects which have the same movement vector and the different absolute coordinate values (S210). For example, the information processing device 100 resets the screen coordinate system conversion information T by causing the screen coordinate system conversion information T to be unusable, for example, by deleting the screen coordinate system conversion information T from a recording medium such as a storage unit (to be described below).

In addition, when the information processing device 100 resets the screen coordinate system conversion information T, for example, the information processing device 100 may notify the user that the deviation in the association with the predetermined coordinate system is not corrected. The information processing device 100 notifies the user that the deviation in the association with the predetermined coordinate system is not corrected, for example, by performing visual notification for displaying text or an image on a display screen or turning on and off a lamp, auditory notification for outputting audio from an audio output device such as a speaker, or notification of combination of the notifications.

For example, the information processing device 100 performs the process illustrated in FIG. 21, and thus re-association with the predetermined coordinate system is realized when there is a possibility of the position of the sensor 200 being changed.

The information processing device 100 associates the detection result of the target sensor with the predetermined coordinate system by performing, for example, the foregoing process as the association process according to the embodiment.

Also, the association process according to the embodiment is not limited to the foregoing example.

For example, the information processing device 100 can also cause the self-device (the information processing device 100) or an external device of the sensor 200 or the like to perform notification related to the association with the predetermined coordinate system.

The information processing device 100 delivers content of the notification related to the association with the predetermined coordinate system to the user, for example, by performing visual notification for displaying text or an image on a display screen or turning on and off a lamp, auditory notification for outputting audio from an audio output device such as a speaker, or notification of combination of the notifications.

As examples of the notification related to the association with the predetermined coordinate system according to the embodiment, for example, examples to be described in the following (i) to (iii) can be given.

(i) First Example of Notification Related to Association with Predetermined Coordinate System For example, the information processing device 100 notifies the user of a state of the association with the predetermined coordinate system in each of the plurality of sensors 200.

As a specific example, the information processing device 100 causes, for example, the sensor 200 in which the screen coordinate system conversion information T is set (the sensor 200 associated with the predetermined coordinate system) and the sensor 200 in which the screen coordinate system conversion information T is not set (the sensor 200 not associated with the predetermined coordinate system) to emit light with different colors from lamps. In addition, for example, the information processing device 100 may cause the sensor 200 in which the screen coordinate system conversion information T is set to emit light from a lamp and cause the sensor 200 in which the screen coordinate system conversion information T is not set to emit no light from a lamp.

The information processing device 100 controls the notification performed through the emission of the light from the lamps, for example, by causing a communication device which configures a communication unit (to be described below) or a connected external communication device to transmit a signal including a command to emit light to the sensors 200.

By notifying the user of the state of the association with the predetermined coordinate system through the emission of light from the lamps, as described above, the user using the information processing system 1000 can visually comprehend, for example, whether the installed sensors 200 are calibrated or whether the installed sensors 200 are integrated with the information processing system 1000.

Also, an example of the notification related to the state of the association with the predetermined coordinate system in each of the plurality of sensors 200 is not limited to the foregoing example.

For example, the information processing device 100 can also notify the user of a state of the association with the predetermined coordinate system in each of the plurality of sensors 200 by performing display on a display screen such as the screen SC illustrated in FIGS. 14A and 14B.

Figure 22A:
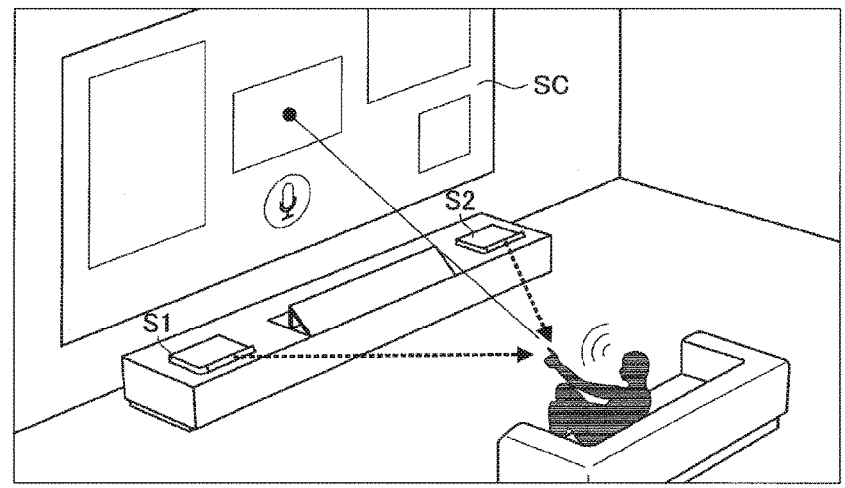
FIGS. 22A and 22B are flowcharts illustrating another example of a process related to the second information processing method according to the embodiment.
Figure 22B:
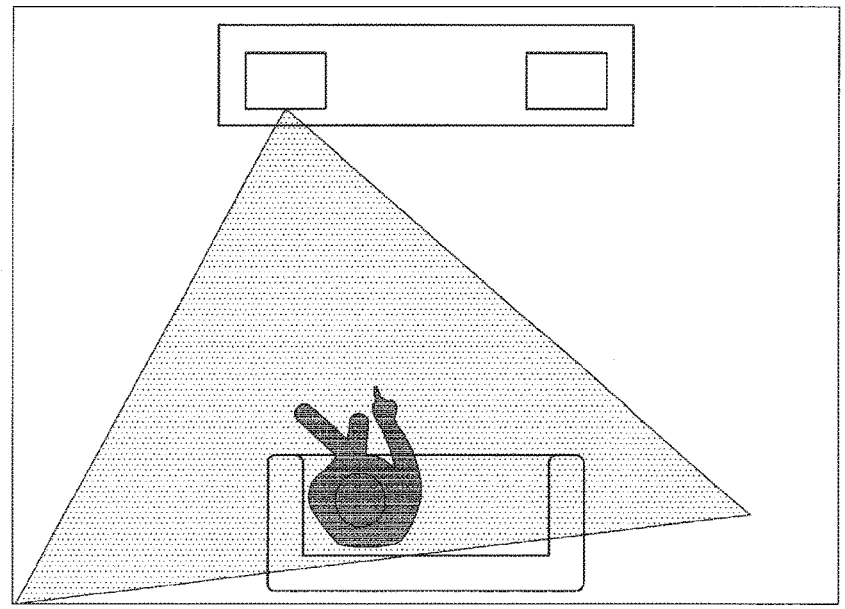

FIGS. 22A and 22B is an explanatory diagram illustrating an example of the process related to the second information processing method according to the embodiment. FIG. 22A illustrates the same use case as that of FIGS. 14A and 14B. FIG. 22B illustrates an example of notification of a state of the association with the predetermined coordinate system in the sensor 200 by performing display on the display screen such as the screen SC.

For example, in the example illustrated in FIG. 22B, the state of the association with the predetermined coordinate system in the sensor 200 is notified of by displaying a detection range of the sensor 200 associated with the predetermined coordinate system on an image when a space illustrated in FIG. 22A is viewed from the upper side. The detection range of the sensor 200 is displayed, for example, using an augmented reality (AR) technology or the like.

Also, the example of the notification in the use case illustrated in FIG. 22A is not limited to the example illustrated in FIG. 22B.

For example, the information processing device 100 may display a space viewed from a central position of the screen SC (for example, the space is displayed like a mirror image).

When the sensor 200 is an image sensor and the space viewed from the central position of the screen SC is displayed, an image to be displayed is generated on the basis of an image acquired from the sensor 200.

Here, the sensor 200 is not contained in the image acquired from the sensor 200, but an image equivalent to the sensor 200 is combined from absolute spatial coordinates of the sensor 200 in regard to the sensor 200 associated with the predetermined coordinate system. In addition, when the sensor 200 is combined, display related to the reliability set in the sensor 200 may be further performed. As the display related to the reliability, for example, display in which a value (for example, a value represented with [%]) indicating the reliability is displayed or display in which the reliability is represented with color can be exemplified.

In addition, the detection range of the sensor 200 may be displayed using an AR technology or the like. In addition, for example, for an object detected within the detection range of the sensor 200, display indicating its detection may be performed by superimposing a bar-shaped object with red color or the like.

Figure 23A:
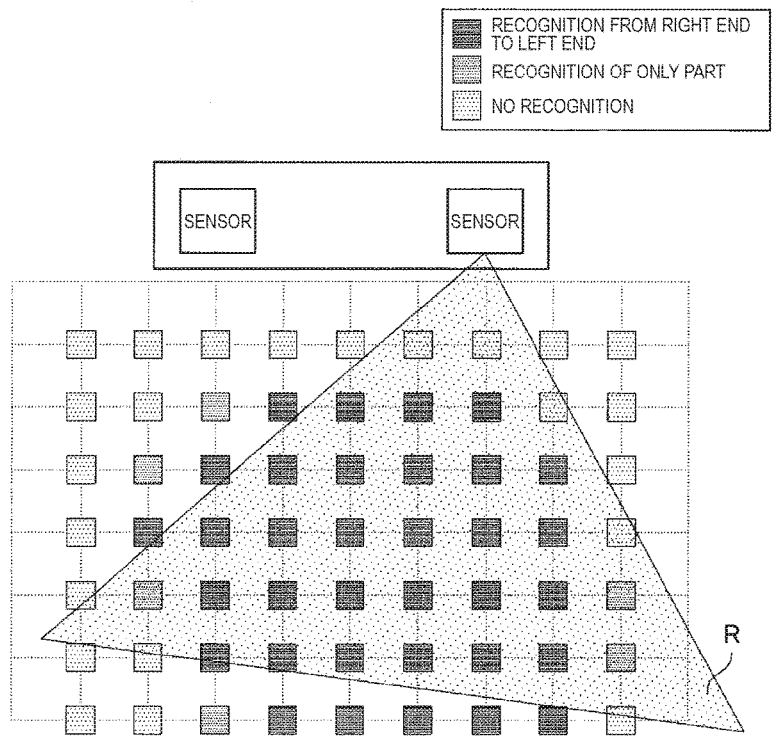
FIGS. 23A and 23B are flowcharts illustrating another example of a process related to the second information processing method according to the embodiment.
Figure 23B:
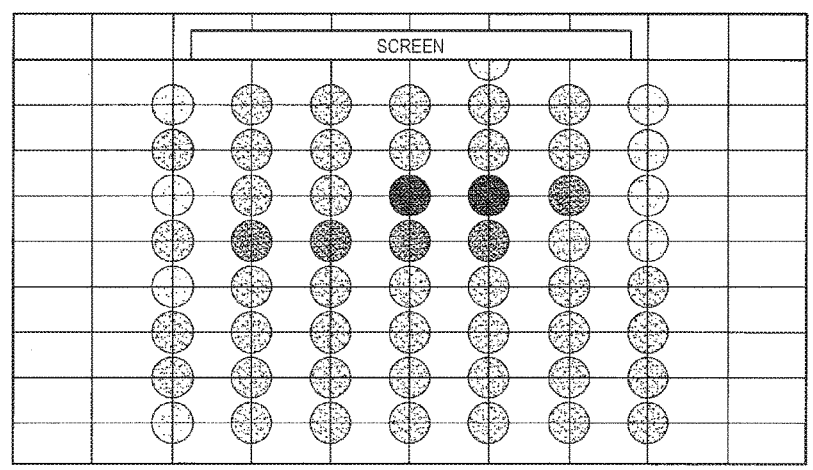

FIGS. 23A and 23B are explanatory diagrams illustrating an example of the process related to the second information processing method according to the embodiment. FIG. 23A illustrates a notification example of a state of the association with the predetermined coordinate system in the sensor 200 through display on a display screen. In addition, FIG. 23B illustrates another example of the display on the display screen. In addition, FIG. 23B and FIG. 23A are diagrams when a space is viewed from the upper side.

For example, in the example illustrated in FIG. 23A, a detection range R of a sensor at the time of design of the information processing system 1000 and an actual detection result (recognition intensity of an object) are represented by color, so that a state of the association with the predetermined coordinate system in the sensor 200 and a sensing range are illustrated. In addition, the notification performed through the display on the display screen may also be realized, for example, by representing the actual detection result (recognition intensity of an object) by color, as illustrated in FIG. 23B.

(ii) Second Example of Notification Related to Association with Predetermined Coordinate System For example, when the new sensor 200 is detected or movement of the position of the sensor 200 associated with the predetermined coordinate system is detected, the information processing device 100 performs notification for performing a predetermined action related to the association with the predetermined coordinate system.

Figure 24:
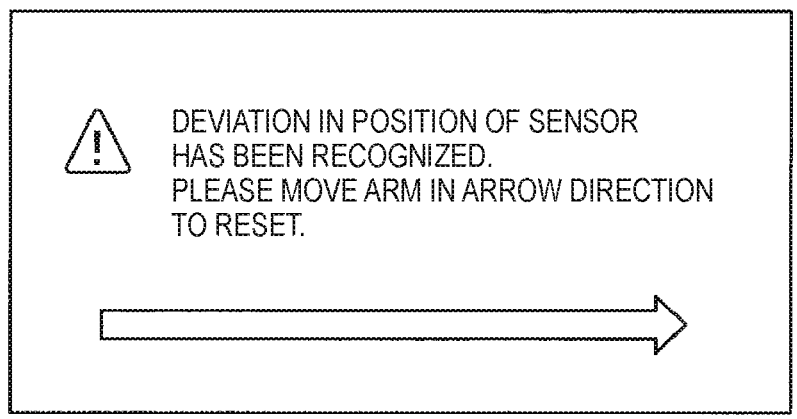
FIG. 24 is a flowchart illustrating another example of a process related to the second information processing method according to the embodiment.

FIG. 24 is an explanatory diagram illustrating an example of the process related to the second information processing method according to the embodiment. FIG. 24 illustrates an example of an image displayed when a deviation in the position of the sensor is detected, that is, movement of the position of the sensor 200 associated with the predetermined coordinate system is detected.

As described above, the association with the predetermined coordinate system is performed in, for example, the reference sensor and the target sensor on the basis of the detection result in which the same object is detected. Accordingly, for example, as illustrated in FIG. 24, by displaying an image for causing the user to perform the predetermined action of performing the association with the predetermined coordinate system on a display screen and prompting the user to perform the predetermined action, the information processing device 100 can realize the re-association with the predetermined coordinate system.

Here, a direction in which the user is caused to move his or her arm is set using, for example, the position of the reference sensor and the position of the sensor 200 before the movement.

FIGS. 25A, 25B, and 25C is an explanatory diagram illustrating an example of the process related to the second information processing method according to the embodiment. FIGS. 25A, 25B, and 25C illustrate examples of images displayed when the new sensor 200 is detected. In addition, FIGS. 25A, 25B, and 25C illustrate an example in which the sensor 200 is an image sensor.

When the new sensor 200 is detected, the information processing device 100 first displays the image illustrated in FIGS. 25A, 25B, and 25C on the display screen and subsequently transition the display screen to a screen illustrated in FIG. 25B.

On the screen illustrated in FIG. 25B, an image gained from the sensor 200 associated with the predetermined coordinate system is represented by a frame F1 indicating the association with the predetermined coordinate system. As the frame F1 indicating the association with the predetermined coordinate system, for example, a frame with color indicating the association with the predetermined coordinate system, such as a blue frame, can be exemplified.

On the screen illustrated in FIG. 25B, for example, an image gained from the sensor 200 associated with the predetermined coordinate system can be switched with a button Btn.

In addition, on the screen illustrated in FIG. 25B, an image gained from the sensor 200 not associated with the predetermined coordinate system is represented by a frame F2 indicating the non-association with the predetermined coordinate system. As the frame F2 indicating the non-association with the predetermined coordinate system, for example, a frame with color indicating the non-association with the predetermined coordinate system, such as a red frame, can be exemplified.

On the screen illustrated in FIG. 25B, the display of the frame displayed on the image gained from the sensor 200 is changed in accordance with a state of the association with the predetermined coordinate system.

Here, the frame displayed on the image gained from the sensor 200 may be changed in accordance with the set reliability.

For example, on the screen illustrated in FIG. 25B, as indicated by R1 and R2 in FIG. 25B, overlapping regions in the images gaining from the sensor 200, that is, overlapping detection ranges in the sensors 200, is clarified, and the reliability of the new sensors 200 is raised when the user performs, for example, an action of moving his or her arm in the overlapping regions. Then, as a result, as indicted by a frame F3 in FIG. 25B, the frame displayed on the image gained from the sensor 200 is changed in accordance with the change in the color.

In addition, the information processing device 100 displays a result obtained when the user performs an operation in the overlapping regions R1 and R2 in the images gained from the sensors 200 illustrated in FIG. 25B, for example, as illustrated in FIG. 25C.

For example, by realizing display illustrated in FIG. 25C on the display screen, the advantageous effect that the user can easily perform an operation in the overlapping detection ranges of the sensors 200 is expected.

For example, in accordance with the display illustrated in FIGS. 25A 25B, and 25C, the user can be notified of the overlapping detection ranges of the sensors 200 to prompt the user to calibrate the sensors 200.

(iii) Third Example of Notification Related to Association with Predetermined Coordinate System For example, the information processing device 100 can also perform both the notification related to the first example described in the foregoing (i) and the notification related to the second example described in the foregoing (ii) in sequence or in parallel.

(2) Execution Process

The information processing device 100 performs the predetermined process on the basis of the output information of the sensors 200 associated with the predetermined coordinate system.

In the sensing range not overlapping with that of the other sensors 200 among the sensing ranges of the sensors 200 associated with the predetermined coordinate system, for example, the information processing device 100 performs the predetermined process on the basis of one of the first output information of the reference sensor (the first sensor)

and the second output information of the target sensor (the second sensor) associated with the predetermined coordinate system.

In addition, in the sensing range overlapping with that of the other sensors 200 among the sensing ranges of the sensors 200 associated with the predetermined coordinate system, for example, the information processing device 100 performs the predetermined process on the basis of one of the first output information of the reference sensor (the first sensor) and the second output information of the target sensor (the second sensor) associated with the predetermined coordinate system. For example, the information processing device 100 uses one of the first output information and the second output information by using the output information of the sensor 200 in which the reliability of the sensor 200 is higher or using the output information of the sensor 200 selected at random. In addition, the information processing device 100 can also use both the first output information and the second output information, for example, by averaging coordinates indicated by position information based on the first output information and coordinates indicated by the position information based on the second output information.

Figure 26B:
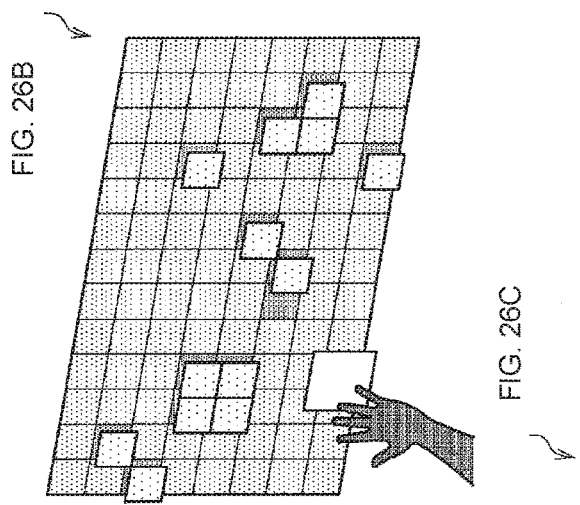
FIGS. 26A, 26B and 26C are flowcharts illustrating another example of a process related to the second information processing method according to the embodiment.
Figure 26C:
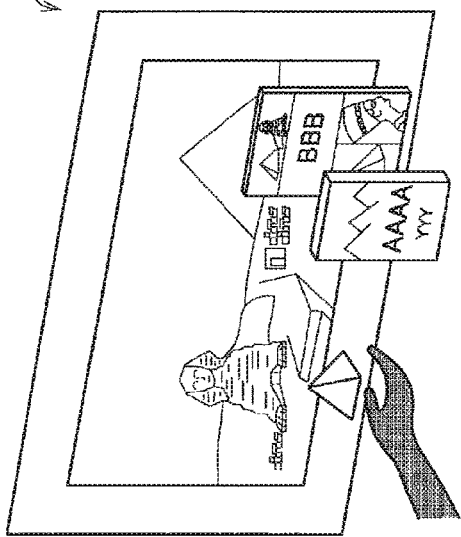
Figure 26A:
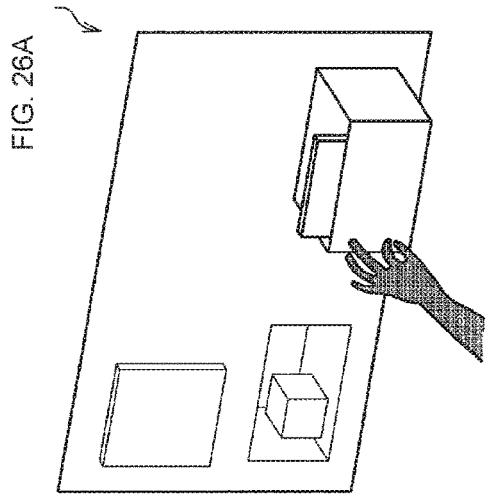

FIGS. 26A, 26B, 26C, and 27 are explanatory diagrams illustrating an example of the process related to the second information processing method according to the embodiment. FIGS. 26A, 26B, 26C illustrate an example of a UI related to a process based on the output information and performed through the execution process according to the embodiment. In addition, FIG. 27 illustrates an example of a process based on the output information and performed through the execution process according to the embodiment.

As the UI related to the process based on the output information according to the embodiment, for example, UIs related to hand-free operations on a display screen such as the screen SC illustrated in FIGS. 14A and 14B, such as a UI related to spatial presentation with a sense of presence illustrated in FIG. 26A, a UI related to interactive information delivery illustrated in FIG. 26B, and a UI related to a virtual experience by a cross media illustrated in FIG. 26C, can be exemplified. In addition, as the process based on the output information according to the embodiment, for example, as illustrated in FIG. 27, processes corresponding to operations on the UIs related to hand-free operations on the display screen illustrated in FIGS. 26A, 26B, 26C can be exemplified.

Also, it is needless to say that the UIs related to the process based on the output information according to the embodiment and the examples of the processes based on the output information according to the embodiment are not limited to the examples illustrated in FIGS. 26A, 26B, 26C and 27.

As described above, for example, the information processing device 100 decides the process based on the output information and caused be performed by the control target on the basis of a change in the position of an object in a space. Then, the information processing device 100 causes the control target to perform the process based on the output information by delivering a process request including a command to perform the decided process to the control target.

Here, when the detection results of the objects based on the output information of the plurality of sensors 200 associated with the predetermined coordinate system are detection results of the same object, for example, the information processing device 100 decides the process based on the output information and caused to be performed by the control target on the basis of the detection result of the object based on the output information of any one sensor 200. Then, the information processing device 100 causes the control target to perform the process based on the output information by delivering a process request corresponding to the decided process to the control target.

Also, the process when the detection results of the objects based on the output information of the plurality of sensors 200 are the detection result of the same object is not limited to the above process.

For example, when the detection results of the objects based on the output information of the plurality of sensors 200 associated with the predetermined coordinate system are the detection result of the same object, the information processing device 100 may perform the process based on the output information on the basis of the reliability set in each sensor 200.

For example, the information processing device 100 decides the process based on the output information and caused to be performed by the control target on the basis of the detection result of the object based on the output information of the sensor 200 with higher reliability. In addition, for example, the information processing device 100 may weight the detection result of the object based on the output information of each sensor 200 related to detection of the same object in accordance with the reliability of each sensor 200 and decide the process based on the output information and caused to be performed by the control target on the basis of the detection result of the object based on the output information weighted in accordance with the reliability. Then, the information processing device 100 causes the control target to perform the process based on the output information by delivering the process command corresponding to the decided process to the control target.

[IV] Example of Advantageous Effects Obtained by Using Second Information Processing Method According to Embodiment By using the second information processing method according to the embodiment, for example, the following advantageous effects are obtained. Also, it is needless to say that the advantageous effects obtained by using the second information processing method according to the embodiment are not limited to the following examples.

- It is possible to realize robust recognition of a pointing operation and a gesture operation in one broad continuous space in which the sensing range can be expanded, for example, by adding the sensor 200.
- It is possible to achieve an improvement in recognition precision of a pointing operation or a gesture operation in the information processing system 1000 as the number of sensors 200 increases (performance improvement advantageous effect).
- It is possible to associate the sensor 200 with the predetermined coordinate system again even when the position of the sensor 200 is moved due to some causes (autonomous correction of the association with the predetermined coordinate system).
- It is possible to notify the user that a deviation in the association with the predetermined coordinate system is not corrected when autonomous correction of the association with the predetermined coordinate system is not performed (for example, the screen coordinate system conversion information T is reset).

(Second Information Processing Device According to Embodiment)

Next, an example of the configuration of the information processing device according to the embodiment capable of performing the process related to the second information processing method according to the embodiment described above will be described. Hereinafter, an example of the configuration of the information processing device according to the embodiment performing (1) the foregoing process (the association process) as the process according to the second information processing method according to the embodiment will be described.

Figure 28:
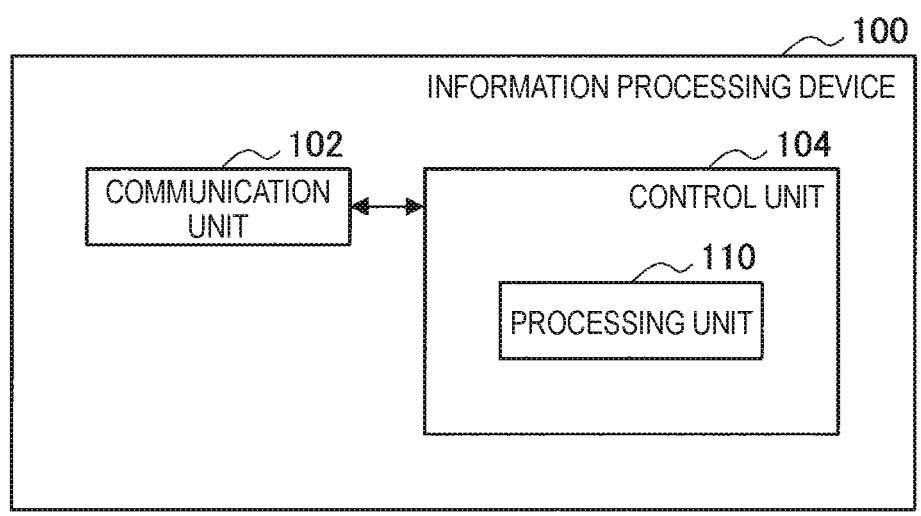
FIG. 28 is a block diagram illustrating an example of a configuration of an information processing device according to the embodiment capable of performing the process related to the second information processing method according to the embodiment.

FIG. 28 is a block diagram illustrating an example of the configuration of the information processing device 100 according to the embodiment. The information processing device 100 includes, for example, a communication unit 102 and a control unit 104.

The information processing device 100 may also include, for example, a ROM (not illustrated), a RAM (not illustrated), a storage unit (not illustrated), an operation unit (not illustrated) which can be operated by the user, and a display unit (not illustrated) that displays various screens on a display screen. In the information processing device 100, for example, the constituent elements are connected to each other by a bus which is a data transferring path.

The ROM (not illustrated) stores a program to be used by the control unit 104 and control data such as an arithmetic parameter. The RAM (not illustrated) temporarily stores the program executed by the control unit 104.

The storage unit (not illustrated) is storage means included in the information processing device 100 and stores, for example, the data indicating the target world model M1 of each sensor 200, the data indicating the target world model M2 in an entire target space, data related to the second information processing method according to the embodiment, such as conversion information of each sensor 200, and various kinds of data such as various applications. Here, as the storage unit (not illustrated), for example, a magnetic recording medium such as a hard disk or a nonvolatile memory such as a flash memory can be exemplified. In addition, the storage unit (not illustrated) may be detachably mounted on the information processing device 100.

As the operation unit (not illustrated), an operation input device to be described below can be exemplified. In addition, as the display unit (not illustrated), a display device to be described below can be exemplified.

[Example of Hardware Configuration of Information Processing Device 100]

FIG. 29 is an explanatory diagram illustrating an example of a hardware configuration of the information processing device 100 according to the embodiment. The information processing device 100 includes, for example, an MPU 150, a ROM 152, a RAM 154, a recording medium 156, an input and output interface 158, an operation input device 160, a display device 162, and a communication interface 164. In addition, in the information processing device 100, for example, the constituent elements are connected to each other by a bus 166 which is a data transferring path.

The MPU 150 is configured of an arithmetic circuit such as a MPU and is configured to include one or two or more processors or various processing circuits and functions as the control unit 104 that controls the entire information processing device 100. In addition, the MPU 150 serves as, for example, a processing unit 110 to be described in the information processing device 100. Also, the processing unit 110 may be configured of a dedicated (or general-purpose) circuit (for example, a different processor from the MPU 150) capable of realizing a process.

The ROM 152 stores a program to be used by the MPU 150 or control data such as an arithmetic parameter. The RAM 154 temporarily stores, for example, the program executed by the MPU 150.

The recording medium 156 functions as a storage unit (not illustrated) and stores, for example, the data indicating the target world model M1 of each sensor 200, the data indicating the target world model M2 in an entire target space, data related to the second information processing method according to the embodiment, such as conversion information of each sensor 200, and various kinds of data such as various applications. Here, as the recording medium 156, for example, a magnetic recording medium such as a hard disk or a nonvolatile memory such as a flash memory can be exemplified. In addition, the recording medium 156 may be detachably mounted on the information processing device 100.

The input and output interface 158 connects, for example, the operation input device 160 or the display device 162. The operation input device 160 functions as an operation unit (not illustrated). In addition, the display device 162 functions as a display unit (not illustrated). Here, as the input and output interface 158, for example, a USB terminal, a DVI terminal, an HDMI (registered trademark) terminal, or various processing circuits can be exemplified.

In addition, for example, the operation input device 160 is included on the information processing device 100 and is connected to the input and output interface 158 inside the information processing device 100. As the operation input device 160, for example, a button, a direction key, a rotary selector such as a jog dial, or a combination thereof can be exemplified.

In addition, for example, the display device 162 is included on the information processing device 100 and is connected to the input and output interface 158 inside the information processing device 100. As the display device 162, for example, a liquid crystal display or an organic EL display can be exemplified.

Also, it is needless to say that the input and output interface 158 can be connected to an external device such as an external operation input device (for example, a keyboard or a mouse) or an external display device which is an external device of the information processing device 100. In addition, the display device 162 may be, for example, a device such as a touch panel capable of performing display or a user operation.

The communication interface 164 is communication means included in the information processing device 100 and functions as the communication unit 102 that performs wireless or wired communication with an external device such as the sensor 200 via a network (or directly). Here, as the communication interface 164, for example, a communication antenna and a RF circuit (wireless communication), an IEEE 802.15.1 port and a transmission and reception circuit (wireless communication), an IEEE 802.11 port and a transmission and reception circuit (wireless communication), or a LAN terminal and a transmission and reception circuit (wired communication) can be exemplified.

For example, in the configuration illustrated in FIG. 29, the information processing device 100 performs the process related to the second information processing method according to the embodiment. Also, the hardware configuration of the information processing device 100 according to the embodiment is not limited to the configuration illustrated in FIG. 29.

For example, when communication with an external device is performed via a connected external communication device, the information processing device 100 may not include the communication interface 164. In addition, the communication interface 164 may be configured to be able to perform communication with one device or two or more external devices in conformity to a plurality of communication schemes.

In addition, for example, the information processing device 100 may be configured not to include the recording medium 156 or the operation input device 160 and the display device 162.

In addition, for example, the configuration illustrated in FIG. 29 (or a configuration according to a modification example) may be realized with one integrated circuit (IC) or two or more ICs.

Referring back to FIG. 28, an example of the configuration of the information processing device 100 will be described. The communication unit 102 is communication means included in the information processing device 100 and performs wireless or wired communication with an external device such as the sensor 200 via a network (or directly). In addition, for example, communication of the communication unit 102 is controlled by the control unit 104.

Here, as the communication unit 102, for example, a communication antenna and an RF circuit or a LAN terminal and a transmission and reception circuit can be exemplified, but the configuration of the communication unit 102 is not limited thereto. For example, the communication unit 102 can have a configuration corresponding to any standard capable of performing communication of a USB terminal and a transmission and reception circuit or the like or any configuration capable of communicating with an external device via a network. In addition, the communication unit 102 may be configured to be able to perform communication with one external device or two or more external devices in accordance with a plurality of communication schemes.

The control unit 104 is configured of, for example, an MPU and serves to control the entire information processing device 100. In addition, for example, the control unit 104 includes the processing unit 110 and takes a leading role of performing the process related to the second information processing method according to the embodiment.

The processing unit 110 takes a leading role of performing (1) the foregoing process (the association process) and performs the association process of associating the target sensor with the predetermined coordinate system on the basis of the first output information acquired from the reference sensor (the first sensor) and the second output information acquired from the target sensor (the second sensor).

For example, the processing unit 110 may further perform one or both of a process of setting the reliability for each sensor 200 associated with the predetermined coordinate system and a notification control process of performing notification such as notification related to the association with the predetermined coordinate system.

In addition, the processing unit 110 may further perform (2) the foregoing process (the execution process). When the processing unit 110 performs (2) the foregoing process (the execution process), the processing unit 110 performs the predetermined process on the basis of the output information of the sensor 200 associated with the predetermined coordinate system.

For example, the control unit 104 includes the processing unit 110 and takes a leading role of performing the process related to the second information processing method according to the embodiment (for example "(1) the foregoing process (the association process)" or "(1) the foregoing process (the association process) and (2) the foregoing process (the execution process)").

For example, in the configuration illustrated in FIG. 28, the information processing device 100 performs the process related to the second information processing method according to the embodiment (for example "(1) the foregoing process (the association process)" or "(1) the foregoing process (the association process) and (2) the foregoing process (the execution process)").

Accordingly, for example, in the configuration illustrated in FIG. 28, the information processing device 100 can achieve the improvement in the convenience for the user when the plurality of sensors are disposed.

In addition, for example, in the configuration illustrated in FIG. 28, it is possible to obtain the advantageous effects obtained by the information processing device 100 performing the process related to the second information processing method according to the embodiment described above.

Also, a configuration of the information processing device according to the embodiment is not limited to the configuration illustrated in FIG. 28.

For example, the information processing device according to the embodiment can include the processing unit 110 (for example, realized by another processing circuit) illustrated in FIG. 28 separately from the control unit 104.

In addition, as described above, "(1) the foregoing process (the association process)" or "(1) the foregoing process (the association process) and (2) the foregoing process (the execution process)") are separated processes of the process related to the second information processing method according to the embodiment for convenience. Accordingly, a configuration for realizing the process related to the second information processing method according to the embodiment is not limited to the processing unit 110 illustrated in FIG. 28, but a configuration in accordance with the method of separating the process related to the second information processing method according to the embodiment can be adopted.

In addition, for example, when communication is performed with an external device via an external communication device having the same function and configuration as the communication unit 102, the information processing device according to the embodiment may not include the communication unit 102.

The information processing device has been described as an example according to the embodiment, but an embodiment is not limited to the embodiment. The embodiment can be applied to, for example, various devices capable of performing the process related to the second information processing method according to the embodiment, such as a computer such as a PC or a server, a sensor according to the embodiment installed in a space, a communication device such as a cellular phone or smartphone, or a tablet device. In addition, the embodiment can also be applied to, for example, a processing IC which can be embedded in the foregoing device.

In addition, the information processing device according to the embodiment may be applied to, for example, a system formed by a plurality of devices on the assumption that the devices are connected to a network (or communication is performed between the devices), such as cloud computing. That is, the information processing device according to the embodiment described above can also be realized as, for example, an information processing system in which the process related to the second information processing method according to the embodiment is performed by a plurality of devices. As the information processing system in which the process related to the second information processing method according the embodiment is performed by the plurality of devices, for example, a system in which (1) the foregoing process (the association process) is performed by the first device included in the information processing system and (2) the foregoing process (the execution process) is performed by the second device included in the information processing system can be exemplified.

(Second Program According to Embodiment)

By causing a process or the like in a computer to execute a program (for example, a program capable of performing the process related to the second information processing method according to the embodiment, such as "(1) the foregoing process (the association process)" or "(1) the foregoing process (the association process) and (2) the foregoing process (the execution process)) causing the computer to function as the second information processing device according to the embodiment, it is possible to achieve convenience for the user when a plurality of sensors are disposed.

In addition, when the program causing the computer to function as the second information processing device according to the embodiment is executed by the processor or the like in the computer, it is possible to obtain the advantageous effects obtained through the process related to the second information processing method according to the embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the program (computer program) causing a computer to function as the first information processing device according to the embodiment has been provided above. In the embodiment, however, a recording medium storing the program can be further provided together.

For example, the program (computer program) causing a computer to function as the second information processing device according to the embodiment has been provided above. In the embodiment, however, a recording medium storing the program can be further provided together.

The above-described configuration is an example of the embodiment and, of course, pertains to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a processing unit configured to perform a process of generating preparation information on the basis of first output information regarding a first target acquired from a sensor that senses a predetermined range of an actual space and second output information regarding a second target acquired from a device carried by a user, in which the preparation information is used to generate operation information on the basis of third output information acquired from the sensor.

(2)

The information processing device according to (1), in which the preparation information is information for controlling association of the sensor with a predetermined coordinate system.

(3)

The information processing device according to (2), in which the preparation information is information used for a process of converting target position information gained on the basis of the third output information into coordinate values in the predetermined coordinate system.

(4)

The information processing device according to any one of (1) to (3), in which the first and second targets are related targets.

(5)

The information processing device according to (4), in which the second target moves in accordance with a motion of the first target.

(6)

The information processing device according to any one of (1) to (5), in which the process of generating the preparation information is a process of correcting the preparation information.

(7)

The information processing device according to (6), in which the processing unit corrects the preparation information on the basis of a detection result of the first target based on the first output information and a detection result of the second target based on the second output information.

(8)

The information processing device according to (7), in which the processing unit compares motion information of the first target which is the detection result of the first target to motion information of the second target which is the detection result of the second target and corrects the preparation information on the basis of a motion comparison result.

(9)

The information processing device according to (8), in which the correction of the preparation information based on the motion comparison result is correction of a positional deviation in a position of the first target based on the first output information.

(10)

The information processing device according to (9), in which the correction of the preparation information based on the motion comparison result further includes correcting a temporal deviation between a time corresponding to the motion information of the first target and a time corresponding to the motion information of the second target.

(11)

The information processing device according to any one of (7) to (10), in which the processing unit compares spatial coordinates corresponding to the first target which are the detection result of the first target to spatial coordinates corresponding to the second target which are the detection result of the second target and corrects the preparation information on the basis of a comparison result of the spatial coordinates.

(12)

The information processing device according to (11), in which the processing unit records a correction parameter related to the correction of the preparation information based on the comparison result of the spatial coordinates in association with identification information indicating the user of the carried device.

(13)

The information processing device according to (12), in which, in a case where the identification information is acquired, the processing unit corrects the preparation information using the correction parameter associated with the acquired identification information.

(14)

The information processing device according to any one of (1) to (13), in which the processing unit aperiodically performs the process of generating the preparation information.

(15)

The information processing device according to any one of (1) to (14), in which the processing unit performs the process of generating the preparation information when a predetermined action of the user is detected.

(16)

The information processing device according to (15), in which, in a case where the new sensor is detected or in a case where movement of a position of the existing sensor is detected, the processing unit controls notification for performing the predetermined action.

(17)

The information processing device according to (5), in which the first and second targets are hands or arms.

(18)

The information processing device according to any one of (1) to (17), in which the carried device is a device worn on a hand or an arm.

(19)

The information processing device according to any one of (1) to (18), in which the sensor is an image sensor.

(20)

An information processing method performed by an information processing device, the method including:

a step of performing a process of generating preparation information on the basis of first output information regarding a first target acquired from a sensor that senses a predetermined range of an actual space and second output information regarding a second target acquired from a device carried by a user, in which the preparation information is used to generate operation information on the basis of third output information acquired from the sensor.

(21)

A program causing a computer to perform:

a step of performing a process of generating preparation information on the basis of first output information regarding a first target acquired from a sensor that senses a predetermined range of an actual space and second output information regarding a second target acquired from a device carried by a user, in which the preparation information is used to generate operation information on the basis of third output information acquired from the sensor.

(22)

The information processing device according to any one of (1) to (19), in which the processing unit further performs a predetermined process on the basis of the third output information and the preparation information.

(23)

The information processing device according to any one of (1) to (19) and (22), in which the second output information acquired from the carried device is output information of a motion sensor.

Further, the present technology may also be configured as below.

(1)

An information processing device including:

a processing unit configured to perform an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

(2)

The information processing device according to (1), in which the association process is a process of generating information used to calculate predetermined coordinate values in the predetermined coordinate system on the basis of the second output information.

(3)

The information processing device according to (2), in which the association process is a process of generating information used for a process of converting target position information gained on the basis of the second output information into coordinate values in the predetermined coordinate system.

(4)

The information processing device according to any one of (1) to (3), in which the predetermined coordinate system is a coordinate system related to a display screen on which an operation target operated on the basis of one or both of the first output information and the second output information is displayed.

(5)

The information processing device according to any one of (1) to (4), in which the second sensor is a sensor that is not associated with the predetermined coordinate system.

(6)

The information processing device according to any one of (1) to (5), in which the second sensor is a sensor in which the matching to the predetermined coordinate system deviates among sensors associated with the predetermined coordinate system.

(7)

The information processing device according to any one of (1) to (6), in which the second sensor is a sensor in which reliability set in the sensor associated with the predetermined coordinate system is equal to or less than a set threshold or a sensor in which the reliability is less than the threshold among the sensors associated with the predetermined coordinate system.

(8)

The information processing device according to (7), in which the processing unit sets the reliability in each sensor associated with the predetermined coordinate system.

(9)

The information processing device according to any one of (1) to (8), in which the processing unit performs notification of an association state of each of the first and second sensors with the predetermined coordinate system.

(10)

The information processing device according to any one of (1) to (9), in which, when a new sensor is detected or when movement of a position of the sensor associated with the predetermined coordinate system is detected, the processing unit performs notification for performing a predetermined action associated with the predetermined coordinate system.

(11)

The information processing device according to any one of (1) to (10), in which the first and second sensors are image sensors.

(12)

The information processing device according to any one of (1) to (11), in which the processing unit performs a predetermined process on the basis of one or both of first output information and second output information acquired from the second sensor associated with the predetermined coordinate system.

(13)

The information processing device according to (12), in which the processing unit recognizes a gesture as the predetermined process.

(14)

An information processing method performed by an information processing device, the method including:

a step of performing an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

(15)

A program causing a computer to perform:

a step of performing an association process of associating a second sensor with a predetermined coordinate system on the basis of first output information acquired from a first sensor which is associated with the predetermined coordinate system and is a sensor that senses an operation instruction from a user and second output information acquired from the second sensor which is different from the first sensor and is a sensor that senses an operation instruction from the user.

REFERENCE SIGNS LIST 100 information processing device
102 communication unit
104 control unit
110 processing unit
200, 200A, 200B, S1, S2 sensor
300, 300A, 300B, 300C carried device
1000 information processing system

The invention claimed is:

1. An information processing device, comprising:
a processing unit configured to:
generate preparation information based on first output information regarding a first target and second output information regarding a second target, wherein
the first output information is acquired from a first sensor that senses a range of an actual space,
the second output information is acquired from a user carried device, and
the preparation information is used to generate operation information based on third output information acquired from the first sensor;
compare first spatial coordinates corresponding to the first target with second spatial coordinates corresponding to the second target, wherein
the first spatial coordinates are a first detection result of the first target,
the second spatial coordinates are a second detection result of the second target,
the first detection result of the first target is based on the first output information, and
the second detection result of the second target is based on the second output information;
correct the preparation information based on the comparison of the first spatial coordinates and the second spatial coordinates; and
record a correction parameter related to the correction of the preparation information in association with identification information indicating a user of the user carried device.

2. The information processing device according to claim 1, wherein the processing unit is further configured to control association of the first sensor with a coordinate system based on the preparation information.

3. The information processing device according to claim 2, wherein the preparation information is information used to convert target position information gained based on the third output information into coordinate values in the coordinate system.

4. The information processing device according to claim 1, wherein the first target and the second target are related targets.

5. The information processing device according to claim 4, wherein the second target moves in accordance with a motion of the first target.

6. The information processing device according to claim 5, wherein the first target and the second target are one of user hands or user arms.

7. The information processing device according to claim 1, wherein the processing unit is further configured to:
compare first motion information of the first target with second motion information of the second target, wherein
the first motion information of the first target is the first detection result of the first target, and
the second motion information of the second target is the second detection result of the second target; and
correct the preparation information based on a result of the comparison of the first motion information and the second motion information.

8. The information processing device according to claim 7, wherein
for the correction of the preparation information based on the result of the comparison of the first motion information and the second motion information, the processing unit is further configured to correct a positional deviation in a position of the first target, and the positional deviation is based on the first output information.

9. The information processing device according to claim 8, wherein
for the correction of the preparation information based on the result of the comparison of the first motion information and the second motion information, the processing unit is further configured to correct a temporal deviation between a first time corresponding to the first motion information of the first target and a second time corresponding to the second motion information of the second target.

10. The information processing device according to claim 1, wherein, based on acquisition of the identification information, the processing unit is further configured to correct the preparation information based on the correction parameter associated with the acquired identification information.

11. The information processing device according to claim 1, wherein the processing unit is further configured to aperiodically generate the preparation information.

12. The information processing device according to claim 1, wherein the processing unit is further configured to generate the preparation information based on detection of a user action.

13. The information processing device according to claim 12, wherein, based on one of a detection of a second sensor or detection of a movement of a position of the first sensor, the processing unit is further configured to control notification for the user action.

14. The information processing device according to claim 1, wherein the user carried device is a device worn on one of a user hand or a user arm.

15. The information processing device according to claim 1, wherein the first sensor is an image sensor.

16. An information processing method performed by an information processing device, the method comprising:
generating preparation information based on first output information regarding a first target and second output information regarding a second target, wherein
the first output information is acquired from a sensor that senses a range of an actual space,
the second output information is acquired from a user carried device, and
the preparation information is used to generate operation information based on third output information acquired from the sensor;
comparing first spatial coordinates corresponding to the first target with second spatial coordinates corresponding to the second target, wherein
the first spatial coordinates are a first detection result of the first target,
the second spatial coordinates are a second detection result of the second target,
the first detection result of the first target is based on the first output information, and
the second detection result of the second target is based on the second output information;
correcting the preparation information based on the comparison of the first spatial coordinates and the second spatial coordinates; and
recording a correction parameter related to the correction of the preparation information in association with identification information indicating a user of the user carried device.

17. A non-transitory computer-readable medium having stored thereon, computer-executable instructions which, when executed by a computer, cause the computer to execute operations, the operations comprising:
generating preparation information based on first output information regarding a first target and second output information regarding a second target, wherein
the first output information is acquired from a sensor that senses a range of an actual space,
the second output information is acquired from a user carried device, and
the preparation information is used to generate operation information based on third output information acquired from the sensor;
comparing first spatial coordinates corresponding to the first target with second spatial coordinates corresponding to the second target, wherein
the first spatial coordinates are a first detection result of the first target,
the second spatial coordinates are a second detection result of the second target,
the first detection result of the first target is based on the first output information, and
the second detection result of the second target is based on the second output information;
correcting the preparation information based on the comparison of the first spatial coordinates and the second spatial coordinates; and
recording a correction parameter related to the correction of the preparation information in association with identification information indicating a user of the user carried device.

\* \* \* \* \*